US 6,723,435 B1

(12) United States Patent
Horne et al.

(10) Patent No.: US 6,723,435 B1
(45) Date of Patent: Apr. 20, 2004

(54) OPTICAL FIBER PREFORMS

(75) Inventors: Craig R. Horne, Fremont, CA (US); Jesse S. Jur, Baltimore, MD (US); Ronald J. Mosso, Fremont, CA (US); Eric H. Euvrard, Mountain View, CA (US); Xiangxin Bi, San Ramon, CA (US)

(73) Assignee: NanoGram Corporation, Fremont, CA (US)

(*) Notice: Subject to any disclaimer, the term of this patent is extended or adjusted under 35 U.S.C. 154(b) by 0 days.

(21) Appl. No.: 10/229,937

(22) Filed: Aug. 28, 2002

Related U.S. Application Data

(60) Provisional application No. 60/315,438, filed on Aug. 28, 2001.

(51) Int. Cl.[7] .......................... B32B 17/06; B29B 7/00; G02B 6/20

(52) U.S. Cl. ................. 428/432; 428/428; 428/542.8; 428/689; 428/702; 385/141; 385/142; 385/125

(58) Field of Search .................. 428/428, 432, 428/542.8, 689, 702; 385/123–127, 141, 142; 65/385, 427

(56) References Cited

U.S. PATENT DOCUMENTS

| | | | |
|---|---|---|---|
| 4,630,890 A | | 12/1986 | Ashkin et al. |
| 5,655,046 A | * | 8/1997 | Todoroki et al. ............ 385/144 |
| 5,958,348 A | | 9/1999 | Bi et al. |
| 5,989,514 A | | 11/1999 | Bi et al. |
| 6,128,430 A | * | 10/2000 | Chu et al. .................... 385/142 |
| 6,136,287 A | | 10/2000 | Horne et al. |
| 6,192,713 B1 | | 2/2001 | Zhang et al. |
| 6,193,936 B1 | | 2/2001 | Gardner et al. |
| 6,506,493 B1 | | 1/2003 | Kumar et al. |

FOREIGN PATENT DOCUMENTS

| | | |
|---|---|---|
| WO | WO 99/61244 | 12/1999 |
| WO | WO 00/54291 | 9/2000 |
| WO | WO 01/007155 | 2/2001 |
| WO | WO 01/32799 | 5/2001 |
| WO | WO 02/32588 | 4/2002 |
| WO | WO 02/44765 | 6/2002 |
| WO | WO 02/058928 | 8/2002 |
| WO | WO 02/088019 | 11/2002 |
| WO | WO 02/089233 | 11/2002 |

OTHER PUBLICATIONS

Bi et al., "Three Dimensional Engineering of Planar Optical Structures," U.S. patent application No. 10/027,906, filed Dec. 21, 2002, 131 pages (application & drawings as filed).

(List continued on next page.)

*Primary Examiner*—Deborah Jones
*Assistant Examiner*—G. A. Blackwell-Rudasill
(74) *Attorney, Agent, or Firm*—Patterson, Thuente, Skaar & Christensen, P.A.; Peter S. Dardi

(57) ABSTRACT

Optical fiber preforms can comprise a glass preform structure with an inner cavity. A powder can be placed within the inner cavity having an average primary particle size of less than about one micron. The powder can be in the form of an unagglomerated particles or a powder coating with a degree of agglomeration or hard fusing ranging from none to significant amounts as long as the primary particles are visible in a micrograph. Powders can be placed within a preform structure by forming a slurry with a dispersion of submicron/nanoscale particles within a cavity within the preform. In other embodiments, a powder coating is formed within a preform structure by depositing the powder coating directly from a reaction product stream. The formation of the powder coating can be formed within the reaction chamber or outside of the reaction chamber by flowing the product particle stream through a conduit leading to the preform structure. In additional embodiments, a powder coating is placed on an insert, e.g., a glass insert, that is subsequently placed within a preform structure.

17 Claims, 18 Drawing Sheets

OTHER PUBLICATIONS

Bryan, "Reactive Deposition for the Formation of Chip Capacitors," U.S. patent application No. 10/219,019, filed Aug. 14, 2002, 43 pages (application & drawings as filed).

Gardner et al., "Reactant Nozzles Within Flowing Reactors," U.S. patent application No. 10/119,645, filed Apr. 10, 2002, 71 pages (application & drawings as filed).

Horne et al., "Optical Materials and Optical Devices," U.S. patent application No. 10/099,597, filed Mar. 15, 2002, 142 pages (application & drawings as filed).

Ballato et al., "Fabrication of fibers with high rare-earth concentrations for Faraday isolator application," Applied Optics, vol. 34, No. 30, pp. 6848–6854, Oct. 20, 1995.

* cited by examiner

OPTICAL FIBER PREFORMS

CROSS REFERENCE TO RELATED APPLICATIONS

This application claims priority to U.S. Provisional Patent Application Ser. No. 60/315,438 filed Aug. 28, 2001 to Horne et al., entitled "Optical Waveguide Preforms," incorporated herein by reference.

FIELD OF THE INVENTION

The invention relates to optical fibers and optical fiber preforms, especially optical fiber preforms incorporating powders with selected compositions to yield a fiber with desired properties. Furthermore, the invention relates to processes to form fiber preforms by incorporating particles with desired compositions within the fiber preform.

BACKGROUND OF THE INVENTION

The demand for high bandwidth telecommunication channels has resulted in the dramatic growth in optical communication transmission. Generally, these optical communication systems are built upon optical fiber transmission. Optical fibers generally can be formed from a glass material with desirable optical properties.

Optical fibers are generally very thin. The fibers generally have a core with an index-of-refraction different from a cladding layer surrounding the core. In particular, generally a core has a higher index-of-refraction than the cladding such that the light of a selected wavelength undergoes total internal reflection at the boundary between the core and cladding to keep the light within the core. The difference in index-of-refraction can be introduced by selection of the composition of the core materials to be appropriately different from the composition of the cladding material. In addition, the composition of the optical materials can be selected to alter optical properties of the fiber, such as absorption and emission properties.

Optical fibers are generally pulled from a larger block of glass material. The block from which the fiber is puller is called a fiber preform. The fiber preform is heated to an appropriate temperature to pull a fiber at a suitable rate with a desired thickness. The composition of the preform determines the resulting composition of the resulting fiber.

SUMMARY OF THE INVENTION

In a first aspect, the invention pertains to an optical fiber preform comprising a glass preform structure with an inner cavity and a powder within the inner cavity. The powder has an average primary particle size less than about 1 micron.

In another aspect, the invention pertains to a method for forming an optical fiber preform. The method comprises pouring a slurry into a glass preform structure. The slurry comprises a dispersion of particles having an average primary particle size less than about 1 micron.

In a further aspect, the invention pertains to a method for forming an optical fiber preform in which the method comprises directing a product stream in a flowing reactor into a glass preform structure. At least a portion of the product stream is harvested within a cavity in the glass preform structure. In some embodiments, the flowing reactor comprises radiation beam intersecting a reactant stream at a reaction zone at which the product stream is generated.

In an additional aspect, the invention pertains to a method for forming an optical fiber preform in which the method comprises inserting an insert within a glass preform structure. The insert generally comprises a powder coating in which the powder coating comprises particles with an average primary particle diameter of no more than a micron. In some embodiments, the powder coating is formed in a flowing reactor by placing the insert in a product stream of the flowing reactor. In some embodiments, the flowing reactor comprises a radiation beam intersecting a reactant stream at a reaction zone at which the product stream is generated.

DESCRIPTION OF THE INVENTION

Figure 1:
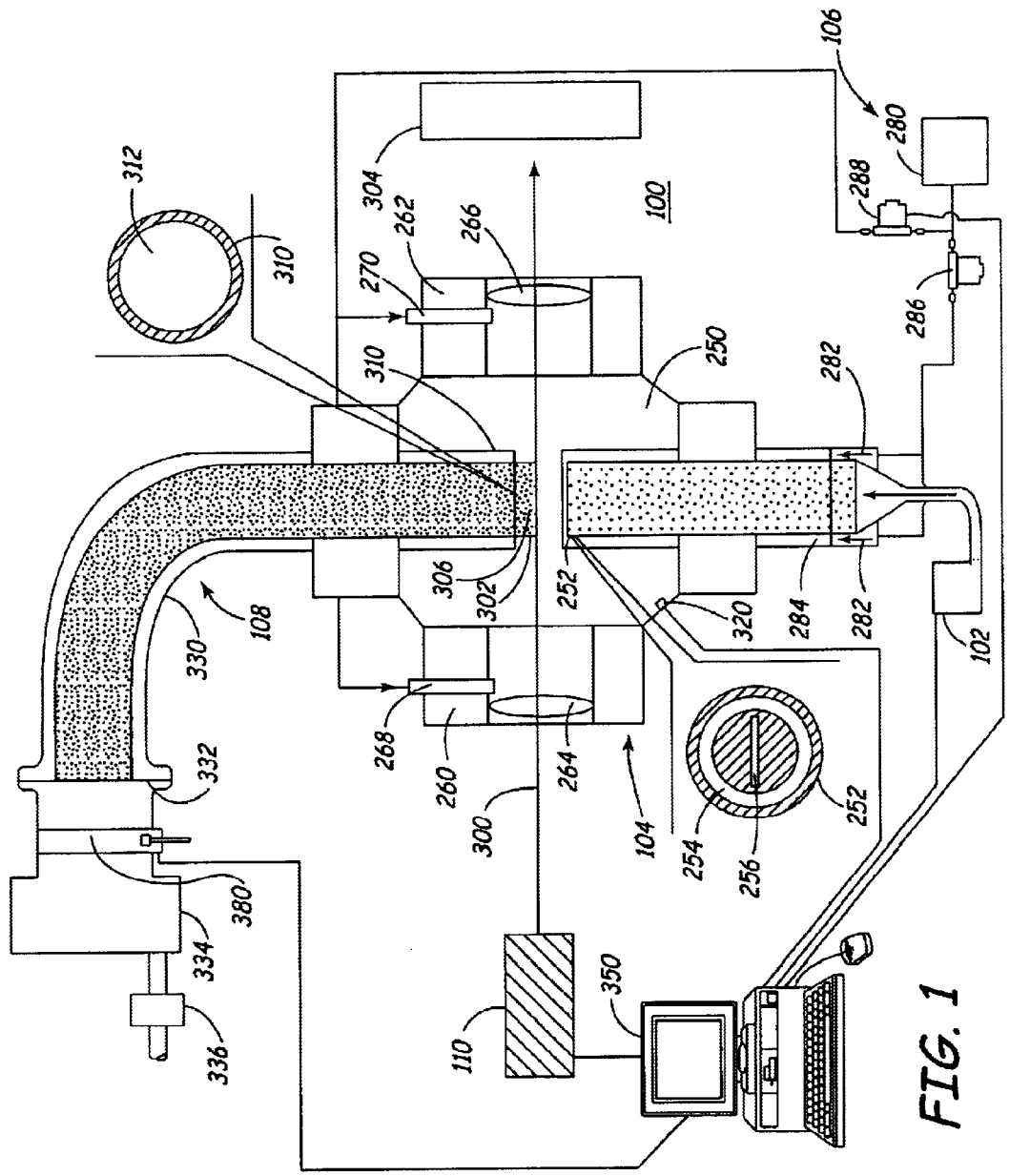
FIG. 1 is a schematic, sectional view of an embodiment of a laser pyrolysis apparatus, where the cross section is taken through the middle of a radiation path. The upper insert is a bottom view of a collection nozzle, and the lower insert is a top view of an injection nozzle.

The approaches described herein for the formation of an optical fiber preform combine the versatility of forming ultrafine powders with desired compositions with fiber formation from a preform formed from the powders having the appropriate composition. The powders combine with other glass components of the preform prior to or during the fiber forming process. In one embodiment, laser pyrolysis has been developed for the synthesis of ultrafine powders at commercially suitable production rates with great versatility in selecting the chemical composition. The ultrafine powders can be placed within a fiber preform structure, such as a tube, by positioning the preform structure within a product flow from a flowing reactor such that the powders flow into the preform structure. A preform structure, generally formed of glass, provides the shape of the optical fiber preform into which powders, such as unagglomerated powders and/or a powder coating, are placed to complete the preform for forming the fiber. Alternatively, powders can be collected from the flowing reactor for placement within the preform structure.

Although, in principle, the powders can be directly poured into a cavity or the like within a glass preform structure, in some embodiments, the powders are dispersed in a fluid, e.g., liquid or gas, to form a slurry. The slurry can be placed into the preform structure. Generally, removal, e.g., by evaporation, of the dispersant can form the desired preform. In other embodiments, a glass insert, e.g., rod, is coated within the flowing reactor with ultrafine powders. The coated glass insert is placed into a glass preform structure to form the fiber preform. The resulting preform and the corresponding fiber have a composition gradient across a cross section of the preform and fiber with dopant concentrations that generally can have one or more peaks.

Submicron and/or nanoscale inorganic particles with various stoichiometries and crystal structures have been produced within flowing reactors, especially by laser pyrolysis and other flowing reactor systems, alone or with additional processing. In the flowing reactors, particles are generated continuously within a reactant flow with the product particles being harvested from the flow. By appropriately selecting the composition in the reactant stream and the processing conditions, submicron particles incorporating one or more metal or metalloid elements, including, for example, rare earth metals, can be formed. Specifically, submicron/nanoscale particles with a range of compositions can be produced, optionally, with selected dopant(s)/additive(s). In addition, dopant(s)/additive(s) generally can be introduced at desired amounts by varying the composition of the reactant stream. Also, modifying element(s), such as dopant(s)/additive(s), can be introduced into an appropriate host material following formation of particles or a powder coating.

Collections of particles of particular interest have an average diameter less than a micron and, in some embodiments, a high uniformity with respect to composition and particle size, such as a lack of particles with sizes much larger than the average particle size. To generate desired submicron/nanoscale particles, a flowing stream reactor, especially a laser pyrolysis reactor, can be used either alone or in combination with additional processing. Specifically, laser pyrolysis has been found to be a valuable process for efficiently producing submicron (less than about 1 micron average diameter) and nanoscale (less than about 100 nm average diameter) particles with high uniformity and, in some embodiments, at high production rates. Laser pyrolysis can be adapted for directly form a coating in a process called radiation-based reactive deposition or light reactive deposition. For convenience, this application refers interchangeably to radiation-driven pyrolysis, light-driven pyrolysis and laser pyrolysis. For convenience, this application also refers interchangeably to radiation-based reactive deposition and light reactive deposition. In other words, as used herein, laser pyrolysis and light reactive deposition refer generally to all radiation based particle synthesis and radiation based coating approaches, respectively, unless explicitly indicated otherwise.

The particles generally can be amorphous, crystalline, polycrystalline or combinations and mixtures thereof. In some embodiments, dopants/additives can be introduced at desired amounts by varying the composition of the reactant stream. The dopants/additives can be introduced into an appropriate host glass forming material. In other embodiments, crystalline or polycrystalline particles are introduced for embedding into a glass matrix in their crystalline form.

A basic feature of successful application of laser pyrolysis for the production of particles with a desired composition is production of a reactant stream containing appropriate precursors. Similarly, unless the precursors are an appropriate radiation absorber, an additional radiation absorber is added to the reactant stream. Other additional reactants can be used to adjust the oxidizing/reducing environment in the reactant stream.

In laser pyrolysis, the reactant stream is pyrolyzed by an intense radiation beam, such as a light beam, e.g., a laser beam. While a laser beam is a convenient energy source, other intense radiation sources can be used in laser pyrolysis. Laser pyrolysis can be adapted to provide for formation of phases and/or types of materials that are difficult to form under thermodynamic equilibrium conditions. As the reactant stream leaves the focused radiation beam, the product particles are rapidly quenched. The present approaches have the advantage that the composition of the materials can be adjusted over desirable ranges.

A new process has been developed, termed light reactive deposition, to form highly uniform coatings and devices. Light reactive deposition involves a radiation beam driving a reaction within a flowing reactor, in which the reactor is configured for the immediate deposition of particles onto a surface. In particular, by adapting reactant delivery approaches developed for laser pyrolysis, a wide range of reaction precursors can be used in either gaseous and/or aerosol form, and a wide range of highly uniform product particles can be efficiently produced. Reactant delivery approaches developed for laser pyrolysis can be adapted for light reactive deposition.

To perform laser pyrolysis, reactants can be supplied in vapor form. Alternatively, one or more reactants can be supplied as an aerosol. The use of an aerosol provides for the use of a wider range of precursors for laser pyrolysis than are suitable for vapor delivery only. In some cases, less expensive precursors can be used with aerosol delivery. Suitable control of the reaction conditions with the aerosol results in nanoscale particles with a narrow particle size distribution.

In general, the inorganic particles generally comprise metal and/or metalloid elements in their elemental form and/or in compounds. The inorganic particles can comprise, for example, elemental metal or elemental metalloid, i.e. un-ionized elements such as silver and silicon, metaumetalloid oxides, metal/metalloid nitrides, metal/metalloid carbides, metal/metalloid sulfides, metal/metalloid arsinides, metal/metalloid phosphides, e.g., InP, metal/metalloid selenides, metal/metalloid tellurides, or the like, or combinations thereof. Some metaumetalloid oxides are particularly desirable for various applications, such as phosphors, electro-active materials for batteries or optical applications, and/or for their ability to consolidate into desirable uniform materials.

Complex systems of ternary, quaternary and higher complexity compounds can also be made. In one embodiment, compounds with multiple metal/metalloid elements can be formed. In addition, metal/metalloid compounds with complex anions, such as phosphates, sulfates and silicates can be formed. Also, dopant(s)/additive(s) can be incorporated into the materials. In summary, a wide range of inorganic compositions can be generated at high rates based on the approaches described herein.

Furthermore, dopant(s)/additive(s) can be introduced to vary properties of the particles, a corresponding uniform layer and/or a powder coating. Desired dopant(s)/additive(s) can be incorporated into particles/powder coating by introducing the dopant/additive element(s) into the reactant stream and selecting the reaction conditions appropriately. Alternatively or additionally, one or more dopant/additive can be contacted with the powder or powder coating following deposition but before consolidation.

For example, dopant(s)/additive(s) can be introduced to change the index-of-refraction or processing properties, e.g., flow temperature, of a material. For optical applications, the index-of-refraction can be varied to form specific optical devices that operate with light of a selected frequency range. Dopant(s)/additive(s) can also interact within the materials. For example, some dopant(s)/additive(s) can be introduced to increase the solubility of other dopant(s)/additive(s). Suitable dopant(s)/additive(s) for some applications include, for example, metal elements, metalloid elements, and combinations thereof. In addition, metal/metalloid oxides can also be doped with fluorine, chlorine, nitrogen and/or carbon, which substitute for oxygen in an oxide composition. Other dopant(s)/additive(s) can be added to change the absorption properties, emission properties, magnetic properties and/or photosensitivity, e.g., the change of index-of-refraction in response to irradiation with appropriate light. For example, rare earth dopants are desirable for their modification of optical properties of the resulting doped material. Rare earth doped glasses are useful in the production of optical amplifiers.

Amorphous particles, for example, can be formed with metal/metalloid oxide particles produced under appropriate conditions in a laser pyrolysis apparatus. Some metal/metalloid oxides are particularly desirable for optical applications and/or for their ability to anneal into uniform glass layers. Suitable glass forming host oxides for doping include, for example and without limitation, $TiO_2$, $SiO_2$, $GeO_2$, $Al_2O_3$, $P_2O_5$, $B_2O_3$, $TeO_2$, and suitable combinations and Dopants can be introduced to vary properties of the amorphous particles and/or a resulting glass layer. For example, dopants can be introduced to change the index-of-refraction of the glass. For optical applications, the index-of-refraction can be varied to form specific optical devices that operate with light of a selected frequency range. Also, a wide range of crystalline particles can be and have been produced by laser pyrolysis alone and/or with additional processing, such as a heat treatment.

To produce doped particles, appropriate precursors are directed into the flowing reactor. One or more precursors are needed to supply the one or more metal/metalloid elements that form the host composition and the appropriate precursors to supply the dopant elements. The reactant stream generally comprises the desired metal and, optionally, metalloid elements to form the host material and dopants in appropriate proportions. Metalloids are elements that exhibit chemical properties intermediate between or inclusive of metals and nonmetals. Metalloid elements include silicon, boron, arsenic, antimony, and tellurium. While phosphorous is located in the periodic table near the metal elements, it is not generally regarded as a metalloid element. However, phosphorous in the form of $P_2O_5$ is a good glass former similar to some metalloid oxides, and doped forms of $P_2O_5$ can have desirable optical properties. For convenience, as used herein including in the claims, phosphorous is also considered a metalloid element. Astatine perhaps can be considered a metalloid also, but it is highly radioactive with the longest lived isotopes having a half life of about 8 hours.

The host amorphous materials can be oxides in some embodiments. In these embodiments, an oxygen source should also be present in the reactant stream. The conditions in the reactor should be sufficiently oxidizing to produce the oxide materials.

Particles of interest in some embodiments comprise amorphous compositions that form optical glasses with a plurality of dopants. In some embodiments, the dopants are rare earth metals. Rare earth metals are particularly desirable because of their modification of optical properties of the materials. If the particles are annealed into a glass layer, the resulting material can have an index-of-refraction influenced by the rare earth dopants as well as other dopants. In addition, the rare earth dopants influence the optical absorption properties that can alter the application of the materials for the production of optical amplifiers and other optical devices. Rare earth metals include the transition metals of the group IIIb of the periodic table. Specifically, the rare earth elements include Sc, Y and the Lanthanide series. For optical glasses, the rare earth metals of particular interest as dopants include, for example, Er, Yb, Nd, La, Y, Pr and Tm. Suitable non-rare earth metal dopants include, for example, Bi, Sb, Zr, Pb, Li, Na, K, Ba, W and Ca.

The formation of doped amorphous submicron particles using a flowing reactor is described further in copending and commonly owned U.S. patent application Ser. No. 10/099,597 to Horne et al., entitled "Optical Materials and Optical Devices," incorporated herein by reference.

In other embodiments, the particles of interest are crystalline. It can be desirable to embed crystalline particles within the glass of an optical fiber. The formation of crystalline rare earth oxides and rare earth doped crystalline particles with particular optical properties are described further in copending and commonly assigned U.S. patent application Ser. No. 09/843,195 to Kumar, entitled "High Luminescence Phosphor Particles," incorporated herein by reference. The formation of other crystalline particles by laser pyrolysis is described further below.

To form the optical fiber preforms, in one embodiment particles with desired compositions can be placed within a preform structure, generally within a cavity within the preform structure. The particles can be placed within the preform structure as a powder and/or as a powder coating. Alternatively or additionally, the particles can be coated onto an insert, e.g., a glass insert, that is subsequently inserted within the preform structure. The preform structure generally can supply the basic form of the optical fiber preform. The placement of the particles, in whatever form, within the preform structure can alter the composition of at least one substructure within the eventual fiber drawn from the preform. Generally, the particles can modify the composition of a core structure within a cladding material. Alternatively, the particles can modify the composition of a cladding structure around a core structure by the proper placement of a cavity and/or an insert.

The composition of the preform structure can be selected to yield the desired cladding composition. In one embodiment, some glass from the preform structure can combine with the particles to from a structure of the material, such as a core. The composition of the particles as well as the fiber forming process can be selected to facilitate or hinder the combination of glass from the preform structure with the particles within the fiber. In some embodiments, a preform structure composition with a softening point higher than the melting point of the core powder can be formed. Submicron/nanoscale powder can be used in these embodiments since submicron/nanoscale powders tend to have lowered melting/softening points than the corresponding bulk materials. In some embodiments, melting of the core powder can form a viscous liquid that solidifies to form the glass core of the resulting fiber. The thermal expansions coefficients of the glass tube composition and the core composition can be selected to be similar enough that the fiber is not shattered upon cooling. However, larger differences between the core and cladding coefficients of thermal expansion can be tolerated in the fiber than in a block preform. Thus, forming the preform with powders can have significant compositional advantages in comparison with forming a monolithic preform.

In some embodiments, the powders within the preform structures comprise crystalline particles. The crystalline particles can be combined with amorphous glass forming particles such that the resulting structure comprises a core substantially formed from the particles within the preform structure. Alternatively or additionally, the crystalline particles can combine with glass from the preform structure to form a core with the crystalline particles embedded within glass that flows from the preform structure to embed the particles.

The overall preform and resulting fiber has a distribution of composition across the diameter of the preform. The composition gradient of one or more elements introduced with the particles can be smooth if some of the particles diffuse at the boundaries into the glass of the preform structure. Alternatively, the distribution of composition across the diameter of the resulting preform and/or fiber can be abrupt. If a glass insert, such as a rod, is placed at the center of the preform structure, such as by applying a particle coating to a glass insert and placing the coated insert in the center of the preform structure, a bimodal distribution of dopant concentrations as a function of radial distance along the preform structure diameter can be obtained. By varying the placement and/or size of the cavity or cavities within the preform structure, the distribution of the composition across the resulting preform and fiber can be adjusted.

In some embodiments, the powders can be placed within one or more cavities or the like of a fiber preform structure following formation and collection of the powders. The collected powders with selected chemical compositions are placed within the preform structure. While the powders can be poured directly into the preform structures, it may be desirable to first disperse the particles. In one suitable approach, the powders are dispersed into a fluid, e.g., a liquid, gas or other carrier having a phase different from such powder, to form a slurry for placement into the preform structure. Due to the submicron or nanoscale of the powders, direct placement of the powders into the tube may not yield desired packing densities, may result in a structure that is not homogenous and may lead to crack formation. Relatively high concentrations of particles can be achieved in the slurry dispersions. Generally, the slurry contains in the range(s) of at least about 1 weight percent, in other embodiments in the range(s) of at least about 10 weight percent, in further embodiments in the range(s) of at least about 25 weight percent particles and in additional embodiments from about 50 weight percent to about 75 weight percent. The slurry can be placed within the preform structure. Then, the fluid dispersant generally can be removed by evaporation or other forms of evacuation.

In additional or alternative embodiments, the preform structure can be placed within the product particle stream in a process analogous to light reactive deposition. The powder is directed into the preform structure following synthesis without collecting the powders separately. The deposition into the preform structure can be performed within the reaction chamber or in a separate chamber connected to the reaction chamber such that the product stream flows to the separate chamber. The formation of coatings by light reactive deposition, silicon glass deposition and optical devices are described further in copending and commonly assigned U.S. patent application Ser. No. 09/715,935 to Bi et al., entitled "COATING FORMATION BY REACTIVE DEPOSITION," incorporated herein by reference.

In another alternative or additional embodiment, an insert, such as a thin rod, is coated with powder by a coating deposition process. The insert can be rotated to form an even coating around the insert. The coated insert can then be placed within the preform structure to form the optical fiber preform.

It may be desirable to use an elongated reactant inlet oriented along the length of the rod to coat a significant portion of the rod simultaneously. Reaction chamber for forming powders with elongated reactant inlets are described further in U.S. Pat. No. 5,958,348 to Bi et al., entitled "Efficient Production Of Particles By Chemical Reaction," and U.S. Pat. No. 6,193,936 to Gardner et al., entitled "Reactant Delivery Apparatuses," both of which are incorporated herein by reference. As with other coating by light reactive deposition, the coating can be performed in the reaction chamber or a coating chamber connected to the reaction chamber.

After the powder is placed within the preform structure, the fiber can be drawn. To draw the fiber, the powder containing preform structure can be suspended in a furnace using, for example, known techniques. The furnace is heated to an appropriate temperature to soften the cladding glass for pulling into a fiber. The drawing of fibers from a particle filed tube preform is described generally in U.S. Pat. No. 6,128,430 to Chu et al., entitled "Composition For Optical Waveguide Article And Method For Making Continuous Clad Filament," incorporated herein by reference. Optical fiber preforms are described further, for example, in copending PCT application (designating the U.S.) serial number PCT/US01/45762 to Bi et al., entitled "Multilayered Optical Structures," incorporated herein by reference.

The particles introduced to form a particular optical structure within the optical fiber preform and the resulting optical fiber can be selected to have a composition to introduce desired optical properties. For example, the particles can be selected to alter the index-of-refraction. In additional embodiments, the particles can have a composition to introduce other or additional desired optical properties. For example, optical amplifiers can be used to amplify optical signals. Rare earth doped amplifiers have been very successful in achieving high gain, low noise amplification. Thus, while various dopings compositions for glass are of interest, rare earth dopants are of particular interest for the formation of optical amplifiers.

Particle Synthesis within a Reactant Flow

Laser pyrolysis has been demonstrated to be a valuable tool for the production of submicron/nanoscale particles with a wide range of particle compositions and structures alone or with additional processing. Using light reactive deposition, the particles can be deposited onto a substrate as a coating. The reactant delivery approaches described in detail below can be adapted for producing particles and/or coatings in flowing reactant systems, with or without a radiation, e.g., a light source. In some embodiments, other chemical reaction synthesis methods, as discussed above, using a flowing reactant stream, as well as other chemical synthesis methods, can be adapted for producing desired particles and/or coatings. Laser pyrolysis is a particularly appropriate approach in some applications for producing a doped particles and/or complex particle compositions because laser pyrolysis can produce highly uniform product particles at high production/deposition rates.

Flowing reactant systems generally comprise a reactant delivery apparatus that directs a flow through a reaction chamber. The reaction of the reactant flow takes place in the reaction chamber. The reaction zone may or may not be localized in a narrow region within the reaction chamber. The use of a radiation, e.g., light, beam, to drive the reaction can result in a localized reaction zone that leads to high uniformity of the particles. Beyond the reaction zone, the flow comprises product particles, unreacted reactants, reaction by-products and inert gases. The flow can continue to a collector and/or a deposition surface at which at least a portion of the product particles are harvested from the flow. Continuous supply of reactants to the flow and removal of product particles from the flow during the course of the reaction characterizes the reaction process within the flowing reactant system.

Light reactive deposition can incorporate some of the particle production features of laser pyrolysis for the production of coatings. In particular, the versatility of forming particles with a range of particle compositions and structures can be adapted for the formation of particle coatings by light reactive deposition with a comparable range in particle compositions. In general, product particles within a flowing reactant system can be deposited onto a substrate as a coating within the reaction chamber, or directed to a separate coating chamber for deposition onto a substrate, or directed to a collector for collection as a powder.

Laser pyrolysis has become the standard terminology for flowing chemical reactions driven by an intense radiation, e.g., light, with rapid quenching of product after leaving a narrow reaction region defined by the radiation. The name, however, is a misnomer in the sense that radiation from non-laser sources, such as a strong, incoherent light or other radiation beam, can replace the laser. Also, the reaction is not a pyrolysis in the sense of a thermal pyrolysis. The laser pyrolysis reaction is not solely thermally driven by the exothermic combustion of the reactants. In fact, in some embodiments, laser pyrolysis reactions can be conducted under conditions where no visible light emissions are observed from the reaction, in stark contrast with pyrolytic flames. Thus, as used herein, laser pyrolysis refers generally to a radiation-driven flowing reaction. Light reactive deposition involves comparable processes as laser pyrolysis for the particle production, although some characteristics of the flow may be altered to accommodate the coating process.

The reaction conditions can determine the qualities of the particles produced by laser pyrolysis. The reaction conditions for laser pyrolysis can be controlled relatively precisely in order to produce particles with desired properties. For example, the reaction chamber pressure, flow rates, composition and concentration of reactants, radiation intensity, radiation energy/wavelength, type and concentration of inert diluent gas or gases in the reaction stream, temperature of the reactant flow can affect the composition and other properties of the product particles, for example, by altering the time of flight of the reactants/products in the reaction zone and the quench rate. Thus, in a particular embodiment, one or more of the specific reaction conditions can be controlled. The appropriate reaction conditions to produce a certain type of particles generally depend on the design of the particular apparatus. Specific conditions used to produce selected particles in particular apparatuses are described below in the Examples. Furthermore, some general observations on the relationship between reaction conditions and the resulting particles can be made.

Increasing the light power results in increased reaction temperatures in the reaction region as well as a faster quenching rate. A rapid quenching rate tends to favor production of higher energy phases, which may not be obtained with processes near thermal equilibrium. Similarly, increasing the chamber pressure also tends to favor the production of higher energy phases. Also, increasing the concentration of the reactant serving as the oxygen source or other secondary reactant source in the reactant stream favors the production of particles with increased amounts of oxygen or other secondary reactant.

Reactant velocity of the reactant gas stream is inversely related to particle size so that increasing the reactant velocity tends to result in smaller particle sizes. A significant factor in determining particle size is the concentration of product composition condensing into product particles. Reducing the concentration of condensing product compositions generally reduces the particle size. The concentration of condensing product can be controlled by dilution with non-condensing, e.g., inert, compositions or by changing the pressure with a fixed ratio of condensing product to non-condensing compositions, with a reduction in pressure generally leading to reduced concentration and a corresponding reduction in particle size and vice versa, or by combinations thereof, or by any other suitable means.

Light power also influences particle size with increased light power favoring larger particle formation for lower melting temperature materials and smaller particle formation for higher melting temperature materials. Also, the growth dynamics of the particles have a significant influence on the size of the resulting particles. In other words, different forms of a product composition have a tendency to form different size particles from other phases under relatively similar conditions. Similarly, under conditions at which populations of particles with different compositions are formed, each population of particles generally can have its own characteristic distribution of particle sizes.

Materials of interest include amorphous materials, crystalline materials and combinations thereof. Amorphous materials possess short-range order that can be very similar to that found in crystalline materials. In crystalline materials, the short-range order comprises the building blocks of the long-range order that distinguishes crystalline and amorphous materials. In other words, translational symmetry of the short-range order building blocks found in amorphous materials creates long-range order that defines a crystalline lattice. For example, silica glass is an amorphous material comprised of $(SiO_4)^{4-}$ tetrahedra that are bonded together at irregular bond angles. The regularity of the tetrahedra provides short-range order but the irregularity of the bond angles prevents long-range order. In contrast, quartz is a crystalline silica material comprised of the same $(SiO_4)^{4-}$ tetrahedra that are bonded together at regular bond angles to form long-range order which results in a crystalline lattice. In general, the crystalline form is a lower energy state than the analogous amorphous form. This provides a driving force towards formation of long-range order. In other words, given sufficient atomic mobility and time, long-range order can form.

In laser pyrolysis, a wide range of inorganic materials can be formed in the reactive process. Based on kinetic principles, higher quench rates favor amorphous particle formation while slower quench rates favor crystalline particle formation as there is time for long-range order to develop. Faster quenches can be accomplished with a faster reactant stream velocity through the reaction zone. In addition, some precursors may favor the production of amorphous particles while other precursors favor the production of crystalline particles of similar or equivalent stoichiometry. Low laser power can also favor formation of amorphous particles. Specifically, amorphous particles can be consolidated/densified under appropriate conditions to form amorphous materials, such as optical glasses. Amorphous particles are more easily consolidated into a glass material since amorphous particles do not have a long-range order that is disrupted to form a glass. The formation of amorphous oxides is described further in U.S. Pat. No. 6,106,798 to Kambe et al., entitled "Vanadium Oxide Nanoparticles," incorporated herein by reference. Also, crystalline materials are of interest for optical and/or other applications. Crystalline particles can be consolidated into single crystalline or polycrystalline materials. While it may be easier to consolidate amorphous particles into glasses and crystalline particles into crystalline materials, crystalline particles can be consolidated into amorphous materials under appropriate consolidation conditions such as heating the particles to a temperature above the melting temperature followed by quenching at a rate that prevents long-range order formation. Amorphous particles can be consolidated into crystalline materials under appropriate consolidation conditions including the heating and cooling at rates that provide time for long-range order to develop.

To form a desired composition in the reaction process, one or more precursors supply the one or more metal/metalloid elements that form the desired composition. The reactant stream generally would include the desired metal and, additionally or alternatively, metalloid elements to form the host material and, optionally, dopant(s)/additive(s) in appropriate proportions to produce product particles with a desired composition. The composition of the reactant stream can be adjusted along with the reaction condition(s) to generate desired product particles with respect to composition and structure. Based on the particular reactants and reaction conditions, the product particles may not have the same proportions of metal/metalloid elements as the reactant stream since the elements may have different efficiencies of incorporation into the particles, i.e., yields with respect to unreacted materials. The designs of the reactant nozzles for radiation driven reactions described herein are designed for high yields with high reactant flows. Furthermore, additional appropriate precursor(s) can supply any desired dopant/additive element(s).

Laser pyrolysis has been performed generally with gas/vapor phase reactants. Many precursor compositions, such as metal/metalloid precursor compositions, can be delivered into the reaction chamber as a gas. Appropriate precursor compositions for gaseous delivery generally include compositions with reasonable vapor pressures, i.e., vapor pressures sufficient to get desired amounts of precursor gas/vapor into the reactant stream. The vessel holding liquid or solid precursor compositions can be heated (cooled) to increase (decrease) the vapor pressure of the precursor, if desired. Solid precursors generally are heated to produce a sufficient vapor pressure. A carrier gas can be bubbled through a liquid precursor to facilitate delivery of a desired amount of precursor vapor. Similarly, a carrier gas can be passed over the solid precursor to facilitate delivery of the precursor vapor. Alternatively or additionally, a liquid precursor can be directed to a flash evaporator to supply a composition at a selected vapor pressure.

The use of exclusively gas phase reactants can be challenging with respect to the types of precursor compositions that can be used conveniently. Thus, techniques have been developed to introduce aerosols containing precursors, such as metal/metalloid precursors, into laser pyrolysis chambers. Improved aerosol delivery apparatuses for flowing reaction systems are described further in U.S. Pat. No. 6,193,936 to Gardner et al., entitled "Reactant Delivery Apparatuses," incorporated herein by reference.

Using aerosol delivery apparatuses, solid precursor compositions can be delivered by dissolving the compositions in a solvent. Alternatively, powdered precursor compositions can be dispersed in a liquid/solvent for aerosol delivery. Liquid precursor compositions can be delivered as an aerosol from a neat liquid, a multiple liquid dispersion or a liquid solution. Aerosol reactants can be used to obtain a significant reactant throughput. A solvent/dispersant can be selected to achieve desired properties of the resulting solution/dispersion. Suitable solvents/dispersants include water, methanol, ethanol, isopropyl alcohol, other organic solvents and mixtures thereof. The solvent should have a desired level of purity such that the resulting particles have a desired purity level. Some solvents, such as isopropyl alcohol, are significant absorbers of infrared light from a $CO_2$ laser such that no additional light absorbing composition may be needed within the reactant stream if a $CO_2$ laser is used as a light source.

If precursors are delivered as an aerosol with a solvent present, the solvent generally can be rapidly evaporated by the radiation (e.g., light) beam in the reaction chamber such that a gas phase reaction can take place. The resulting particles are not generally highly porous, in contrast to other approaches based on aerosols in which the solvent cannot be driven off rapidly. Thus, the fundamental features of the laser pyrolysis reaction can be unchanged by the presence of an aerosol. Nevertheless, the reaction conditions are affected by the presence of the aerosol. Below in the Examples, conditions are described for the production of submicron/nanoscale particles using aerosol precursors in laser pyrolysis reaction chambers. Thus, the parameters associated with aerosol reactant delivery can be explored further based on the description below.

The precursor compositions for aerosol delivery are dissolved in a solution generally with a concentration in the range(s) greater than about 0.1 molar. Generally, increasing the concentration of precursor in the solution increases the throughput of reactant through the reaction chamber. As the concentration increases, however, the solution can become more viscous such that the aerosol may have droplets with larger sizes than desired. Thus, selection of solution concentration can involve a balance of factors in the selection of a suitable solution concentration.

For embodiments involving a plurality of metal/metalloid elements, the metal/metalloid elements can be delivered all as vapor, all as aerosol or as any combination thereof. If a plurality of metal/metalloid elements is delivered as an aerosol, the precursors can be dissolved/dispersed within a single solvent/dispersant for delivery into the reactant flow as a single aerosol. Alternatively, the plurality of metal/metalloid elements can be delivered within a plurality of solutions/dispersions that are separately formed into an aerosol. The generation of a plurality of aerosols can be helpful if convenient precursors are not readily soluble/dispersible in a common solvent/dispersant. The plurality of aerosols can be introduced into a common gas flow for delivery into the reaction chamber through a common nozzle. Alternatively, a plurality of reactant inlets can be used for the separate delivery of aerosol and/or vapor reactants into the reaction chamber such that the reactants mix within the reaction chamber prior to entry into the reaction zone. Exemplary reactant delivery apparatuses are described further below.

In addition, for the production of highly pure materials, it may be desirable to use a combination of vapor and aerosol reactants. Vapor/gas reactants generally can be supplied at higher purity than is generally available at reasonable cost for aerosol delivered compositions. This can be particular convenient for the formation of doped optical glasses. For example, very pure silicon can be delivered in an easily vaporizable form, such as silicon tetrachloride. At the same time, some elements, especially rare earth dopant(s)/additive(s), cannot be conveniently delivered in vapor form. Thus, in some embodiments, a majority of the material for the product compositions can be delivered in vapor/gas form while other elements are delivered in the form of an aerosol. The vapor and aerosol can be combined for reaction, among other ways, following delivery through a single reactant inlet or a plurality of inlets.

The particles, in some embodiments, further comprise one or more non-(metal/metalloid) elements. For example, several compositions of interest are oxides. Thus, an oxygen source should also be present in the reactant stream. The oxygen source can be the metal/metalloid precursor itself if it comprises one or more oxygen atoms or a secondary reactant can supply the oxygen. The conditions in the reactor should be sufficiently oxidizing to produce the oxide materials.

In particular, secondary reactants can be used in some embodiments to alter the oxidizing/reducing conditions within the reaction chamber and/or to contribute non-metal/metalloid elements or a portion thereof to the reaction products. Suitable secondary reactants serving as an oxygen source include, for example, $O_2$, CO, $H_2O$, $CO_2$, $O_3$ and the like and mixtures thereof. Molecular oxygen can be supplied as air. In some embodiments, the metal/metalloid precursor compositions comprise oxygen such that all or a portion of the oxygen in product particles is contributed by the metal/metalloid precursors. Similarly, liquids used as a solvent/dispersant for aerosol delivery can similarly contribute secondary reactants, e.g., oxygen, to the reaction. In other words, if one or more metal/metalloid precursors comprise oxygen and/or if a solvent/dispersant comprises oxygen, a separate secondary reactant, e.g., a vapor reactant, may not be needed to supply oxygen for product particles. Other secondary reactants of interest are described below.

In one embodiment, a secondary reactant composition should not react significantly with the metal/metalloid precursor(s) prior to entering the radiation reaction zone since this can result in the formation of larger particles and/or damage the inlet nozzle. Similarly, if a plurality of metal/metalloid precursors is used, these precursors should not significantly react prior to entering the radiation reaction zone. If the reactants are spontaneously reactive, a metal/metalloid precursor and the secondary reactant and/or different metal/metalloid precursors can be delivered in separate reactant inlets into the reaction chamber such that they are combined just prior to reaching the light beam.

Laser pyrolysis can be performed with radiation at a variety of optical frequencies, using either a laser or other intense light source. Convenient light sources operate in the infrared portion of the electromagnetic spectrum, although other wavelengths can be used, such as the visible and infrared regions of the spectrum. Excimer lasers can be used as ultraviolet sources. $CO_2$ lasers are particularly useful sources of infrared light. Infrared absorber(s) for inclusion in the reactant stream include, for example, $C_2H_4$, isopropyl alcohol, $NH_3$, $SF_6$, $SiH_4$ and $O_3$. $O_3$ can act as both an infrared absorber and as an oxygen source. The radiation absorber(s), such as the infrared absorber(s), can absorb energy from the radiation beam and distribute the energy to the other reactants to drive the pyrolysis.

Generally, the energy absorbed from the radiation beam, e.g., light beam, increases the temperature at a tremendous rate, many times the rate that heat generally would be produced by exothermic reactions under controlled condition(s). While the process generally involves nonequilibrium conditions, the temperature can be described approximately based on the energy in the absorbing region. The laser pyrolysis process is qualitatively different from the process in a combustion reactor where an energy source initiates a reaction, but the reaction is driven by energy given off by an exothermic reaction. Thus, while the light driven process is referred to as laser pyrolysis, it is not a traditional pyrolysis since the reaction is not driven by energy given off by the reaction but by energy absorbed from a radiation beam. In particular, spontaneous reaction of the reactants generally does not proceed significantly, if at all, back down the reactant flow toward the nozzle from the intersection of the radiation beam with the reactant stream. If necessary, the flow can be modified such that the reaction zone remains confined as desired.

An inert shielding gas can be used to reduce the amount of reactant and product molecules contacting the reactant chamber components. Inert gases can also be introduced into the reactant stream as a carrier gas and/or as a reaction moderator. Appropriate inert gases generally include, for example, Ar, He and $N_2$.

The particle production rate based on improved reactant delivery configurations described below can yield particle production rates in the range(s) of at least about 50 g/h, in other embodiments in the range(s) of at least about 100 g/h, in further embodiments in the range(s) of at least about 250 g/h, in additional embodiments in the range(s) of at least about 1 kilogram per hour (kg/h) and in general up in the range(s) up to at least about 10 kg/h. In general, these high production rates can be achieved while obtaining relatively high reaction yields, as evaluated by the portion of metal/metalloid nuclei in the flow that are incorporated into the product particles. In general, the yield can be in the range(s) of at least about 30 percent based on the limiting reactant, in other embodiments in the range(s) of at least about 50 percent, in further embodiments in the range(s) of at least about 65 percent, in other embodiments in the range(s) of at least about 80 percent and in additional embodiments in the range(s) of at least about 95 percent based on the metal/metalloid nuclei in the reactant flow. A person of ordinary skill in the art will recognize that additional values of particle production rate and yield within these specific values are contemplated and are within the present disclosure.

Compositions of Particles and Coatings

A variety of particles can be produced by laser pyrolysis. Adaptation of laser pyrolysis for the performance of light reactive deposition can be used to produce coatings of comparable compositions as the particles with selected compositions that can be produced by laser pyrolysis. Specifically, the compositions can include one or more metal/metalloid elements forming a crystalline or amorphous material with an optional dopant or additive composition. In addition, dopant(s)/additive(s) can be used to alter the optical, chemical and/or physical properties of the particles. Generally, the powders comprise fine or ultrafine particles with particle sizes in the submicron/nanometer range. The particles may or may not partly fuse or sinter during the deposition while forming a powder coating. To form a densified material, a powder coating can be consolidated. Incorporation of the dopant(s)/additive(s) into the powder coating, during its formation or following its formation, results in a distribution of the dopant(s)/additive(s) through the densified material.

In general, the submicron/nanoscale particles, as a particle collection or a powder coating, can generally be characterized as comprising a composition including a number of different elements and present in varying relative proportions, where the number and the relative proportions can be selected as a function of the application for the particles. Typical numbers of different elements include, for example, numbers in the range(s) from about 2 elements to about 15 elements, with numbers of 1, 2, 3, 4, 5, 6, 7, 8, 9, 10, 11, 12, 13, 14, and 15 being contemplated, in which some or all of the elements can be metal/metalloid element. General numbers of relative proportions include, for example, values in the range(s) from about 1 to about 1,000,000, with numbers of about 1, 10, 100, 1000, 10000, 100000, 1000000, and suitable sums thereof being contemplated. In addition, elemental materials are contemplated in which the element is in its elemental, un-ionized form, such as a metal/metalloid element, i.e., $M^o$.

Alternatively or additionally, such submicron/nanoscale particles can be characterized as having the following formula:

$$A_a B_b C_c D_d E_e F_f G_g H_h I_i J_j K_k L_l M_m N_n O_o,$$

where each A, B, C, D, E, F, G, H, I, J, K, L, M, N, and O is independently present or absent and at least one of A, B, C, D, E, F, G, H, I, J, K, L, M, N, and O is present and is independently selected from the group consisting of elements of the periodic table of elements comprising Group 1A elements, Group 2A elements, Group 3B elements (including the lanthanide family of elements and the actinide family of elements), Group 4B elements, Group 5B elements, Group 6B elements, Group 7B elements, Group 8B elements, Group 1B elements, Group 2B elements, Group 3A elements, Group 4A elements, Group 5A elements, Group 6A elements, and Group 7A elements; and each a, b, c, d, e, f, g, h, i, j, k, l, m, n, and o is independently selected and stoichiometrically feasible from a value in the range(s) from about 1 to about 1,000,000, with numbers of about 1, 10, 100, 1000, 10000, 100000, 1000000, and suitable sums thereof being contemplated. In other words, the elements can be any element from the periodic table other than the noble gases. Elements from the groups Ib, IIb, IIIb, IVb, Vb, VIb, VIIb and VIIIb are referred to as transition metals. In addition to the alkali metals of group I, the alkali earth metals of group II and the transition metals, other metals include, for example, aluminum, gallium, indium, thallium, germanium, tin, lead, bismuth and polonium. The non-metal/metalloid elements include hydrogen, the noble gases, carbon, nitrogen, oxygen, fluorine, sulfur, chlorine, selenium, bromine, and iodine. As described herein, all inorganic compositions are contemplated, as well as all subsets of inorganic compounds as distinct inventive groupings, such as all inorganic compounds or combinations thereof except for any particular composition, group of compositions, genus, subgenus, alone or together and the like.

While some compositions are described with respect to particular stoichiometries/compositions, stoichiometries generally are only approximate quantities. In particular, materials can have contaminants, defects and the like. Similarly, some amorphous materials can comprise essentially blends such that the relative amounts of different components are continuously adjustable over ranges in which the materials are miscible. In other embodiments, phase separated amorphous materials can be formed with differing compositions at different domains due to immiscibility of the materials at the average composition.

Furthermore, for amorphous and crystalline materials in which metal/metalloid compounds have a plurality of oxidation states, the materials can comprise a plurality of oxidation states. Thus, when stoichiometries are described herein, the actual materials may comprise other stoichiometries of the same elements also, such as $SiO_2$ also include some SiO and the like.

In some embodiments, such as for optical materials, powders comprise as a host material, for example, silicon particles, metal particles, and metal/metalloid compositions, such as, metal/metalloid oxides, metal/metalloid carbides, metal/metalloid nitrides, metal/metalloid phosphides, metal/metalloid sulfides, metal/metalloid tellurides, metal/metalloid selenides, metal/metalloid arsinides and mixtures and combinations thereof. Especially in amorphous materials, great varieties of elemental compositions are possible within a particular material. While laser pyrolysis is versatile with respect to the production of particles, with a wide range of compositions, in one embodiment, certain host materials for the introduction of dopant(s)/additive(s) are desirable because of their particular ability to be processed into glass layers and/or their desirability for optical materials that are processable into optical devices. For optical materials, some materials of particular interest comprise, for example, silicon oxide (silica), phosphate glasses, germanium oxide, aluminum oxide, indium phosphide, lithium niobate, lithium tantalate, telluride glasses, aluminum oxide, titanium oxide, gallium arsenide, combinations thereof and doped versions thereof. Some metal/metalloid oxides are particularly desirable for optical applications and/or for their ability to consolidate into uniform glass layers. Suitable glass forming host oxides for doping include, for example, $TiO_2$, $SiO_2$, $GeO_2$, $Al_2O_3$, $P_2O_5$, $B_2O_3$, $TeO_2$, $CaO—Al_2O_3$, $V_2O_5$, $BiO_2$, $Sb_2O_5$ and combinations and mixtures thereof. Other metal/metalloid oxides have desirable optical properties in crystalline form, such as $LiNbO_3$, $LiTaO_3$, $Y_3Al_5O_{12}$ (YAG) and rare earth, especially Nd, doped YAG. The approaches described herein for particle formation and coating formation are particularly suitable for formation of metal/metalloid oxide particles with or without dopant(s)/additive(s). Similarly, laser pyrolysis and light reactive deposition are suitable approaches for producing particle collections and powder coatings for the non-oxide materials, as described further below.

In addition, particles and powder coatings can include one or more dopants/additives within an amorphous material and/or a crystalline material. Dopant(s)/additive(s), which can be complex blends of dopant/additive composition(s), generally are included in non-stoichiometric amounts. A dopant/additive is generally metal or metalloid element, although other dopant(s)/additive(s) of interest include fluorine, chlorine, nitrogen and/or carbon, which substitute for oxygen in oxides or other anions relative to metal/metalloid components. Since these anion dopant(s)/additive(s), like some cation dopants, tend to disrupt the oxygen bonded network of oxides, these tend to lower the flow temperature of oxide glasses, and these dopant(s)/additive(s) tend to lower the index-of-refraction and the dielectric constant. The dopant(s)/additive(s) generally can replace other constituents within the material in order to maintain overall electrical neutrality. Dopant(s)/additive(s) can impart desirable properties to the resulting materials. The amount of dopant(s)/additive(s) can be selected to yield desired properties while maintaining appropriate chemical stability to the material. In crystalline materials, dopant/additive element(s) can replace host elements at lattice sites, dopant/additive element(s) can reside at previously unoccupied lattice sites and/or dopant/additive element(s) can be located at interstitial sites. Unlike dopant(s)/additive(s) within crystalline materials in which the crystal structure influences incorporation of the dopant(s)/additive(s), dopant(s)/additive(s) within amorphous materials can behave more as a composition dissolved within the host material to form a solid mixture. Thus, the overall composition of the material influences the chemical properties, including the processing parameters and stability, of the resulting combined materials. Solubility of dopant(s)/additive(s) within a host amorphous material can influence the amount of a particular dopant/additive that can be homogeneously integrated into a consolidated glass.

A dopant, such as a rare earth dopant, generally comprises in the range(s) less than about 15 mole percent of the metal/metalloid in the composition, in further embodiments in the range(s) less than about 10 mole percent, in some embodiments in the range(s) from about 0.001 mole percent to about 5 mole percent, and in other embodiments in the range(s) from about 0.025 to about 1 mole percent of the metal/metalloid in the composition. A person of ordinary skill in the art will recognize that the present disclosure similarly covers ranges within these specific ranges. Additive compositions are similar to dopant compositions except that they generally are included at higher amounts while still being a minority component of the composition, i.e., in the range(s) less than about 50 mole percent of the composition. For amorphous materials, additive(s) can be modifiers or intermediate compositions between glass formers and modifiers. Modifiers can disrupt the oxygen network within an oxide glass to modify the glass properties, such as flow temperature, coefficient of thermal expansion, chemical durability and the index-of-refraction. Thus, additive(s) can be useful for many of the same purposes as dopant(s). Doped and doping, for convenience, can refer to materials with dopants and/or additives and the process of incorporating dopants and/or additives, respectively. Suitable dopant(s)/additive(s) include, for example, metal/metalloid elements, such as rare earth metals. Rare earth dopants can impart desirable modifications of properties, such as index-of-refraction, photosensitivity, fluorescence and paramagnetism.

Powders and coatings, e.g., glass layers, can be formed with complex compositions including, for example, one or more metal/metalloid elements in a host material and, optionally, one or more selected dopants/additives in the amorphous host material. Similarly, crystalline materials can be formed with dopant(s)/additive(s) within a crystalline host material. The doped materials can be formed by directly depositing particles to form a powder coating using light reactive deposition and subsequently consolidating the powder coating into a uniform layer of a glass, polycrystalline or crystalline material. Alternatively, any dopant(s)/additive(s) can be introduced to a powder coating following its formation for incorporation into a consolidated uniform material, as described further below.

Submicron/nanoscale particles can be produced with complex compositions using laser pyrolysis and light reactive deposition. Materials can be formed with desired compositions by appropriately introducing a reactant composition to form the desired host material. The elements that modify the composition, such as elements introduced in approximately stoichiometric amounts as well as dopant(s)/additive(s), can be introduced into an appropriate host material, which can be particle collections or powder coatings, either during the formation of the host material or subsequent to formation of the particles/powder coating. Specifically, selected elements can be introduced at desired amounts by varying the composition of the reactant stream. The conditions in the reactor can also be selected to produce the desired materials. In alternative embodiments, a modifying element is applied to an already formed particle collection or powder coating in proportion to the desired levels for the ultimate composition. Upon heat treatment, the desired composition is formed. Heat treatments to introduce modifying elements are described further below.

With respect to glasses, while a variety of materials are of interest, silica ($SiO_2$)-based glasses are of interest due to their existing commercial applications. Other glass forming materials that are suitable for combining with silica to form amorphous host materials include, for example, $Al_2O_3$, $Na_2O$, $B_2O_3$, $P_2O_3$, $GeO_2$, and the like and combinations thereof. Thus, a plurality forming compositions can be combined to form a blended glass host composition with desired properties, such as index-of-refraction and glass transition temperature. The blended glass host materials can be doped with further materials to further adjust the properties of the material.

A wide range of silica glass compositions have significant optical applications or potential optical applications. Generally, these silica glasses can be formed by light reactive deposition based on the description herein. The silica glass generally is combined with other glass forming compositions to alter the optical properties, such as index-of-refraction, and or alter the processing properties, such as lowering the flow temperature.

Dopant(s)/additive(s) can be introduced to vary properties, such as optical properties and physical properties, of the particles and/or a resulting layer of particles with or without consolidation. For example, dopant(s)/additive(s) can be introduced to change the index-of-refraction of the material. For optical applications, the index-of-refraction can be varied to form specific optical devices that operate with light of a selected frequency range. Dopant(s)/additive(s) can also be introduced to alter the processing properties of the material. In particular, some dopant(s)/additive(s) change the flow temperature, i.e., the glass transition temperature, such that the glass can be processed at lower temperatures. Dopants/additives can also interact within the materials. For example, some dopant(s)/additive(s), such as $P_2O_5$ and $Al_2O_3$, are introduced to increase the solubility of other dopant(s)/additive(s). Doped materials are useful in the production of optical devices. Using the techniques described herein, the doped materials can be formulated into planar optical devices.

In one aspect, particles of interest comprise amorphous compositions that form optical glasses with a plurality of dopants/additives. In some embodiments, the one or plurality of dopants/additives comprise rare earth metals. Rare earth metals are particularly desirable because of their modification of optical properties of the materials. If the particles are consolidated into a substantially uniform layer, the resulting material can have an index-of-refraction influenced by the rare earth dopant(s)/additive(s) as well as other dopant(s)/additive(s). In addition, the rare earth dopant(s)/additive(s) can influence the optical emission properties that can alter the application of the materials for the production of optical amplifiers and other optical devices. Rare earth metals comprise the transition metals of the group IIIb of the periodic table. Specifically, the rare earth elements comprise Sc, Y and the Lanthanide series. Other suitable dopant(s)/additive(s) include elements of the actinide series. For optical glasses, the rare earth metals of interest as dopants/additives comprise Er, Yb, Nd, La, Ce, Th, Dy, Ho, Sm, Eu, Gd, Pr, Tm, Sc, Y, and the like and combinations thereof. Suitable non-rare earth metal dopants/additives include, for example, Al, Ga, Mg, Sr, Zn, Bi, Sb, Zr, Pb, Li, Na, K, Ba, W, Si, Ge, P, B, Te, Ca, Rb, Sn, In, Ti, Au, Ag, Ta, Mo, Nb, and the like and combinations thereof. Also, certain first-row transition metals have optical emission properties in the visible or infrared regions of the spectrum. Suitable first-row transition element having desirable optical properties as dopants/additives include, for example, V, Cr, Mn, Fe, Co, Ni and Cu. The wavelength of the optical emission depends on the oxidation-state of the transition-metal. This oxidation state generally can be controlled by adjusting the oxygen partial-pressure during the consolidation process.

Various materials have been formed as submicron/nanoscale particles using laser pyrolysis. Some of these materials are described in the following description. Using light reactive deposition, these materials can be formed directly as coatings in the form of powder coatings. Based on the description and examples herein, a range of additional materials can be produced by laser pyrolysis and light reactive deposition. Specifically, suitable approaches for the formation of some improved materials are outlined below.

For example, the production of silicon oxide submicron/nanoscale particles is described in copending and commonly assigned U.S. patent application Ser. No. 09/085,514 to Kumar et al., entitled "Silicon Oxide Particles," incorporated herein by reference. This patent application describes the production of amorphous $SiO_2$. The production of titanium oxide submicron/nanoscale particles and crystalline silicon dioxide submicron/nanoscale particles is described in U.S. Pat. No. 6,387,531 to Bi et al., entitled "Metal (Silicon) Oxide/Carbon Composites," incorporated herein by reference. In particular, this application describes the production of anatase and rutile $TiO_2$.

In addition, submicron/nanoscale manganese oxide particles have been formed. The production of these particles is described in copending and commonly assigned U.S. patent application Ser. No. 09/188,770 to Kumar et al., entitled "Metal Oxide Particles," incorporated herein by reference. This application describes the production of MnO, $Mn_2O_3$, $Mn_3O_4$ and $Mn_5O_8$.

Also, the production of vanadium oxide submicron/nanoscale particles is described in U.S. Pat. No. 6,106,798 to Bi et al., entitled "Vanadium Oxide Nanoparticles," incorporated herein by reference. Similarly, silver vanadium oxide submicron/nanoscale particles have been produced, as described in U.S. Pat. No. 6,225,007 to Horne et al., and U.S. Pat. No. 6,394,494 to Reitz et al., both entitled "Metal Vanadium Oxide Particles," and Ser. No. 09/649,752 to Ghantous et al., entitled "High Rate Batteries," all three of which are incorporated herein by reference.

Furthermore, lithium manganese oxide submicron/nanoscale particles have been produced by laser pyrolysis along with or without subsequent heat processing, as described in copending and commonly assigned U.S. patent application Ser. No. 09/188,768 to Kumar et al., entitled "Composite Metal Oxide Particles," and Ser. No. 09/334,203 to Kumar et al., entitled "Reaction Methods for Producing Ternary Particles," and U.S. Pat. No. 6,136,287 to Horne et al., entitled "Lithium Manganese Oxides and Batteries," all three of which are incorporated herein by reference. The production of lithium cobalt oxide, lithium nickel oxide, lithium cobalt nickel oxide, lithium titanium oxide and other lithium metal oxides is described in copending and commonly assigned U.S. patent application Ser. No. 09/595,958 to Kumar et al., entitled "Lithium Metal Oxides," incorporated herein by reference.

The production of aluminum oxide submicron/nanoscale particles is described in copending and commonly assigned, U.S. patent application Ser. No. 09/136,483 to Kumar et al., entitled "Aluminum Oxide Particles," incorporated herein by reference. In particular, this application discloses the production of γ-$Al_2O_3$. The formation of delta-$Al_2O_3$ and theta-$Al_2O_3$ by laser pyrolysis/light reactive deposition along with doped-crystalline and amorphous alumina is described in copending and commonly assigned U.S. patent application Ser. No. 09/969,025 to Chiruvolu et al., entitled "Aluminum Oxide Powders," incorporated herein by reference.

Amorphous aluminum oxide materials can be combined with other glass formers, such as $SiO_2$ and/or $P_2O_5$. For example, suitable metal oxide dopant(s)/additive(s) for aluminum oxide for optical glass formation comprise cesium oxide ($Cs_2O$), rubidium oxide ($Rb_2O$), thallium oxide ($Tl_2O$), lithium oxide ($Li_2O$), sodium oxide ($Na_2O$), potassium oxide ($K_2O$), beryllium oxide (BeO), magnesium oxide (MgO), calcium oxide (CaO), strontium oxide (SrO), barium oxide (BaO), and the like and combinations of any two or more thereof. Glass dopant(s)/additive(s) can affect, for example, the index-of-refraction, consolidation temperature and/or the porosity of the glass. Suitable metal oxide dopants/additives for infrared emitters comprise, for example, cobalt oxide ($Co_3O_4$), $Er_2O_3$, $CrO_2$, $Tm_2O_3$, $Nd_2O_3$, $Yb_2O_3$, $Pr_2O_3$, $Dy_2O_3$, $Ho_2O_3$, and the like, and combinations of any two or more thereof.

In addition, tin oxide submicron/nanoscale particles have been produced by laser pyrolysis, as described in U.S. Pat. No. 6,200,674 to Kumar et al., entitled "Tin Oxide Particles," incorporated herein by reference. The production of zinc oxide submicron/nanoscale particles is described in copending and commonly assigned U.S. patent application Ser. No. 09/266,202 to Reitz, entitled "Zinc Oxide Particles," incorporated herein by reference. In particular, the production of ZnO submicron/nanoscale particles is described.

Submicron/nanoscale particles and corresponding coatings of rare earth metal oxide particles, rare earth doped metal/metalloid oxide particles, rare earth metal/metalloid sulfides and rare earth doped metal/metalloid sulfides are described in copending and commonly assigned U.S. patent application Ser. No. 09/843,195 to Kumar et al, entitled "High Luminescence Phosphor Particles," incorporated herein by reference. Suitable host materials for the formation of phosphors comprise ZnO, ZnS, $Zn_2SiO_4$, SrS, $YBO_3$, $Y_2O_3$, $Al_2O_3$, $Y_3Al_5O_{12}$ and $BaMgAl_{14}O_{23}$, and combinations of any two or more thereof. Exemplary non-rare earth metals for activating phosphor particles as dopant(s)/additive(s) include, for example, manganese, silver, lead, and the like and combinations thereof. Exemplary rare earth metals for forming metal oxide phosphors include, for example, europium, cerium, terbium, erbium and the like and combinations thereof. Generally, heavy metal ions or rare earth ions are used as activators in phosphors. For phosphor applications, the particles are generally crystalline.

The production of iron, iron oxide and iron carbide is described in a publication by Bi et al., entitled "Nanocrystalline α-Fe, $Fe_3C$, and $Fe_7C_3$ produced by $CO_2$ laser pyrolysis," J. Mater. Res. Vol. 8, No. 7 1666–1674 (July 1993), incorporated herein by reference. The production of submicron/nanoscale particles of silver metal is described in U.S. Pat. No. 6,394,494 to Reitz et al., entitled "Metal Vanadium Oxide Particles," incorporated herein by reference. Submicron/nanoscale carbon particles produced by laser pyrolysis is described in a reference by Bi et al., entitled "Nanoscale carbon blacks produced by $CO_2$ laser pyrolysis," J. Mater. Res. Vol. 10, No. 11, 2875–2884 (November 1995), incorporated herein by reference.

The production of iron sulfide ($Fe_{1-x}S$) submicron/nanoscale particles by low rate laser pyrolysis is described in Bi et al., Material Research Society Symposium Proceedings, vol. 286, p. 161–166 (1993), incorporated herein by reference. Precursors for laser pyrolysis production of iron sulfide were iron pentacarbonyl ($Fe(CO)_5$) and hydrogen sulfide ($H_2S$). Other suitable gaseous sulfur precursors for vapor delivery comprise, for example, pyrosulfuryl chloride ($S_2O_5Cl_2$), sulfur chloride ($S_2Cl_2$), sulfuryl chloride ($SO_2Cl_2$), thionyl chloride ($SOCl_2$), and the like, and combinations of any two or more thereof Suitable sulfur precursors for aerosol delivery comprise, for example, ammonium sulfate (($NH_4)_2S$), sulfuric acid ($H_2SO_4$), and the like, and any combinations thereof, which are soluble in water. Other metal/metalloid sulfide materials can be similarly produced.

Metal borates can be similarly formed using one or more metal precursors and a boron precursor. As a specific example, $TiB_2$ has potential utility in battery applications. Suitable titanium precursors include, for example, titanium tetrachloride ($TiCl_4$), titanium isopropoxide ($Ti[OCH(CH_3)_2]_4$), and the like, and combinations of any two or more thereof. Suitable boron precursors comprise, for example, boron trichloride ($BCl_3$), diborane ($B_2H_6$), $BH_3$, and the like, and combinations of any two or more thereof.

Cerium oxide can be produced using the laser pyrolysis apparatuses described above. Suitable precursors for aerosol delivery comprise, for example, cerous nitrate ($Ce(NO_3)_3$), cerous chloride ($CeCl_3$), cerous oxalate ($Ce_2(C_2O_4)_3$), and the like, and combinations of any two or more thereof. Similarly, zirconium oxide can be produced using the laser pyrolysis apparatuses described above. Suitable zirconium precursors for aerosol delivery comprise, for example, zirconyl chloride ($ZrOCl_2$), zirconyl nitrate ($ZrO(NO_3)_2$), and the like, and combinations of any two or more thereof.

The deposition of coatings of dielectric materials for chip capacitors is described in copending and commonly assigned U.S. patent application Ser. No. 10/219,019 to Bryan, entitled "Reactive Deposition For The Formation Of Chip Capacitors," incorporated herein by reference. Suitable dielectric materials include a majority of barium titanate ($BaTiO_3$), optionally mixed with other metal oxides. Other dielectric oxides suitable for incorporation into ceramic chip capacitors with appropriate dopant(s)/additive(s) comprise, for example, $SrTiO_3$, $CaTiO_3$, $SrZrO_3$, $CaZrO_3$, $Nd_2O_3$-$2TiO_3$, $La_2O_3$-$2TiO_2$, and the like, and any two or more thereof.

The production of ternary submicron/nanoscale particles of aluminum silicate and aluminum titanate can be performed by laser pyrolysis following procedures similar to the production of silver vanadium oxide submicro/nanoscale particles described in U.S. Pat. No. 6,394,494 to Reitz et al., entitled "Metal Vanadium Oxide Particles," incorporated herein by reference. Suitable precursors for the production of aluminum silicate comprise, for vapor delivery, a mixture of aluminum chloride ($AlCl_3$), silicon tetrachloride ($SiCl_4$), and the like, and combinations thereof, and, for aerosol delivery, a mixture of tetra(N-butoxy) silane and aluminum isopropoxide ($Al(OCH(CH_3)_2)_3$), a mixture of tetraethoxysilane and aluminum nitrate, or tetraethoxysilane and aluminum chloride, or tetraethoxysilane and aluminum isopropoxide, and the like, and combinations of any two or more thereof. Similarly, suitable precursors for the production of aluminum titanate comprise, for aerosol delivery, a mixture of aluminum nitrate ($Al(NO_3)_3$) and titanium dioxide ($TiO_2$) powder dissolved in sulfuric acid, a mixture of aluminum isopropoxide and titanium isopropoxide ($Ti(OCH(CH_3)_2)_4$), and the like, and combinations of any two or more thereof.

The formation of submicron/nanoscale particles along with coatings of metal/metalloid compositions with complex anions is described in copending and commonly assigned U.S. patent application Ser. No. 09/845,985 to Chaloner-Gill et al., entitled "Phosphate Powder Compositions And Methods For Forming Particles With Complex Anions," incorporated herein by reference. Suitable polyatomic anions comprise, for example, phosphate ($PO_4^{-3}$), sulfate ($SO_4^{-2}$), silicate ($SiO_4^{-4}$), and the like, and combinations of any two or more thereof. Suitable phosphorous precursors for forming the phosphate anion, sulfur precursors for forming the sulfate anion and silicon precursors for forming the silicate anion are discussed above. Suitable cations comprise, for example, metal and metalloid cations. Phosphate glasses can be used in a variety of contexts. Phosphate compositions for glasses comprise, for example, aluminum phosphate ($AlPO_4$), calcium phosphate ($Ca_3(PO_4)_2$), and the like, and combinations of any two or more thereof. Suitable gaseous phosphate precursor compositions for vapor delivery comprise, for example, phosphine ($PH_3$), phosphorus trichloride ($PCl_3$), phosphorous pentachloride ($PCl_5$), phosphorus oxychloride ($POCl_3$), $P(OCH_3)_3$, and the like, and combinations of any two or more thereof. Suitable phosphorous precursors for aerosol delivery comprise, for example, $(C_2H_5O)_3P$, $(C_2H_5O)_3PO$, ammonium phosphate (($NH_4)_3PO_4$), ammonium phosphate—dibasic (($NH_4)_2HPO_4$), ammonium phosphate—monobasic (($NH_4)H_2PO_4$), phosphoric acid ($H_3PO_4$), and the like, and combinations of any two or more thereof, which are all moderately soluble in water.

The synthesis by laser pyrolysis of silicon carbide and silicon nitride is described in copending and commonly assigned U.S. patent application Ser. No. 09/433,202 to Reitz et al., entitled "Particle Dispersions," incorporated herein by reference. Other metal/metalloid carbides and metal/metalloid nitrides can be similarly produced.

The formation of a powder coating comprising boron and phosphorous doped amorphous silica ($SiO_2$) is described in copending and commonly assigned U.S. patent application Ser. No. 09/715,935 to Bi et al. entitled "Coating Formation By Reactive Deposition," incorporated herein by reference. The doped silica powder coating was consolidated into a glass layer. Rare earth metal and other dopants for amorphous particles and powder coatings as well as complex glass compositions for powder coatings, and in particular, erbium doped aluminum silicate and aluminum-lanthanum-silicate powder coatings and glasses, are described in copending and commonly assigned U.S. patent application Ser. No. 10/099,597 to Horne et al., filed on Mar. 15, 2002, entitled "Optical Materials And Optical Devices," incorporated herein by reference.

For some host glass forming materials and/or dopant(s)/additive(s) of particular interest for optical applications, suitable precursors can be described as a representative listing of precursor materials. Such a representative list follows.

Suitable silicon precursors for vapor delivery comprise, for example, silicon tetrachloride ($SiCl_4$), trichlorosilane ($Cl_3HSi$), trichloromethyl silane $CH_3SiCl_3$, tetraethoxysilane ($Si(OC_2H_5)_4$, also known as ethyl silane and tetraethyl silane), and the like, and combinations of any two or more thereof. Suitable boron precursors comprise, for example, boron trichloride ($BCl_3$), diborane ($B_2H_6$), $BH_3$, and the like, and combinations of any two or more thereof. Suitable phosphate precursor compositions for vapor delivery comprise, for example, phosphine ($PH_3$), phosphorus trichloride ($PCl_3$), phosphorous pentachloride ($PCl_5$), phosphorus oxychloride ($POCl_3$), $P(OCH_3)_3$, and the like, and combinations of any two or more thereof. Suitable germanium precursors comprise, for example, $GeCl_4$, and the like, and combinations of any two or more thereof. Suitable titanium precursors comprise, for example, titanium tetrachloride ($TiCl_4$), titanium isopropoxide ($Ti[OCH(CH_3)_2]_4$), and the like, and combinations of any two or more thereof. Suitable liquid, aluminum precursors comprise, for example, aluminum s-butoxide ($Al(OC_4H_9)_3$), trimethyl aluminum ($Al(CH_3)_3$), trimethyl ammonia aluminum $Al(CH_3)_3NH_3$, and the like, and combinations of any two or more thereof. A number of suitable solid, aluminum precursor compositions are available, such compositions comprising, for example, aluminum chloride ($AlCl_3$), aluminum ethoxide ($Al(OC_2H_5)_3$), aluminum isopropoxide ($Al[OCH(CH_3)_2]_3$), and the like, and combinations of any two or more thereof. Suitable tellurium precursors comprise, for example, $Te(C_2H_5)_2$, $Te(CH_3)_2$, $Te(C_3H_7)_2$, $Te(C_4H_9)_2$, $Te(C_3H_4)_2$, $Te(CH_3C_3H_4)_2$, and the like, and combinations of any two or more thereof.

With respect to rare earth metal precursors, suitable precursors for vapor delivery include, for example, erbium heptafluorodimethyloctanedionate, $Er(C_{11}H_{19}O_2)_3$, $Yb(C_{11}H_{19}O_2)_3$, $Pr(C_{11}H_{19}O_2)_3$, $Nb(C_{11}H_{19}O_2)_3$, $Tm(C_{11}H_{19}O_2)_3$, and the like, and combinations of any two or more thereof. Some representative precursors for other desirable metal dopant(s)/additive(s) comprise, for example, liquid zinc precursor compositions, such as diethyl zinc ($Zn(C_2H_5)_2$), dimethyl zinc ($Zn(CH_3)_2$), and the like, and combinations of any two or more thereof Suitable solid, zinc precursors with sufficient vapor pressure of gaseous delivery comprise, for example, zinc chloride ($ZnCl_2$), and the like, and combinations of any two or more thereof. Suitable lithium precursors for vapor delivery comprise, for example, solids, such as lithium acetate ($Li_2O_2CCH_3$), liquids, such as lithium amide ($LiNH_2$) dissolved in hexane, and the like, and combinations of any two or more thereof.

Suitable silicon precursors for aerosol production comprise, for example, silicon tetrachloride $Si(Cl_4)$, which is soluble in ether, trichlorosilane ($Cl_3HSi$), which is soluble in carbon tetrachloride, coilloidal silica, $Si(OC_2H_5)_4$, which is soluble in alcohol, $Si(OCH_3)_4$, $(CH_3)_3SiOSi(CH_3)_3$, and the like, and combinations of any two or more thereof. Similarly, suitable boron precursors for aerosol delivery include, for example, ammonium borate (($NH_4)_2B_4O_7$), which is soluble in water and various organic solvents, $B(OC_2H_5)_3$, $B(C_2H_5)_3$, and the like, and combinations of any two or more thereof. Suitable phosphorous precursors for aerosol delivery comprise, for example, ammonium phosphate (($NH_4)_3PO_4$), ammonium phosphate—dibasic (($NH_4)_2HPO_4$), ammonium phosphate—monobasic (($NH_4)H_2PO_4$) and phosphoric acid ($H_3PO_4$), which are all moderately soluble in water, as well as $OP(OC_2H_5)_3$, which is soluble in alcohol and ether, $P(OC_2H_5)_3$, $OP(OCH_3)_3$, and the like, and combinations of any two or more thereof. Suitable aluminum precursors for aerosol delivery comprise, for example, aluminum chloride ($AlCl_3 \cdot 6H_2O$), which is soluble in many organic solvents, and aluminum nitrate ($Al(NO_3)_3 \cdot 9H_2O$) and aluminum hydroxychloride ($Al_2(OH)_5Cl \cdot 2H_2O$), which are soluble in water, as well as $Al(C_2H_5)_3$, $Al(OC_4H_9)_3$, $Al(C_5H_7O_2)_3$, $Al(C_{18}H_{35}O_2)_3$, and the like, and combinations of any two or more thereof. Suitable titanium precursors for aerosol delivery comprise, for example, $Ti(N(CH_3)_2)_4)$, $TiO_2OH$, and the like, and combinations of any two or more thereof. Suitable germanium precursors for aerosol delivery comprise, for example, $Ge(OC_2H_5)_3$, $Ge(OCH_3)_4$, and the like, and combinations of any two or more thereof. Suitable tellurium precursors for aerosol delivery comprise, for example $TeCl_4$, which is soluble in alcohol, and the like, and combinations of any two or more thereof.

Similarly, rare earth dopant/additive precursor(s) can be supplied as an aerosol. Some representative rare earth precursors suitable for aerosol delivery are presented below with suitable solvents. Yttrium chloride ($YCl_3$) and yttrium nitrate ($Y(NO_3)_3$) are soluble in water. Lanthanum chloride ($LaCl_3$ and $LaCl_3 \cdot 7H_2O$) and lanthanum nitrate hexahydrate ($La(NO_3)_3 \cdot 6H_2O$) are soluble in water. Thulium chloride ($TmCl_3$ and $TmCl_3 \cdot 7H_2O$) is soluble in water. Ytterbium chloride ($YbCl_3$ and $YbCl_3 \cdot 6H_2O$) is soluble in water. Praseodymium chloride ($PrCl_3$ and $PrCl_3 \cdot 7H_2O$) and praseodymium nitrate hexahydrate ($Pr(NO_3)_3 \cdot 6H_2O$) are soluble in water. Neodymium chloride ($NdCl_3$ and $NdCl_3 \cdot 6H_2O$) and neodymium nitrate hexahydrate ($Nd(NO_3)_3 \cdot 6H_2O$) are soluble in water. Erbium chloride ($ErCl_3$ and $ErCl_3 \cdot 6H_2O$) is soluble in water. Other suitable rare earth dopant(s)/additive(s) include, for example, $Er(NO_3)_3$, $CeCl_3$ and $Ce(NO_3)_3$.

Other non-rare earth metal dopant(s)/additive(s) also can be delivered by aerosol. For example, zinc chloride ($ZnCl_2$) and zinc nitrate ($Zn(NO_3)_2$) are soluble in water and some organic solvents, such as isopropyl alcohol. Suitable lithium precursors for aerosol delivery from solution comprise, for example, lithium acetate ($LiCH_3CO_2$) and lithium nitrate ($LiNO_3$), which are soluble in water and alcohol, lithium chloride (LiCl), which is somewhat soluble in water, alcohol and some other organic solvents, lithium hydroxide (LiOH), which is somewhat soluble in water and alcohol, and the like, and combinations of any two or more thereof. Suitable bismuth precursors for aerosol delivery comprise, for example, bismuth nitrate ($Bi(NO_3)_3$), which is soluble in dilute aqueous acid solutions, and the like, and combinations of any two or more thereof. Antimony trichloride ($SbCl_3$) is soluble in alcohol. Barium azide ($Ba(N_3)_2$ and $Ba(N_3)_2 \cdot H_2O$) and barium chloride ($BaCl_2$) are soluble in water. Other barium compounds suitable for aerosol delivery include, for example, $Ba(C_2H_3O_2)_2$, $Ba(C_2H_3O_2)_2 \cdot H_2O$, $Ba(C_2H_3O_2)_2 \cdot H_2O$ and combinations thereof. Suitable antimony precursors comprise, for example, $Sb(C_2H_5)_3$, $Sb(OC_2H_5)_3$, $Sb_2(C_4H_4O_6)_3 \cdot 6H_2O$ and combinations thereof.

Fluorine dopant(s)/additive(s) are of interest for some applications. For phosphate coating silica glasses, a fluoride precursor of particular interest comprises for example, phosphorus trifluoride ($PF_3$), which is a gas such that it is suitable for vapor delivery into a laser pyrolysis/light reactive deposition chamber. Other fluoride precursors for vapor and/or aerosol delivery comprises, for example, $(C_2H_5O)_3SiF$, $(C_2H_5O)_2SiF_2$, $(C_2H_5O)SiF_3$, $(C_2H_5)_2SiF_2$, $C_2H_5SiF_3$, $C_6H_5SoF_3$, $H_2SIf_6 \cdot xH_2O$, $SiF_4$, $Si_4F_3Cl$, $SiF_2Cl_2$, $SiFCl_3$, $HPO_2F_2$, $HPF_6 \cdot 6H_2O$, $(i-C_3H_7O)_2POF$, $H_2PO_3F$, $CF_4$, $CF_3COCF_3 \cdot H_2O$, $AlF_3$, $SnF_2$, $GeF_2$, $GeF_4$, $GeF_3Cl$, $GeF_2Cl_2$, $GeFCl_3$, $TiF_4$, $FCH_2CO_2H$, $C_2F_6$, $CCl_2F_2$, $BF_3 \cdot 2H_2O$, $[(CH_3)_2N]2BF$, $C_6H_5BF_2$, $(4-CH_3C_6H_4)BF_2$, $(4-CH_3C_6H_4)BF_2$, $HBF_4$, and the like, and combinations of any two or more thereof. Chlorine dopant(s)/additive(s) can be introduced as the chloride of a metaumetalloid element or in similar compounds as fluorine. Carbon and nitrogen dopant(s)/additive(s) can be introduced as elements associated with other precursors, and carbon can be supplied as ethylene or other hydrocarbon.

In general, the selection of the composition of particles and/or corresponding powder coatings are based on the intended use of the materials. Similarly, any dopants/additives are similarly selected. The resulting properties of the particles depend on the compositions, including any dopants/additives and the phase(s), e.g., crystallinity or amorphous character, of the particles as well as, in some embodiments, the particle size and particle size distribution. Desirable properties for some applications are described above in some detail either with respect to specific compositions or more generally.

Particle Production Apparatus

A variety of particle production methods can be used to form product particles and powder coatings of interest. In one embodiment, the production methods are based on a flowing reaction system in which flowing reactants from a reactant delivery system are reacted and product particles are formed within the flow. In a flowing reaction system, the product particles are harvested from the flow. In particular, laser pyrolysis is a flowing reaction system in which the reaction of the flowing reactant stream is driven by an intense light beam that intersects with the flowing reactant stream.

An appropriate laser pyrolysis apparatus generally comprises a reaction chamber isolated from the ambient environment. A reactant inlet connected to a reactant delivery apparatus generates a reactant stream as a flow through the reaction chamber. A radiation beam path, e.g., a light beam path, intersects the reactant stream at a reaction zone. The reactant/product stream continues after the reaction zone to an outlet, where the reactant/product stream exits the reaction chamber and passes into a collection apparatus. For light reactive deposition, the coating can be performed in the reaction chamber or in a separate coating chamber connected to the reaction chamber, as described further below. In some embodiments, the radiation source, such as a laser, is located external to the reaction chamber, and the light beam enters the reaction chamber through an appropriate window and/or lens. The dimensions of the reactant inlet(s) can be selected in part to obtain a desired production rate, although the dimensions of the reactant inlets and the flow rate should be correlated with the other reaction parameters, as described above and below, to obtain desired particle/powder coating properties.

Referring to FIG. 1, a particular embodiment 100 of a laser pyrolysis system involves a reactant delivery apparatus 102, reaction chamber 104, shielding gas delivery apparatus 106, collection apparatus 108 and radiation (e.g., light) source 110. A first reaction delivery apparatus described below can be used to deliver one or more exclusively gaseous/vapor reactants. An alternative reactant delivery apparatus is described for delivery of one or more reactants as an aerosol. A further reactant delivery apparatus permits delivery of one or more reactants as an aerosol and one or more reactant as a vapor/gas.

Figure 2:
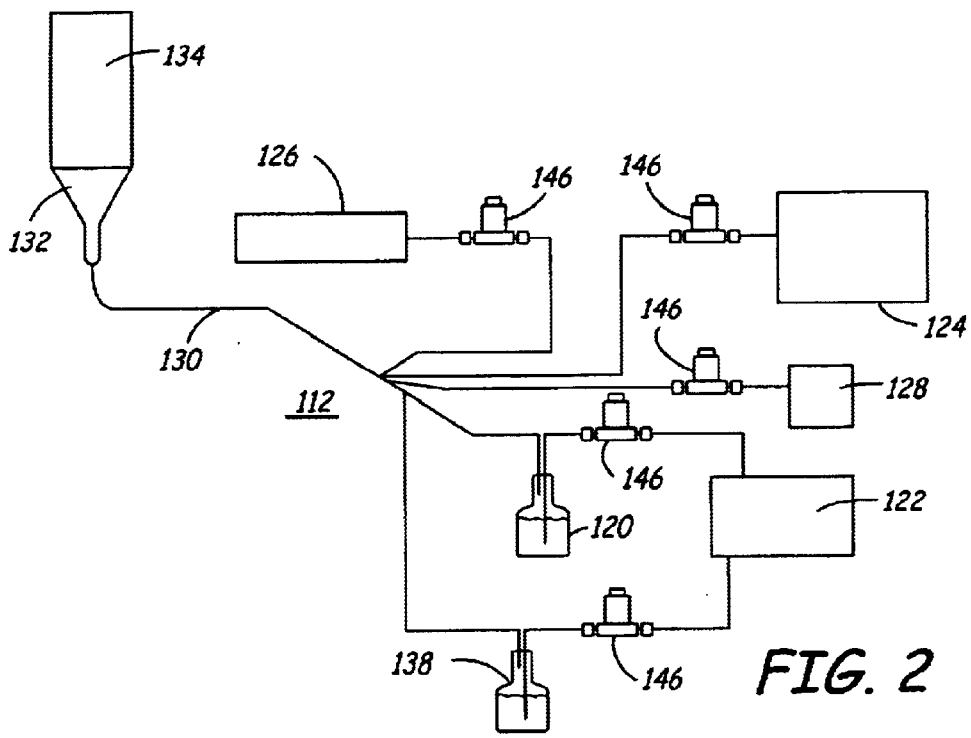
FIG. 2 is a schematic, side view of an embodiment of a reactant delivery apparatus for the delivery of vapor reactants to the laser pyrolysis apparatus of FIG. 1.

Referring to FIG. 2, a first embodiment 112 of reactant delivery apparatus 102 includes a source 120 of a precursor composition. For liquid or solid reactants, a carrier gas from one or more carrier gas sources 122 can be introduced into precursor source 120 to facilitate delivery of the reactant. Precursor source 120 can comprise a liquid holding container, a solid precursor delivery apparatus or other suitable container. The carrier gas from carrier gas source 122 can comprise an infrared absorber and/or an inert gas. In some embodiments, the precursor source comprises a flash evaporator that supplies a vapor of the precursor at a selected vapor pressure, generally without a carrier gas. The flash evaporator can be connected to a liquid reservoir to supply liquid precursor. Suitable flash evaporators are available from, for example, MKS Instruments, Inc., Albuquerque, N. Mex. or can be produced from readily available components.

The gas/vapor from precursor source 120 can be mixed with gases from infrared absorber source 124, inert gas source 126 and/or secondary reactant source 128 by combining the gases in a single portion of tubing 130. Tubing 130 can be heated to prevent condensation of precursors within the tube. The gases/vapors are combined a sufficient distance from reaction chamber 104 such that the gases/vapors become well mixed prior to their entrance into reaction chamber 104. The combined gas/vapor in tube 130 passes through a duct 132 into channel 134, which is in fluid communication with reactant inlet 256 (FIG. 1).

A second precursor/reactant can be supplied from second precursor source 138, which can be a liquid reactant delivery apparatus, a solid reactant delivery apparatus, a gas cylinder, a flash evaporator or other suitable container or containers. As shown in FIG. 2, second precursor source 138 delivers a second reactant to duct 132 by way of tube 130. Alternatively, mass flow controllers 146 can be used to regulate the flow of gases within the reactant delivery system of FIG. 2. In alternative embodiments, the second precursor can be delivered through a second duct for delivery into the reactant chamber through a second channel such that the reactants do not mix until they are in the reaction chamber. A laser pyrolysis apparatus with a plurality of reactant delivery nozzles is described further in copending and commonly assigned U.S. patent application Ser. No. 09/970,279 to Reitz et al., entitled "Multiple Reactant Nozzles For A Flowing Reactor," incorporated herein by reference. One or more additional precursors, e.g., a third precursor, fourth precursor, etc., can be similarly delivered based on a generalization of the description for two precursors.

As noted above, the reactant stream can comprise one or more aerosols. The aerosols can be formed within reaction chamber 104 or outside of reaction chamber 104 prior to injection into reaction chamber 104. If the aerosols are produced prior to injection into reaction chamber 104, the aerosols can be introduced through reactant inlets comparable to those used for gaseous reactants, such as reactant inlet 134 in FIG. 2.

Figure 3A:
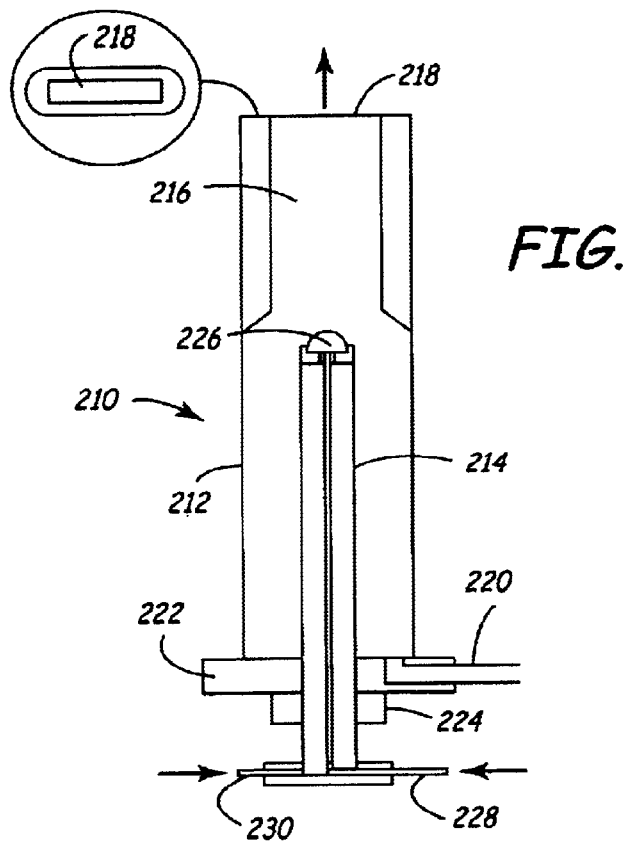
FIG. 3A is a schematic, sectional view of an alternative embodiment of the reactant delivery apparatus for the delivery of an aerosol reactant to the laser pyrolysis apparatus of FIG. 1, the cross section being taken through the center of the apparatus.

Referring to FIG. 3A, embodiment 210 of the reactant supply system 102 can be used to supply an aerosol to duct 132. Reactant supply system 210 comprises an outer nozzle 212 and an inner nozzle 214. Outer nozzle 212 has an upper channel 216 that leads to a rectangular outlet 218 at the top of outer nozzle 212, as shown in the insert in FIG. 3A. Rectangular outlet 218 has selected dimensions to produce a reactant stream of desired expanse within the reaction chamber. Outer nozzle 212 comprises a drain tube 220 in base plate 222. Drain tube 220 is used to remove condensed aerosol from outer nozzle 212. Inner nozzle 214 is secured to outer nozzle 212 at fitting 224.

The top of inner nozzle 214 can comprise a twin orifice internal mix atomizer 226. Liquid is fed to the atomizer through tube 228, and gases for introduction into the reaction chamber are fed to the atomizer through tube 230. Interaction of the gas with the liquid assists with droplet formation.

Figure 3B:
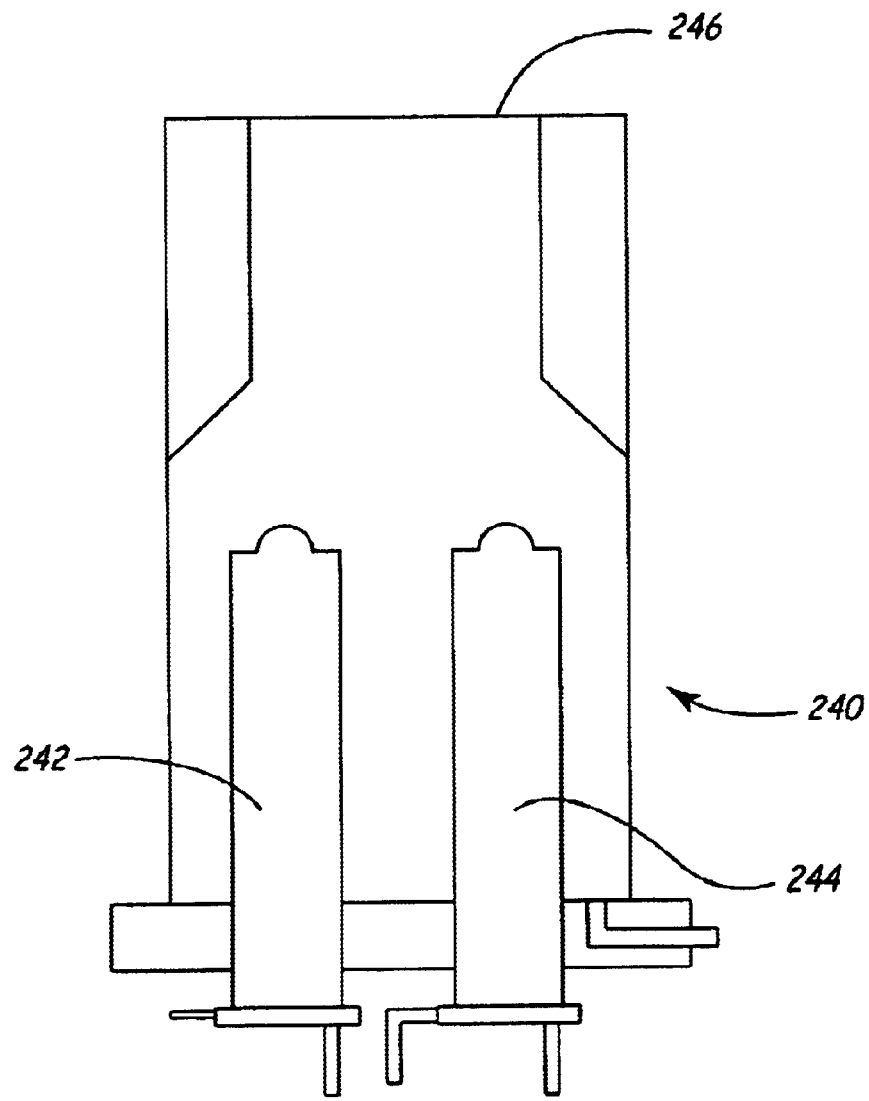
FIG. 3B is a schematic, sectional view of a reactant delivery apparatus with two aerosol generators within a single reactant inlet nozzle.

A plurality of aerosol generators can be used to produce aerosol within the reaction chamber or within one or more inlets leading to the reaction chamber. The aerosol generators can be used to generate the same or different aerosol composition from each other. For embodiments in which the aerosol generators product aerosols of different compositions, the aerosols can be used to introduce reactants/precursors that are not easily or conveniently dissolved/dispersed into the same solvent/dispersant. Thus, if a plurality of aerosol generators is used to form an aerosol directly within the reaction chamber, the aerosol generators can be oriented to mix the reactants or to deliver separate streams, possibly overlapping, along the reaction zone. If two or more aerosols are generated within a single inlet nozzle the aerosols can be mixed and flowed within a common gas flow. An inlet nozzle with two aerosol generators is shown in FIG. 3B. Inlet nozzle 240 includes aerosol generators 242, 244, which generate aerosols directed to outlet 246.

Alternatively, aerosol generators can generate aerosols within separate inlets such that the aerosols are combined within the reaction chamber. The use of a plurality of aerosol generators within a single inlet nozzle or a plurality of inlet nozzles can be useful for embodiments in which it is difficult to introduce desired compositions within a single solution/dispersion. Multiple aerosol generators producing aerosols within different inlets are described further in copending and commonly assigned U.S. patent application Ser. No. 09/362, 631 to Mosso et al., entitled "Particle Production Apparatus," incorporated herein by reference.

In any of these aerosol embodiments, one or more vapor/gas reactants/precursors can also be introduced. For example, the vapor/gas precursors can be introduced within the aerosol generator itself to help form the aerosol. In alternative embodiments, the vapor can be delivered through a separate inlet into the delivery channel into which the aerosol is generated such that the vapor and aerosol mix and are delivered into the reaction chamber through the same reactant inlet. In further embodiments, the vapor precursors are delivered into the reaction chamber through separate reactant inlets to combine with the flow comprising the aerosol. In addition, these approaches can be combined for the delivery of a single vapor precursor, different vapor precursors through different delivery channels or a combination thereof.

Figure 4:
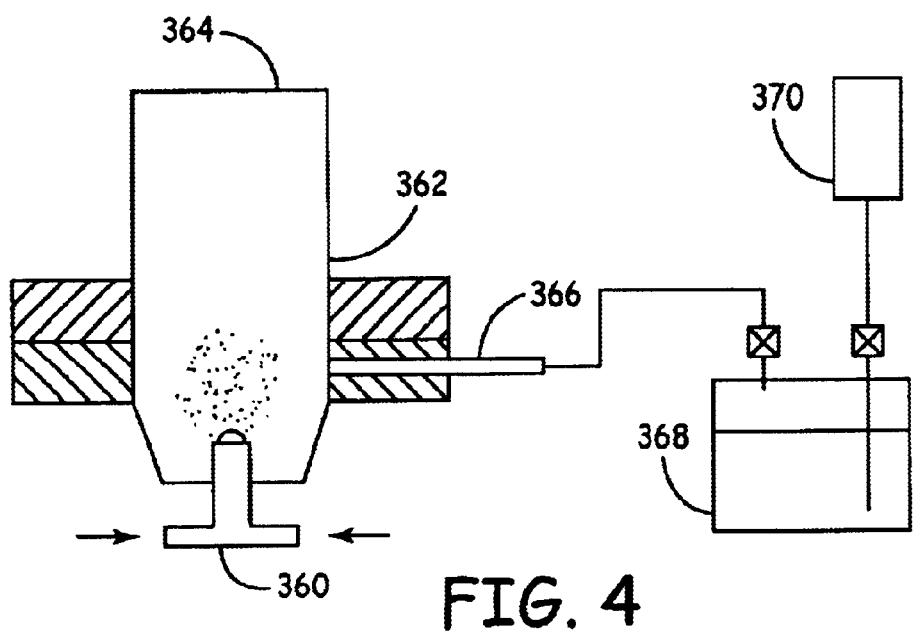
FIG. 4 is a schematic sectional view of an inlet nozzle of a reactant delivery system for the delivery of both vapor and aerosol reactants in which the vapor and aerosol reactants combine within the nozzle.

An embodiment of an inlet nozzle that is configured for delivery of a vapor precursor into a channel with an aerosol for delivery together into a reaction chamber is depicted in FIG. 4. Referring to FIG. 4, aerosol generator 360 delivers an aerosol into channel 362. Channel 362 leads to reactant inlet 364 that generally leads into a reaction chamber. Reactant inlet 364 can be positioned, as desired, to deliver the reactant stream/flow a suitable distance from a radiation path within the reaction chamber. Vapor channel 366 leads into channel 362 such that vapor precursors can mix with aerosols from aerosol generator 360 for delivery through reactant inlet 364. Vapor channel 366 connects to a flash evaporator 368, although other vapor sources, such as a bubbler or solid vapor source, can be used. Flash evaporator heats a liquid precursor to a temperature to deliver a selected vapor pressure to vapor channel 366. Vapor channel 366 and/or channel 362 can be heated to reduce or eliminate condensation of vapor reactants. Flash evaporator 368 connects to a liquid source 370.

Figure 5:
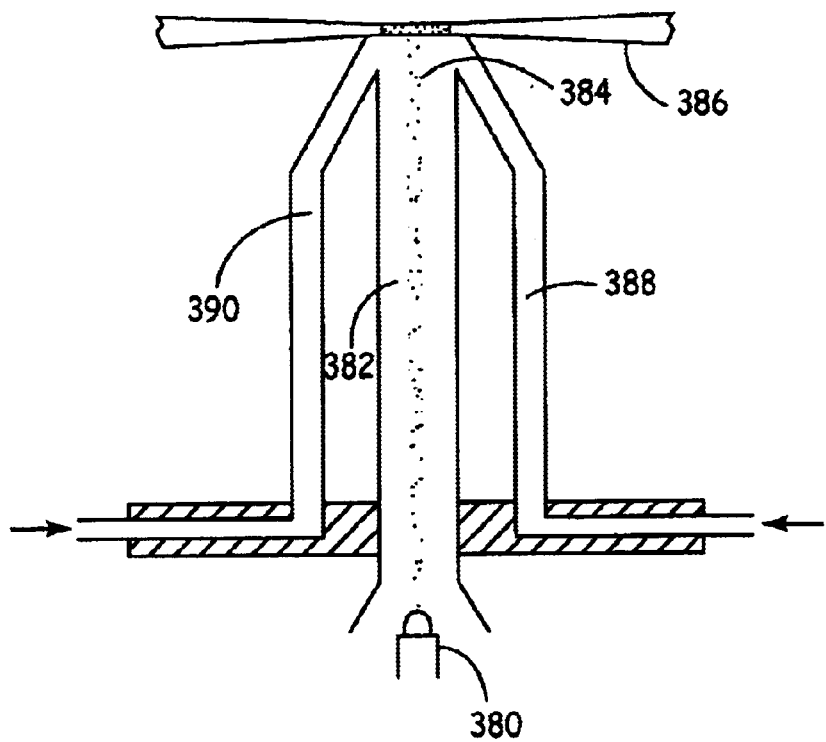
FIG. 5 is a schematic sectional view of an inlet nozzle of a reactant delivery system for the delivery of both vapor and aerosol reactants in which the vapor and aerosol combine within the reaction chamber prior to reaching a radiation beam.

An embodiment of a reactant delivery system is depicted in FIG. 5 for the delivery of a vapor precursor into the reaction chamber independently from a reactant flow comprising an aerosol. Referring to FIG. 5, aerosol generator 380 generates an aerosol within channel 382 that leads to reactant inlet 384. The aerosol from reactant inlet 382 leads to radiation beam 386. Vapor channels 388, 390 deliver vapor reactants into the reaction chamber to mix with the aerosol just before reaching radiation beam 386.

In alternative embodiments, aerosol precursors can be delivered through channels 388, 390 of FIG. 5 while a vapor/gaseous reactant(s) are delivered through channel 382. For example, a vapor silicon precursor and/or other glass forming host elements can be delivered through central channel 382 while aerosol dopant(s)/additive(s) can be delivered through channels 388, 390. In further embodiments, precursor(s), e.g., dopant/additive precursor (s), can be delivered to intersect another reactant flow at a radiation beam and/or just beyond a radiation beam. If dopant/additive precursor(s) intersect a reactant/product flow just beyond a radiation beam, the particles may still be forming such that the dopant(s)/additive(s) are introduced into the matrix of the particles, or the dopant(s)/additive(s) can be associated with hot particles such that they are incorporated into the final uniform material upon consolidation.

Referring to FIG. 1, the reaction chamber 104 comprises a main chamber 250. Reactant supply system 102 connects to the main chamber 250 at injection nozzle 252. Reaction chamber 104 can be heated to a surface temperature above the dew point of the mixture of reactants and inert components at the pressure in the apparatus.

The end of injection nozzle 252 has an annular opening 254 for the passage of inert shielding gas, and a reactant inlet 256 (left lower insert) for the passage of reactants to form a reactant stream in the reaction chamber. Reactant inlet 256 can be a slit, as shown in the lower inserts of FIG. 1. Annular opening 254 has, for example, a diameter of about 1.5 inches and a width along the radial direction from about ⅛ in to about ¹⁄₁₆ in. The flow of shielding gas through annular opening 254 helps to prevent the spread of the reactant gases and product particles throughout reaction chamber 104.

Tubular sections 260, 262 are located on either side of injection nozzle 252. Tubular sections 260, 262 comprise, for example, ZnSe windows/lenses 264, 266, respectively. Windows 264, 266 are about 1 inch in diameter. Windows 264, 266 can comprise cylindrical lenses with a focal length equal to the distance between the center of the chamber to the surface of the lens to focus the light beam to a point just below the center of the nozzle opening. Windows 264, 266 can further comprise an antireflective coating. Appropriate ZnSe lenses are available from Laser Power Optics, San Diego, Calif. Tubular sections 260, 262 provide for the displacement of windows 264, 266 away from main chamber 250 such that windows 264, 266 are less likely to be contaminated by reactants and/or products. Window 264, 266 are displaced, for example, about 3 cm from the edge of the main chamber 250. In place of lenses, reflective optics can be used.

Windows 264, 266 are sealed with a rubber o-ring to tubular sections 260, 262 to prevent the flow of ambient air into reaction chamber 104. Tubular inlets 268, 270 provide for the flow of shielding gas into tubular sections 260, 262 to reduce the contamination of windows 264, 266. Tubular inlets 268, 270 are connected to shielding gas delivery apparatus 106. A vacuum, such as supplied by a venturi jet pump, can be connected to the inlet tube in place of a shielding gas source.

Referring to FIG. 1, shielding gas delivery system 106 comprises inert gas source 280 connected to an inert gas duct 282. Inert gas duct 282 flows into annular channel 284 leading to annular opening 254. A mass flow controller 286 regulates the flow of inert gas into inert gas duct 282. If reactant delivery system 112 of FIG. 2 is used, inert gas source 126 can also function as the inert gas source for duct 282, if desired. Referring to FIG. 1, inert gas source 280 or a separate inert gas source can be used to supply inert gas to tubes 268, 270. Flow to tubes 268, 270 can be controlled by a mass flow controller 288.

Radiation source 110 is aligned to generate an electromagnetic radiation, e.g., light, beam 300 that enters window 264 and exits window 266. Windows/lenses 264, 266 define a light path through main chamber 250 intersecting the flow of reactants at reaction zone 302. After exiting window 266, electromagnetic radiation beam 300 strikes power meter 304, which also acts as a beam dump. An appropriate power meter is available from Coherent Inc., Auburn, Calif. Radiation source 110 can be a laser or an intense conventional light source such as an arc lamp. In one embodiment, radiation source 110 is an infrared laser, especially a CW $CO_2$ laser such as an 1800 watt maximum power output laser available from PRC Corp., Landing, N.J.

Reactants passing through reactant inlet 256 in injection nozzle 252 result in a reactant stream. The reactant stream passes through reaction zone 302, where reaction involving the metal/metalloid precursor composition(s) and dopant/additive precursor composition(s) takes place. Heating of the gases in reaction zone 302 is extremely rapid, roughly on the order of about $10^5$ degree C./sec depending on the specific conditions. The reaction is rapidly quenched upon leaving reaction zone 302, and particles 306 are formed in the reactant/product stream. The nonequilibrium nature of the process can lead to the production of submircon/nanoparticles with a highly uniform size distribution and structural homogeneity.

The path of the reactant stream continues to collection nozzle 310. Collection nozzle 310 has a circular opening 312, as shown in the upper insert of FIG. 1. Circular opening 312 feeds into collection system 108.

The chamber pressure can be monitored with a pressure gauge 320 attached to the main chamber. A suitable chamber pressure for the production of the desired oxides generally is in the range(s) from about 80 Torr to about 650 Torr.

Collection system 108 can comprise a curved channel 330 leading from collection nozzle 310. Because of the small size of the particles, the product particles follow the flow of the gas around curves. Collection system 108 comprises a filter 332 within the gas flow to collect the product particles. Due to curved section 330, the filter is not supported directly above the chamber. A variety of materials such as Teflon® (polytetrafluoroethylene), stainless steel, glass fibers and the like can be used for the filter as long as the material is substantially inert and has a fine enough mesh to trap the particles. Suitable materials for the filter include, for example, a glass fiber filter from ACE Glass Inc., Vineland, N.J., cylindrical Nomex® filters from AF Equipment Co., Sunnyvale, Calif. and stainless steel filters from All Con World Systems, Seaford, Del. Filters can be replaced with electrostatic collectors.

Pump 334 can be used to maintain collection system 108 at a selected pressure. It may be desirable to flow the exhaust of the pump through a scrubber 336 to remove any remaining reactive chemicals before venting into the atmosphere.

The pumping rate can be controlled by either a manual needle valve or an automatic throttle valve 338 inserted between pump 334 and filter 332. As the chamber pressure increases due to the accumulation of particles on filter 332, the manual valve or the throttle valve can be adjusted to maintain the pumping rate and the corresponding chamber pressure.

The apparatus can be controlled by a computer 350. Generally, the computer controls the radiation (e.g., light) source and monitors the pressure in the reaction chamber. The computer can be used to control the flow of reactants and/or the shielding gas.

The reaction can be continued until sufficient particles are collected on filter 332 such that pump 334 can no longer maintain the desired pressure in the reaction chamber 104 against the resistance through filter 332. When the pressure in reaction chamber 104 can no longer be maintained at the desired value, the reaction is stopped, and filter 332 is removed. With this embodiment, about 1–300 grams of particles can be collected in a single run before the chamber pressure can no longer be maintained. A single run generally can last up to about 10 hours depending on the reactant delivery system, the type of particle being produced and the type of filter being used.

Figure 6:
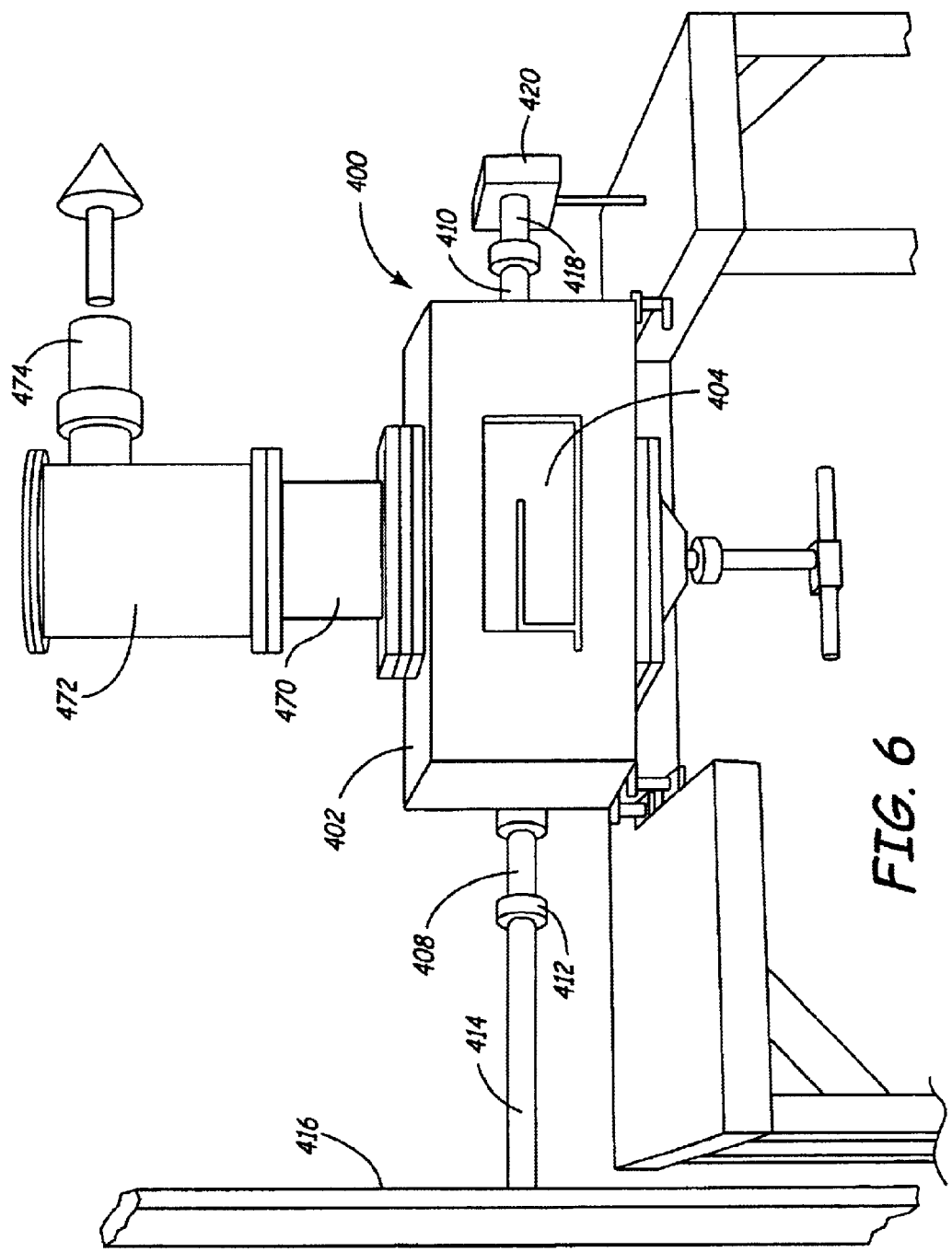
FIG. 6 is a perspective view of an alternative embodiment of a laser pyrolysis apparatus.

An alternative embodiment of a laser pyrolysis apparatus is shown in FIG. 6. Laser pyrolysis apparatus 400 comprises a reaction chamber 402. The reaction chamber 402 comprises a shape of a rectangular parallelapiped. Reaction chamber 402 extends with its longest dimension along the laser beam. Reaction chamber 402 has a viewing window 404 at its side, such that the reaction zone can be observed during operation.

Reaction chamber 402 further comprises tubular extensions 408, 410 that define an optical path through the reaction chamber. Tubular extension 408 is connected with a seal to a cylindrical lens 412. Tube 414 connects laser 416 or other optical radiation source with lens 412. Similarly, tubular extension 410 is connected with a seal to tube 418, which further leads to beam dump/light meter 420. Thus, the entire light path from optical radiation source 416 to beam dump 420 is enclosed.

Figure 7:
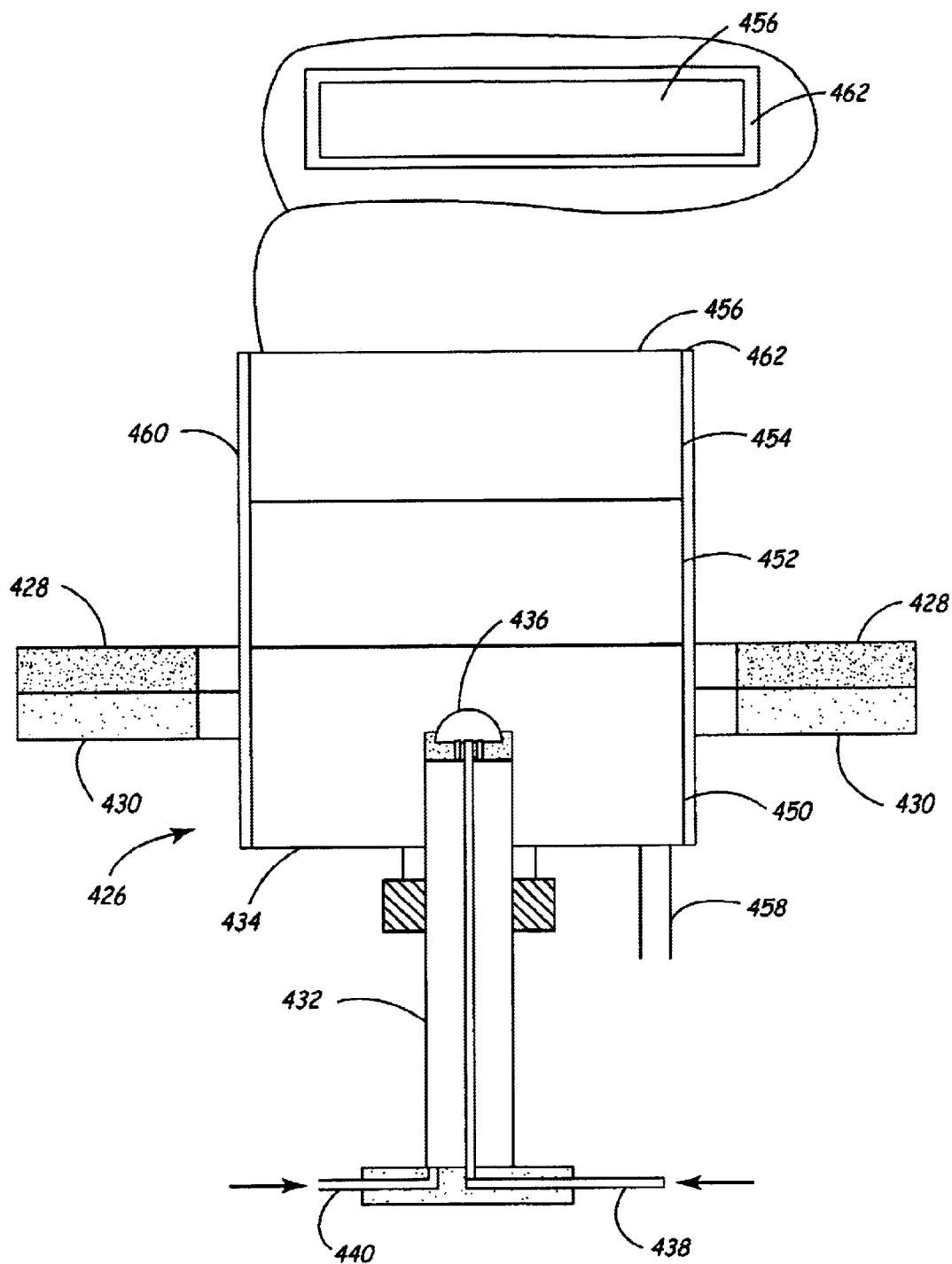
FIG. 7 is a sectional view of an inlet nozzle of the alternative laser pyrolysis apparatus of FIG. 4, the cross section being taken along the length of the nozzle through its center.
Figure 8:
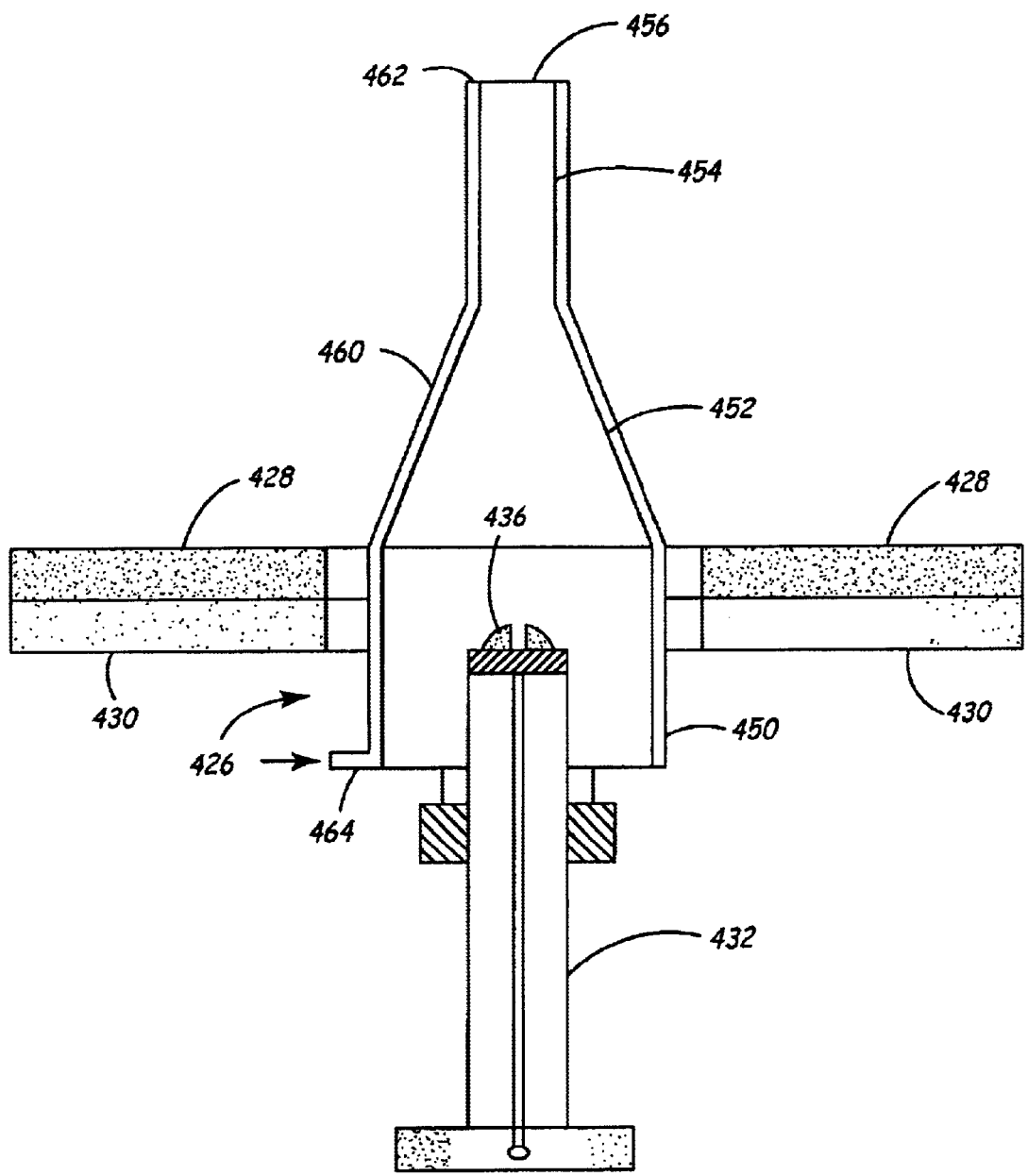
FIG. 8 is a sectional view of an inlet nozzle of the alternative laser pyrolysis apparatus of FIG. 4, the cross section being taken along the width of the nozzle through its center.

Inlet nozzle 426 connects with reaction chamber 402 at its lower surface 428. Inlet nozzle 426 comprises a plate 430 that bolts into lower surface 428 to secure inlet nozzle 426. Referring to sectional views in FIGS. 7 and 8, inlet nozzle 426 comprises an inner nozzle 432 and an outer nozzle 434. Inner nozzle 432 can have a twin orifice internal mix atomizer 436 at the top of the nozzle. Suitable gas atomizers are available from Spraying Systems, Wheaton, Ill. The twin orifice internal mix atomizer 436 has a fan shape to produce a thin sheet of aerosol and gaseous precursors. Liquid is fed to the atomizer through tube 438, and gases for introduction into the reaction chamber are fed to the atomizer through tube 440. Interaction of the gas with the liquid assists with droplet formation.

Outer nozzle 434 comprises a chamber section 450, a funnel section 452 and a delivery section 454. Chamber section 450 holds the atomizer of inner nozzle 432. Funnel section 452 directs the aerosol and gaseous precursors into delivery section 454. Delivery section 450 leads to an about 3 inch by 0.5 inch rectangular outlet 456, shown in the insert of FIG. 7. Outer nozzle 434 comprises a drain 458 to remove any liquid that collects in the outer nozzle. Outer nozzle 434 is covered by an outer wall 460 that forms a shielding gas opening 462 surrounding outlet 456. Inert gas is introduced through inlet 464. The nozzle in FIGS. 7 and 8 can be adapted for the delivery of aerosol and vapor precursors as discussed above with respect to FIGS. 3–5.

Referring to FIG. 6, exit nozzle 470 connects to apparatus 400 at the top surface of reaction chamber 402. Exit nozzle 470 leads to filter chamber 472. Filter chamber 472 connects with pipe 474, which leads to a pump. A cylindrical filter is mounted at the opening to pipe 474. Suitable cylindrical filters are described above.

Another alternative design of a laser pyrolysis apparatus has been described in U.S. Pat. No. 5,958,348 to Bi et al., entitled "Efficient Production of Particles by Chemical Reaction," incorporated herein by reference. This alternative design is intended to facilitate production of commercial quantities of particles by laser pyrolysis. Additional embodiments and other appropriate features for commercial capacity laser pyrolysis apparatuses are described in copending and commonly assigned U.S. patent application Ser. No. 09/362,631 to Mosso et al., entitled "Particle Production Apparatus," incorporated herein by reference.

In one embodiment of a commercial capacity laser pyrolysis apparatus, the reaction chamber and reactant inlet are elongated significantly along the light beam to provide for an increase in the throughput of reactants and products. The embodiments described above for the delivery of aerosol reactants can be adapted for the elongated reaction chamber design. Additional embodiments for the introduction of an aerosol with one or more aerosol generators into an elongated reaction chamber are described in U.S. Pat. No. 6,193,936 to Gardner et al., entitled "Reactant Delivery Apparatuses," incorporated herein by reference. A combination of vapor and aerosol precursors can be delivered into this reaction chamber by generalizing the approaches discussed above with respect to FIGS. 3–5. These improved reactors and corresponding nozzles can be adapted for light reactive deposition with vapor precursors, aerosol precursors and combinations thereof.

In general, the laser pyrolysis apparatus with the elongated reaction chamber and reactant inlet is designed to reduce contamination of the chamber walls, to increase the production capacity and/or to make efficient use of resources. To accomplish these objective(s), the elongated reaction chamber provides for an increased throughput of reactants and products without a corresponding increase in the dead volume of the chamber. The dead volume of the chamber can become contaminated with unreacted compositions and/or reaction products. Furthermore, an appropriate flow of shielding gas confines the reactants and products within a flow stream through the reaction chamber. The high throughput of reactants makes efficient use of the laser energy.

Figure 9:
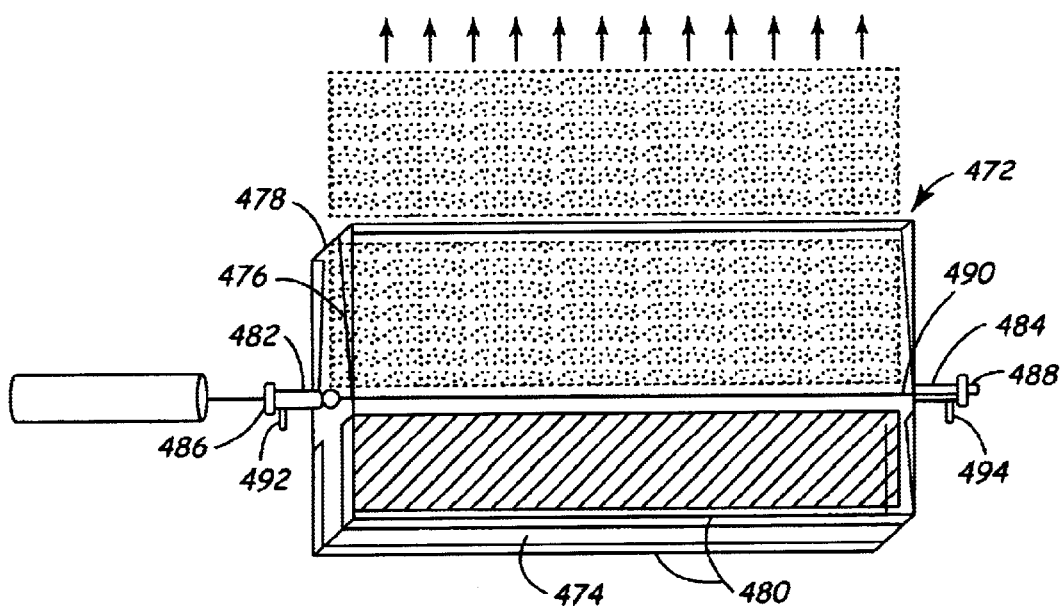
FIG. 9 is a perspective view of an embodiment of an elongated reaction chamber for performing laser pyrolysis.

The design of the improved reaction chamber 472 is shown schematically in FIG. 9. A reactant inlet 474 leads to main chamber 476. Reactant inlet 474 conforms generally to the shape of main chamber 476. Main chamber 476 includes an outlet 478 along the reactant/product stream for removal of particulate products, any unreacted gases and inert gases. The configuration can be reversed with the reactants supplied from the top and product collected from the bottom, if desired. Shielding gas inlets 480 are located on both sides of reactant inlet 474. Shielding gas inlets are used to form a blanket of inert gases on the sides of the reactant stream to inhibit contact between the chamber walls and the reactants or products. The dimensions of elongated main chamber 476 and reactant inlet 474 can be designed for high efficiency particle production.

Reasonable lengths for reactant inlet 474 for the production of ceramic submicron/nanoscale particles, when used with an 1800 watt $CO_2$ laser, are in the range(s) from about 5 mm to about 1 meter. More specifically with respect to the reactant inlet, the inlet generally has an elongated dimension in the range(s) of at least about 0.5 inches (1.28 cm), in other embodiments in the range(s) of at least about 1.5 inches (3.85 cm), in other embodiments in the range(s) of at least about 2 inches (5.13 cm), in further embodiments in the range(s) of at least about 3 inches (7.69 cm), in further embodiments in the range(s) of at least about 5 inches (12.82 cm) and in additional embodiments in the range(s) from about 8 inches (20.51 cm) to about 200 inches (5.13 meters). A person of ordinary skill in the art will recognize that additional ranges of inlet lengths within these specific ranges are contemplated and are within the present disclosure. In addition, the inlet can be characterized by an aspect ratio that is the ratio of the length divided by the width. If the inlet is not rectangular, the aspect ratio can be evaluated using the longest dimension as the length and the width as the largest dimension perpendicular to the line segment along the length. In some embodiments, the aspect ratio is in the range(s) of at least about 5, in other embodiments in the range(s) of at least about 10 and in further embodiments, in the range(s) from about 50 to about 400. A person of ordinary skill in the art will recognize that additional ranges of aspect ratio within these explicit ranges of aspect ratio are contemplated and are within the present disclosure. Nozzle parameters for particle production by laser pyrolysis are described further in copending U.S. patent application Ser. No. 10/119,645 to Gardner et al., entitled "Reactant Nozzles Within Flowing Reactors," incorporated herein by reference.

To obtain high yields at high production rates, the radiation beam can be directed in a way to intersect with a significant fraction or the entire reactant flow. Thus, the widest width of the reactant flow can be less than the narrowest width of a radiation beam. If the beam is focused with a cylindrical lens, the lens can be oriented to focus the beam orthogonal to the flow such that the beam does not narrow relative to the width of the flow. Thus, a high production rate can be achieved while efficiently using resources. In general, the radiation beam and the reactant flow can be configured such that effectively none of reactant flow is excluded from the path of the radiation beam. In some embodiments, the radiation beam intersect with at least about 80 volume percent of the reactant flow, in other embodiment at least about 90 volume percent, in further embodiments at least about 95 volume percent and in additional embodiments at least about 99 volume percent of the reactant flow, which can be considered to exclude effectively none of the reactant flow from the path of the radiation beam.

Tubular sections 482, 484 extend from the main chamber 476. Tubular sections 482, 484 hold windows 486, 488 to define a light beam path 490 through the reaction chamber 472. Tubular sections 482, 484 can comprise inert gas inlets 492, 494 for the introduction of inert gas into tubular sections 482, 484.

The improved reaction system comprises a collection apparatus to remove the submicron/nanoscale particles from the reactant stream. The collection system can be designed to collect particles in a batch mode with the collection of a large quantity of particles prior to terminating production. A filter or the like can be used to collect the particles in batch mode. Alternatively, the collection system can be designed to run in a continuous production mode by switching between different particle collectors within the collection apparatus or by providing for removal of particles without exposing the collection system to the ambient atmosphere. A suitable embodiment of a collection apparatus for continuous particle production is described in U.S. Pat. No. 6,270,732 to Gardner et al., entitled "Particle Collection Apparatus And Associated Methods," incorporated herein by reference.

Figure 10:
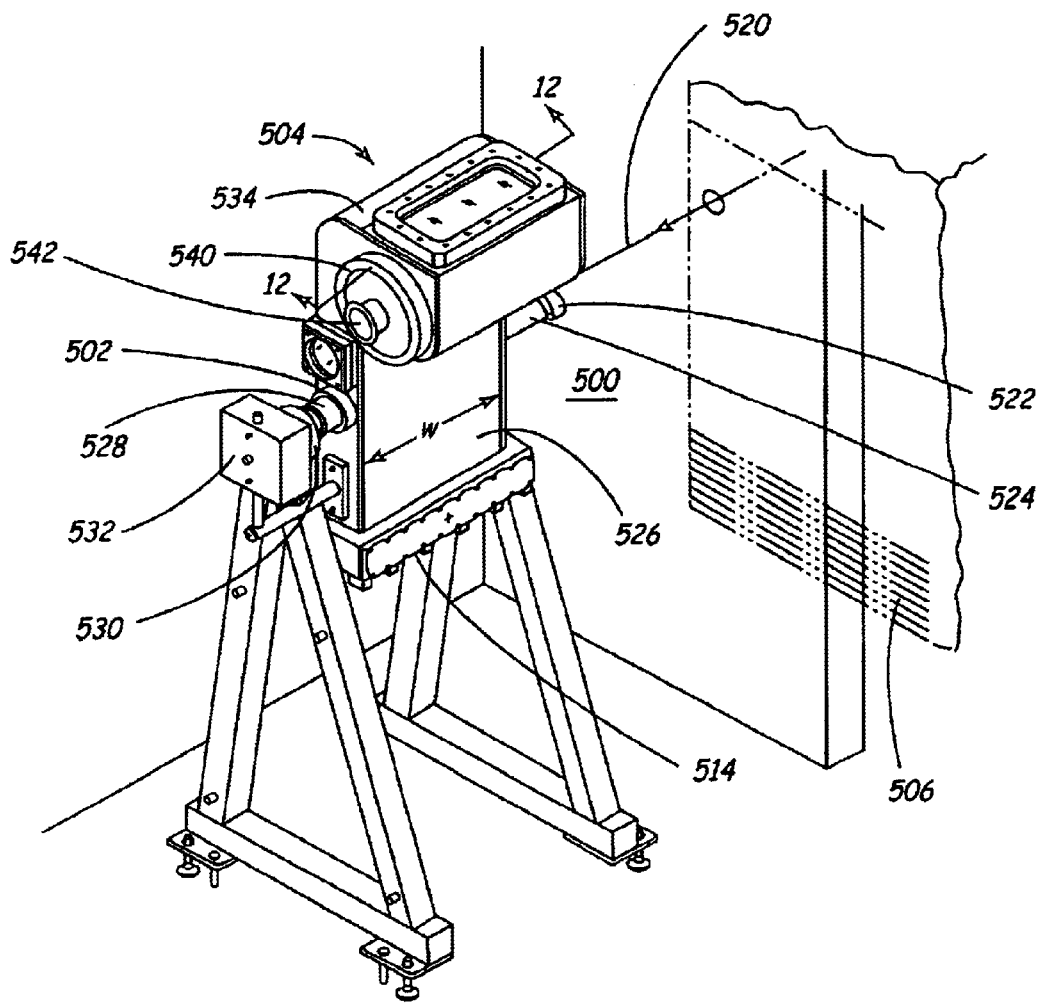
FIG. 10 is a perspective view of an embodiment of an elongated reaction chamber for performing laser pyrolysis.
Figure 11:
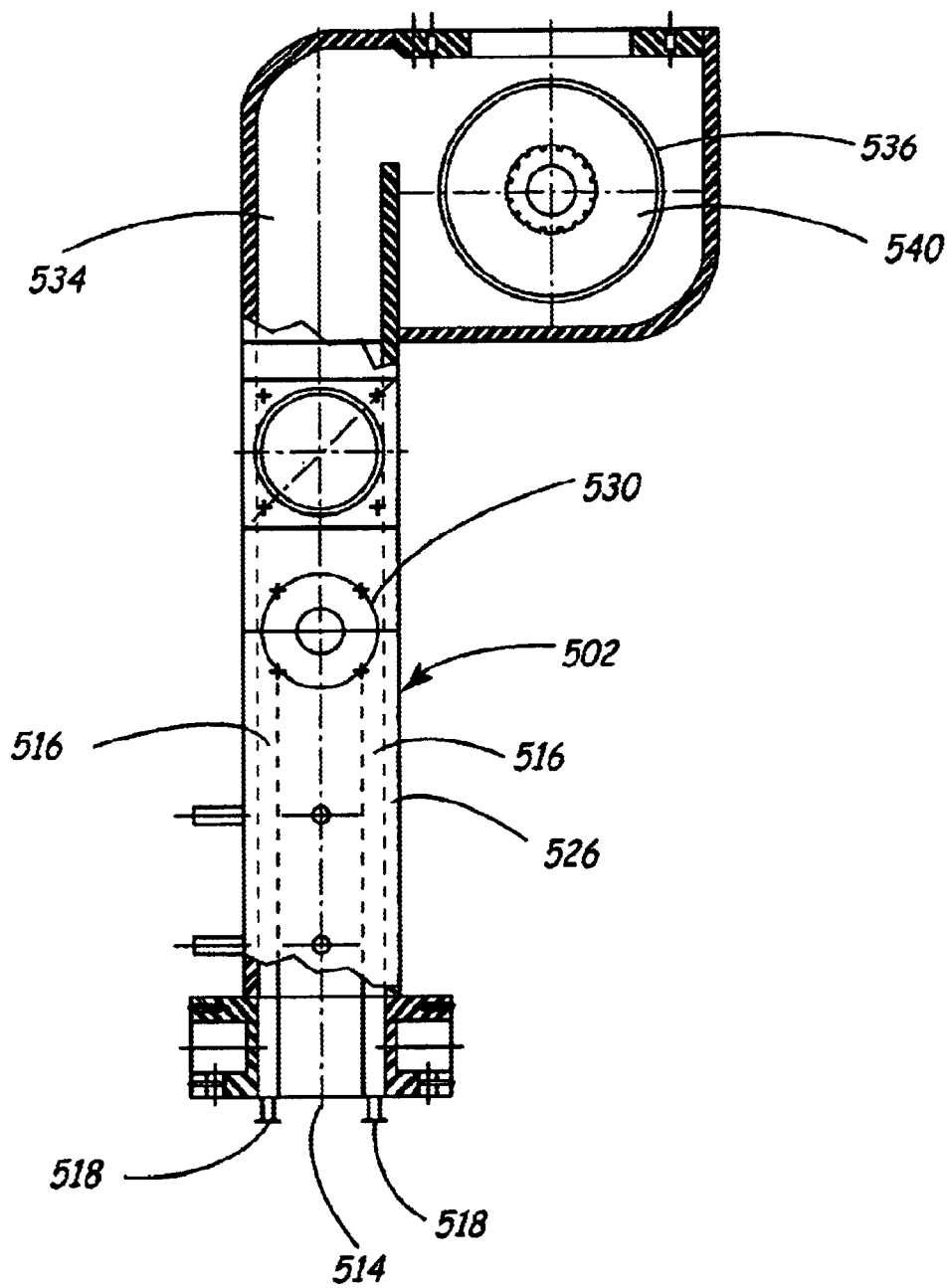
FIG. 11 is a cut away, side view of the reaction chamber of FIG. 10.
Figure 12:
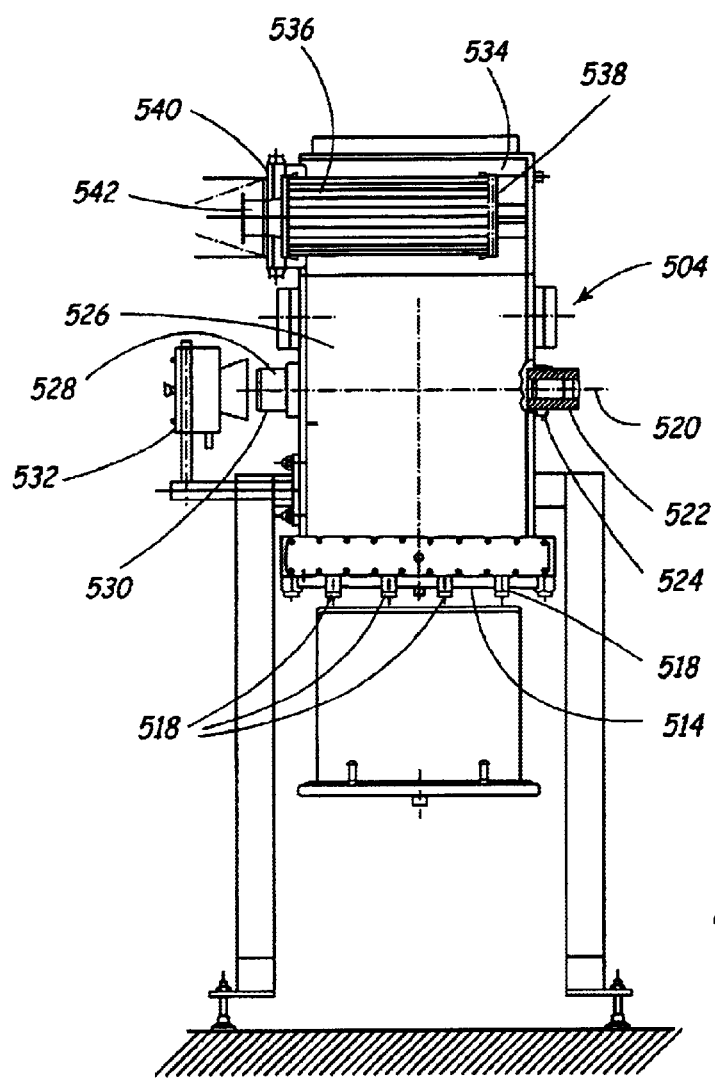
FIG. 12 is a partially sectional, side view of the reaction chamber of FIG. 10, taken along line 12—12 of FIG. 10.

Referring to FIGS. 10–12 a specific embodiment of a laser pyrolysis reaction system 500 includes reaction chamber 502, a particle collection system 504, laser 506 and a reactant delivery system 508 (described below). Reaction chamber 502 comprises reactant inlet 514 at the bottom of reaction chamber 502 where reactant delivery system 508 connects with reaction chamber 502. In this embodiment, the reactants are delivered from the bottom of the reaction chamber while the products are collected from the top of the reaction chamber.

Shielding gas conduits 516 are located on the front and back of reactant inlet 514. Inert gas is delivered to shielding gas conduits 516 through ports 518. The shielding gas conduits direct shielding gas along the walls of reaction chamber 502 to inhibit association of reactant gases or products with the walls.

Reaction chamber 502 is elongated along one dimension denoted in FIG. 10 by "w". A radiation, e.g., light or laser, beam path 520 enters the reaction chamber through a window 522 displaced along a tube 524 from the main chamber 526 and traverses the elongated direction of reaction chamber 502. The radiation beam passes through tube 528 and exits window 530. In one particular embodiment, tubes 524 and 528 displace windows 522 and 530 about 11 inches from the main chamber. The radiation beam terminates at beam dump 532. In operation, the radiation beam intersects a reactant stream generated through reactant inlet 514.

The top of main chamber 526 opens into particle collection system 504. Particle collection system 504 comprises outlet duct 534 connected to the top of main chamber 526 to receive the flow from main chamber 526. Outlet duct 534 carries the product particles out of the plane of the reactant stream to a cylindrical filter 536. Filter 536 has a cap 538 on one end. The other end of filter 536 is fastened to disc 540. Vent 542 is secured to the center of disc 540 to provide access to the center of filter 536. Vent 542 is attached by way of ducts to a pump. Thus, product particles are trapped on filter 536 by the flow from the reaction chamber 502 to the pump. Suitable pumps were described above. Suitable pumps include, for example, an air cleaner filter for a Saab 9000 automobile (Pur-o-lator part A44-67), which comprises wax impregnated paper with Plastisol or polyurethane end caps.

Figure 13:
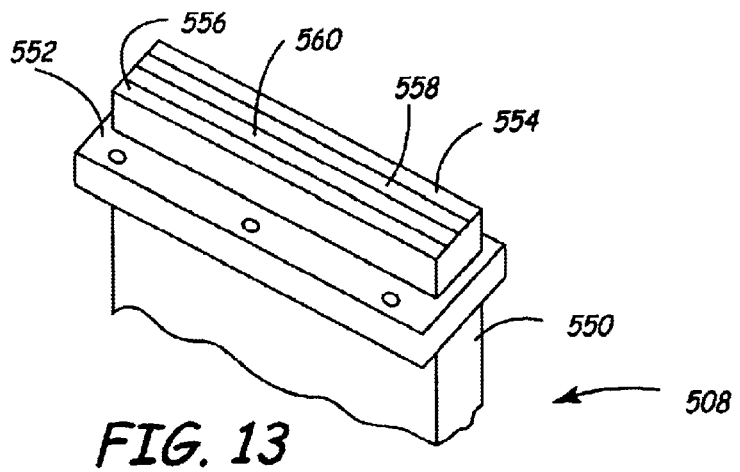
FIG. 13 is a fragmentary, perspective view of an embodiment of a reactant nozzle for use with the chamber of FIG. 10.

In a specific embodiment, reactant delivery system 508 comprises a reactant nozzle 550, as shown in FIG. 13. Reactant nozzle 550 can comprise an attachment plate 552. Reactant nozzle 550 attaches at reactant inlet 514 with attachment plate 552 bolting to the bottom of main chamber 526. In one embodiment, nozzle 550 has four channels that terminate at four slits 554, 556, 558, 560. Slits 558 and 560 can be used for the delivery of precursors and other desired components of the reactant stream. Slits 554, 556 can be used for the delivery of inert shielding gas. If a secondary reactant is spontaneously reactive with the vanadium precursor, it can be delivered also through slits 554, 556. One apparatus used for the production of oxide particles had dimensions for slits 554, 556, 558, 560 of 3 inches by 0.04 inches.

Coating Deposition

Light reactive deposition is a coating approach that uses an intense radiation source, e.g., a light source, to drive synthesis of desired compositions from a reactant stream. It has similarities with laser pyrolysis in that an intense radiation source drives the reaction. However, in light reactive deposition, the resulting compositions are directed to a substrate surface where a coating is formed. The characteristics of laser pyrolysis that lead to the production of highly uniform particles correspondingly can result in the production of coatings with high uniformity. In addition, reaction features that result in high particle production rates by laser pyrolysis can be adapted for high coating rates in light reactive deposition.

In light reactive deposition, the coating of the substrate can be performed in a coating chamber separate from the reaction chamber or the coating can be performed within the reaction chamber. In either of these configurations, the reactant delivery system can be configured similarly to a reactant delivery system for a laser pyrolysis apparatus for the production of particles. Thus, the description of the production of particles by laser pyrolysis described above and in the examples below can be adapted for coating production using the approaches described in this section.

If the coating is performed in a coating chamber separate from the reaction chamber, the reaction chamber can be essentially the same as the reaction chamber for performing laser pyrolysis, although the throughput and the reactant stream size may be designed to be appropriate for the coating process. For these embodiments, the coating chamber and a conduit connecting the coating chamber with the reaction chamber replace the collection system of the laser pyrolysis system.

Figure 14:
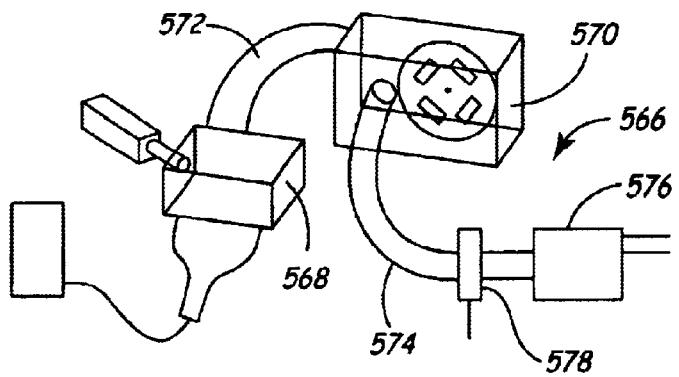
FIG. 14 is a schematic diagram of a light reactive deposition apparatus formed with a particle production apparatus connected to a separate coating chamber through a conduit.

A coating apparatus with a separate reaction chamber and a coating chamber is shown schematically in FIG. 14. Referring to FIG. 14, the coating apparatus 566 comprises a reaction chamber 568, a coating chamber 570, a conduit 572 connecting the reaction apparatus with coating chamber 570, an exhaust conduit 574 leading from coating chamber 570 and a pump 576 connected to exhaust conduit 574. A valve 578 can be used to control the flow to pump 576. Valve 578 can be, for example, a manual needle valve or an automatic throttle valve. Valve 578 can be used to control the pumping rate and the corresponding chamber pressures.

Figure 15:
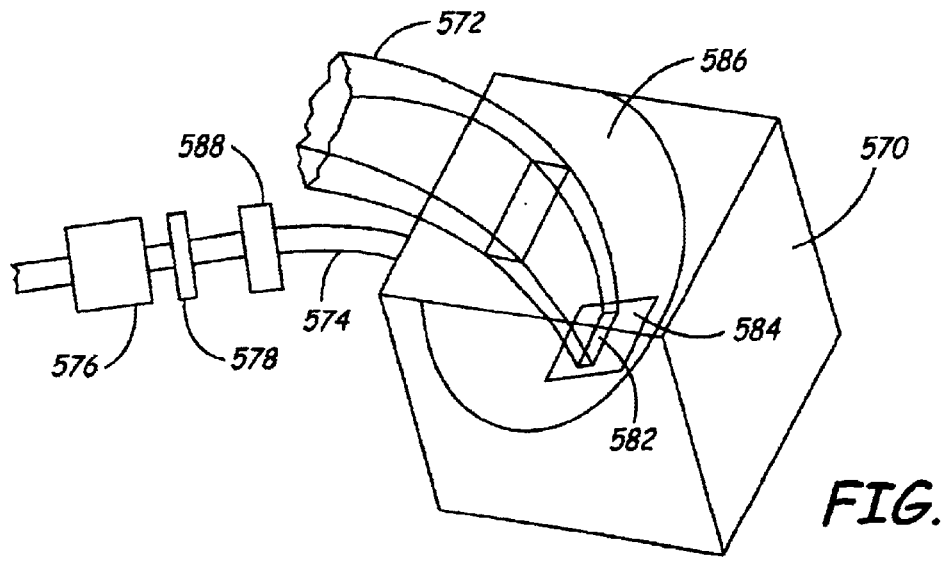
FIG. 15 is a perspective view of a coating chamber where the walls of the chamber are transparent to permit viewing of the internal components.

Referring to FIG. 15, conduit 572 from the particle production apparatus 568 leads to coating chamber 570. Conduit 572 terminates at opening 582 within chamber 570. In some embodiments, opening 572 is located near the surface of substrate 584 such that the momentum of the particle stream directs the particles directly onto the surface of substrate 584. Substrate 584 can be mounted on a stage or other platform 586 to position substrate 584 relative to opening 582. A collection system, filter, scrubber or the like 588 can be placed between the coating chamber 570 and pump 576 to remove particles that did not get coated onto the substrate surface.

Figure 16:
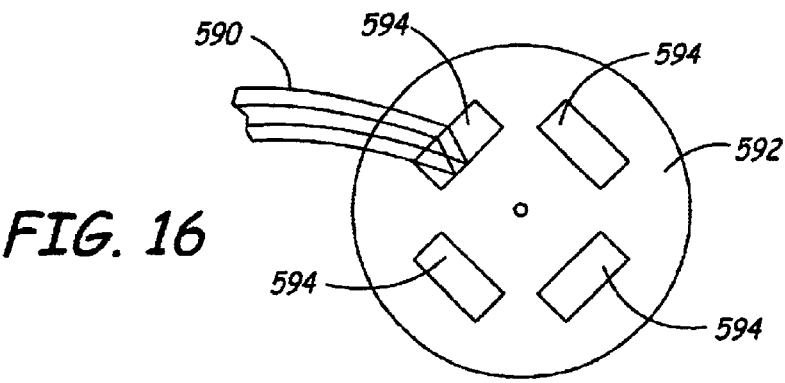
FIG. 16 is perspective view of a particle nozzle directed at a substrate mounted on a rotating stage.
Figure 17:
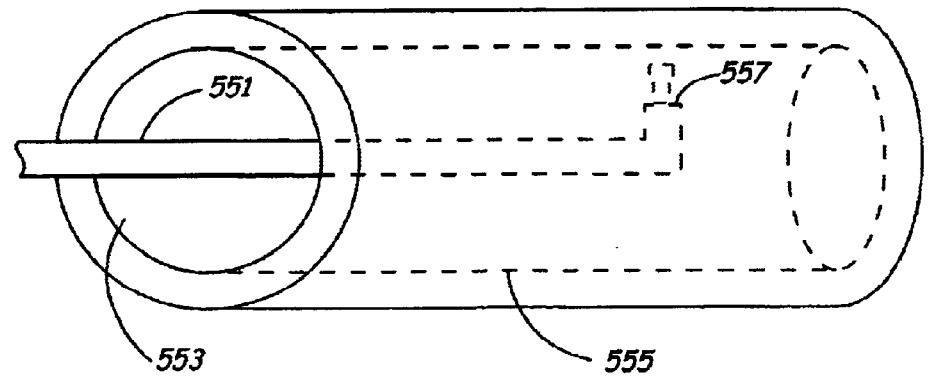
FIG. 17 is a fragmentary perspective view of a conduit within a preform structure for depositing a powder coating within a cavity within the preform structure in which hidden structure is shown with phantom lines.

An embodiment of a stage to position a substrate relative to the conduit from the particle production apparatus is shown in FIG. 16. A particle nozzle 590 directs particles toward a rotating stage 592. As shown in FIG. 16, four substrates 594 are mounted on stage 592. More or fewer substrates can be mounted on a moveable stage with corresponding modifications to the stage and size of the chamber. Movement of stage 592 sweeps the particle stream across a substrate surface and positions particular substrate 594 within the path of nozzle 590. As shown in FIG. 16, a motor is used to rotate stage 592. Stage 592 can comprise thermal control features that provide for the control of the temperature of the substrates on stage 592. Alternative designs involve the linear movement of a stage or other motions. In other embodiments, the particle stream is unfocused such that an entire substrate or the desired portions thereof is simultaneously coated without moving the substrate relative to the product flow.

Figure 18:
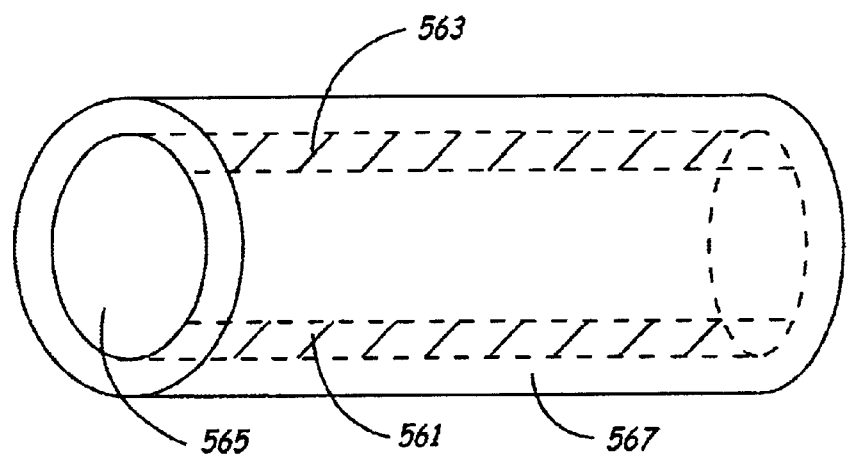
FIG. 18 is a perspective view of a preform structure with stripes of powder coatings.
Figure 19:
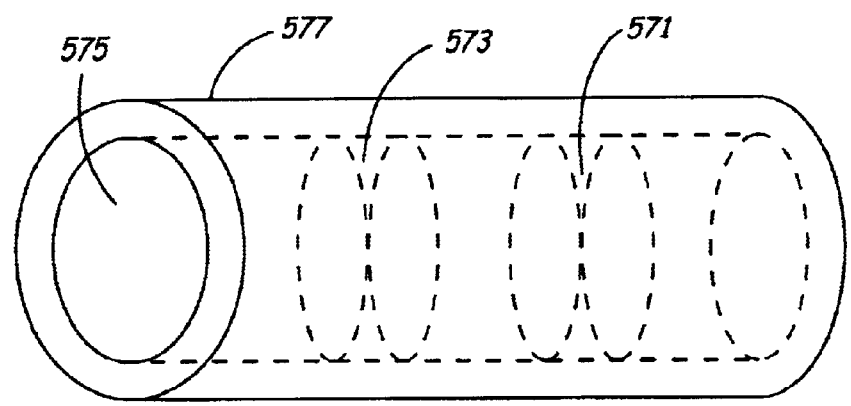
FIG. 19 is a perspective view of a preform structure with bands of powder coating.

In alternative or additional embodiments, the conduit directing the particle flow from the reaction chamber can be directed specifically within a cavity of a preform structure. In other words, the substrate for coating is essentially an internal surface of a cavity of a preform structure. An Tip 557 of conduit 551 direct particles at a selected portion of cavity 553. The positioning of conduit 551 relative to cavity 553 can be varied with respect to degree of insertion and/or orientation around the inner surface of cavity 553. By selecting the relative orientations appropriately during the coating process, an approximately uniform coating can be deposited, or patterns can be deposited. For example, one or more stripes of powder coating can be formed, as shown schematically in FIG. 18, with the number, sizes, thickness and position selected as desired. As shown in FIG. 18, stripes 561, 563 are within cavity 565 of preform structure 567. Similarly, bands 571, 573 of powder coating within cavity 575 of preform structure 577 are shown in FIG. 19. Other shapes of powder coating, such as spiral stripes, can be similarly formed. The stripes/bands can have the same composition as each other or different compositions such that different compositions are placed at selected locations within a cavity of the preform structure. In addition, if the particles are directed into the cavity of a preform, the particles can be directed to selected areas by cooling selected portions of the preform to have the particles stick to the cooled portions. Cooling coils can be placed at a particular area of the preform to induce the sticking. Desired shapes and regions of the cavity can be selected for coating by the placement of the cooling coils on the outside of the preform structure adjacent the selected areas.

Figure 20:
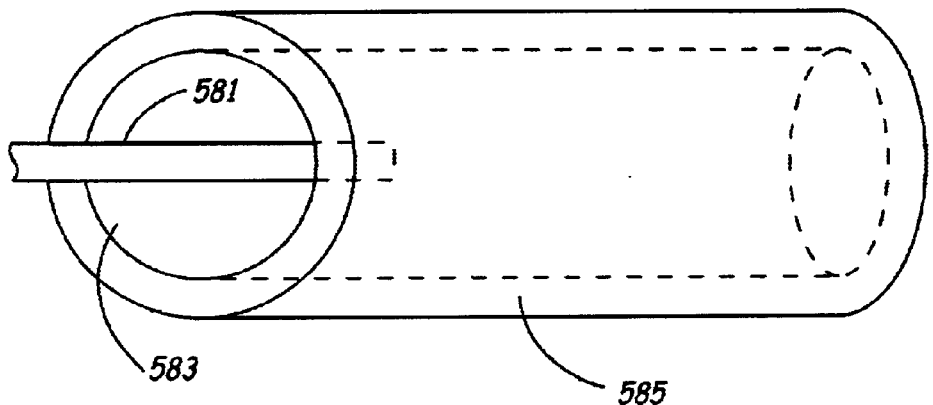
FIG. 20 is a fragmentary perspective view of a preform structure with a conduit positioned for directing particles for a powder coating directly into a cavity in the preform structure.

In additional or alternative embodiments, the conduit can be directed to fill the cavity with a powder coating without forming a pattern. An embodiment for forming the powder coating-filling is shown schematically in FIG. 20. As shown in FIG. 20, conduit 581 is directed approximately to the center of cavity 583 of preform structure 585. The conduits and preforms in FIGS. 17–20 and in similar embodiments can be placed within a coating chamber. The composition of the powder coating can be the same throughout the filling process or it can be changed to deposit different compositions at different depths within the cavity.

If the coating is performed within the reaction chamber, the substrate is mounted to receive product compositions flowing from the reaction zone. The compositions/particles may not be fully solidified into solid particles, although quenching may be fast enough to form solid particles. Whether or not the compositions are solidified into solid particles, the particles can be highly uniform. In some embodiments, the substrate is mounted near the reaction zone. In general, the substrate/wafer is placed in the range(s) from about 1 millimeter (mm) to about 1 meter coaxial to the reactant flow vector measured from the radiation beam edge, i.e., the downstream locus of points where the radiation intensity is a factor of $1/e^2$ of the maximum beam intensity, in other embodiments in the range(s) from about 2 mm to 50 centimeters (cm), and in further embodiments in the range(s) from about 3 mm to about 30 cm, although in some circumstances it is conceived that distances less than 1 mm and/or greater than 1 meter can have utility. A person of ordinary skill in the art will understand that additional ranges within the explicit ranges of substrate distances are conceived and are within the present disclosure. If the substrate is closer to the reaction zone, the coating process is more dynamic since the well defined product flow can be directed to desired substrate locations. However, if the substrate is placed farther away from the reaction zone, the coating process is more static in the sense that a more diffuse cloud of product particles is directed at the substrate.

Figure 21:
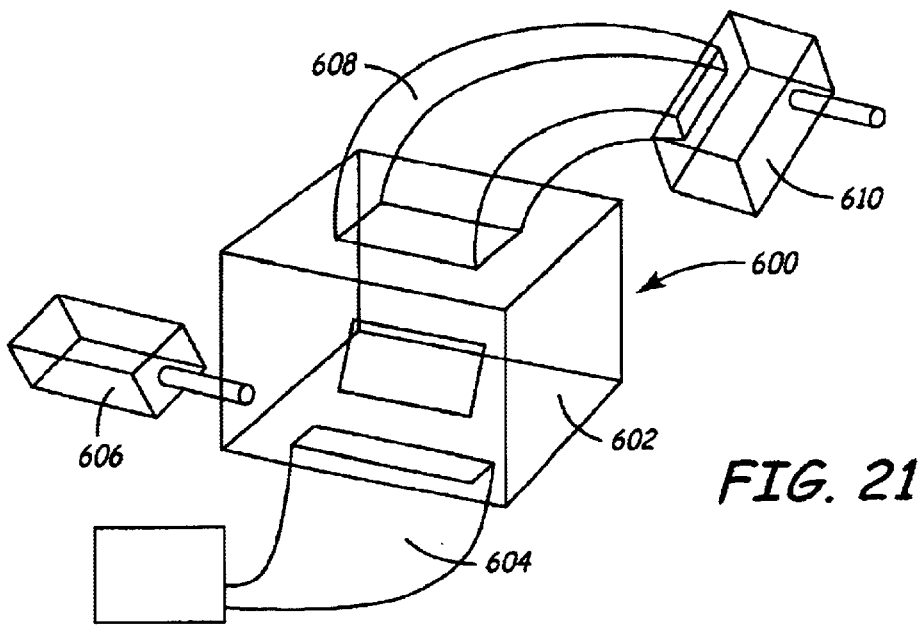
FIG. 21 is a schematic diagram of a light reactive deposition apparatus in which a particle coating is applied to a substrate within the particle production chamber.

An apparatus 600 to perform substrate coating within the reaction chamber is shown schematically in FIG. 21. The reaction/coating chamber 602 is connected to a reactant supply system 604, a radiation source 606 and an exhaust 608. Exhaust 608 can be connected to a pump 610, although the pressure from the reactants themselves can maintain flow through the system.

Figure 22:
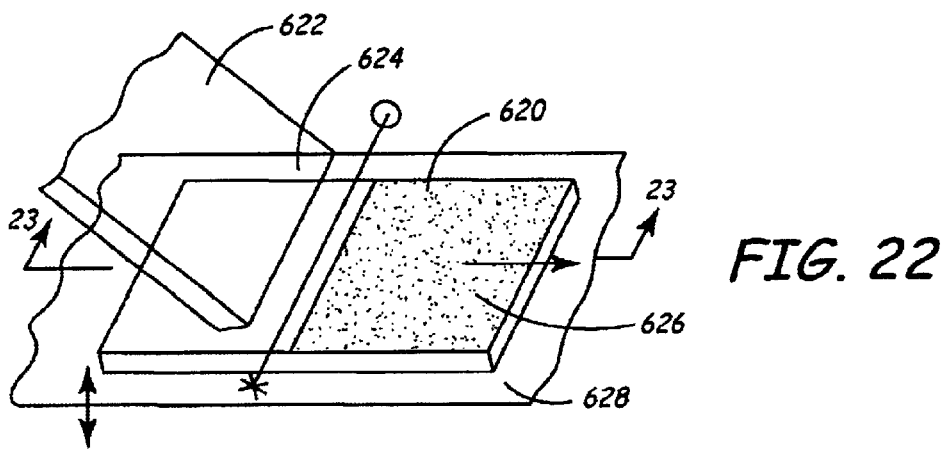
FIG. 22 is a perspective view of a reactant nozzle delivering reactants to a reaction zone positioned near a substrate.
Figure 23:
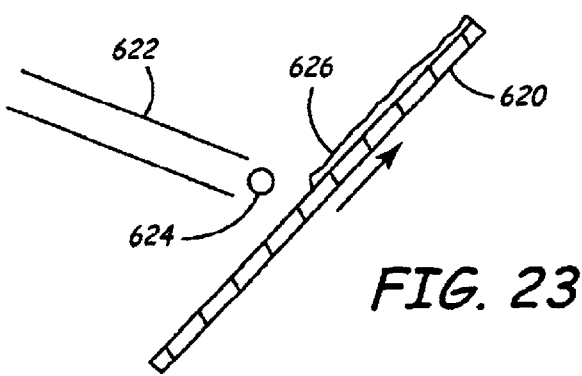
FIG. 23 is a sectional view of the apparatus of FIG. 22 taken along line 23—23.

Various configurations can be used to sweep the coating across the substrate surface as the product leaves the reaction zone. One embodiment is shown in FIGS. 22 and 23. A substrate 620 moves relative to a reactant nozzle 622, as indicated by the right directed arrow. The reactant nozzle and/or the substrate can move relative to the reaction chamber. Reactant nozzle 622 is located just above substrate 620. An optical path 624 is defined by suitable optical elements that direct a radiation, e.g., light, beam along path 624. Optical path 624 is located between nozzle 622 and substrate 620 to define a reaction zone just above the surface of substrate 620. The hot particles tend to stick to the substrate surface. A sectional view is shown in FIG. 23. A particle coating 626 is formed as the substrate is scanned past the reaction zone.

In general, substrate 620 can be carried on a conveyor 628 or a turret (turntable). In some embodiments, the position of conveyor 628 can be adjusted to alter the distance from substrate 626 to the reaction zone. A change in the distance from substrate to the reaction zone correspondingly alters the temperature of the particles striking the substrate. The temperature of the particles striking the substrate generally alters the properties of the resulting coating and the conditions for subsequent processing, such as a subsequent heat processing consolidation of the coating. The distance between the substrate and the reaction zone can be adjusted empirically to produce desired coating properties. In addition, the stage/conveyor supporting the substrate can include thermal control features such that the temperature of the substrate can be adjusted to higher or lower temperatures, as desired.

Figure 24:
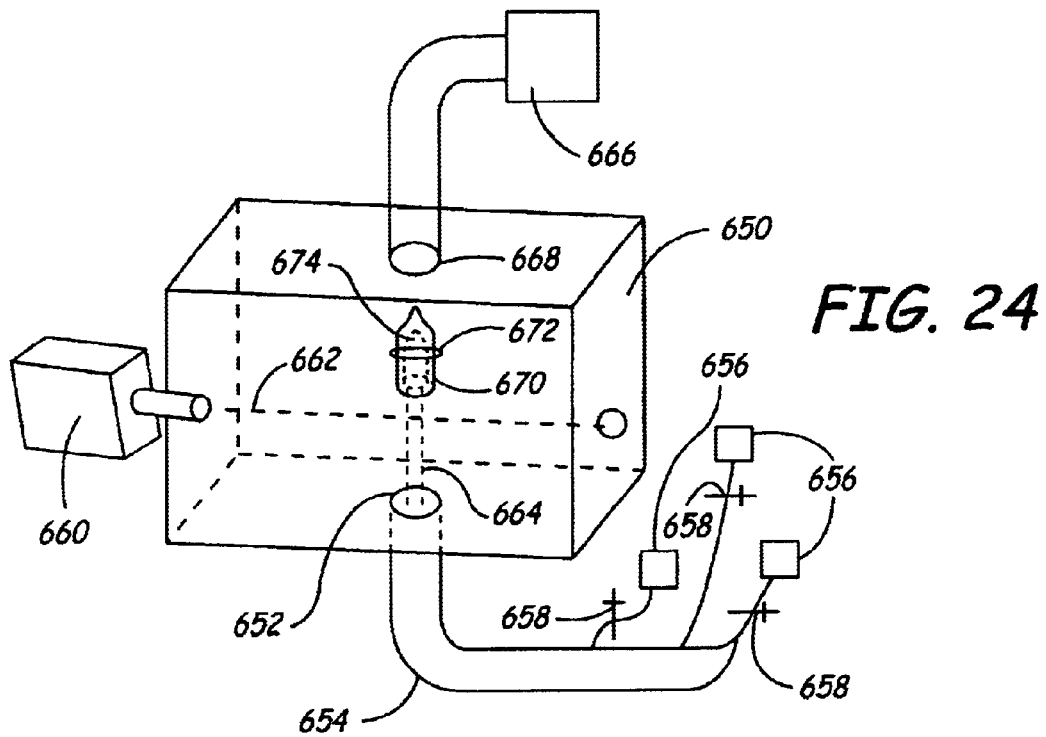
FIG. 24 is a schematic perspective view of a light reactive deposition apparatus for directly depositing a powder coating within a preform structure within a coating chamber.

As noted above, the preform structure within the reaction chamber can be used as a coating substrate in which the particles are directed within a cavity of the preform structure. One embodiment of this process is shown schematically in FIG. 24. Reaction chamber 650 includes an inlet nozzle 652 connected to a reactant delivery system 654 with a plurality of reactant sources 656. Flow from reactant sources 656 can be controlled with manual or automatic valves 658. Light source 660 produces a light beam 662 that intersects a reactant stream 664 from inlet nozzle 652. Pump 666 connects to outlet 668. Preform structure 670 supported by mount 672 is placed in the flow from inlet 652 to outlet 668. Product particles formed within reactant stream 664 flow into cavity 674 within preform structure 670.

Figure 25:
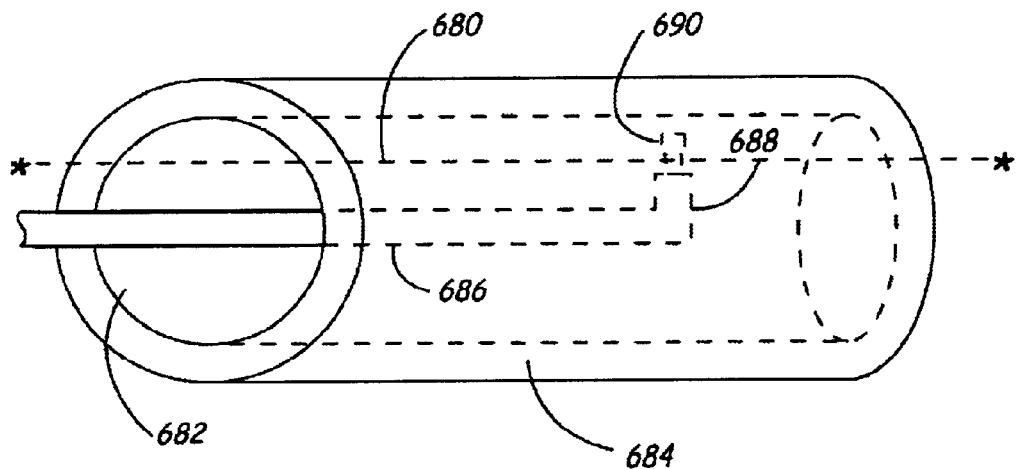
FIG. 25 is a fragmentary perspective view of an embodiment with a radiation beam and a reactant nozzle extending into the cavity of a preform structure such that the radiation driven reaction takes place within the cavity to form a powder coating within the cavity.

In an alternative embodiment, the radiation driven reaction takes place within the cavity of the preform structure. The radiation beam is directed through the preform structure. A representative embodiment with the radiation beam projected through the preform structure is shown in FIG. 25. Specifically, radiation beam 680 is directed through cavity 682 in preform structure 684. Reactant inlet nozzle 686 also extends into cavity 682. Tip 688 of nozzle 686 is oriented to direct a reactant stream, in some embodiments a gas/vapor reactant stream, to intersect with radiation beam 680. The resulting product stream 690 is directed toward the walls of cavity 682 to form a powder coating. Nozzle 686 and/or the preform structure can be moved, e.g., translated and/or rotated, to place the coating at selected positions within the preform structure.

The well-defined reactant stream as a sheet of flow leading into the reaction zone tends to spread after the reaction zone due to heat from the reaction. The distance of the preform structure from the radiation/light reaction zone can be selected to direct a product stream with appropriate dimensions relative to the cavity of the preform structure such that a larger portion of the product flow is retained within the preform structure. Furthermore, an edge cover/mask can be placed at the opening of the cavity to direct more flow of the product into the cavity and/or to reduce or eliminate unwanted produce from depositing on the outside of the preform structure.

In some embodiments, the composition of the product particle flow can be changed in time during the deposition process to coat different compositions at different depths within the preform structure. If the composition is changed continuously, a continuous composition gradient through the cavity can result. Alternatively, the composition can be altered in one or more stepwise changes. In some embodiments, the reactant flow can comprise vapor and/or aerosol reactants, which can be varied to alter the composition of the products. In particular, concentrations of elements can be changed by varying the composition and/or quantity of elements in the flow. While product particle composition changes can be introduced by changing the reactant flow composition and/or the reaction conditions while depositing particles from the product stream, the deposition can be stopped between the different deposition steps involving the different compositions.

Figure 26:
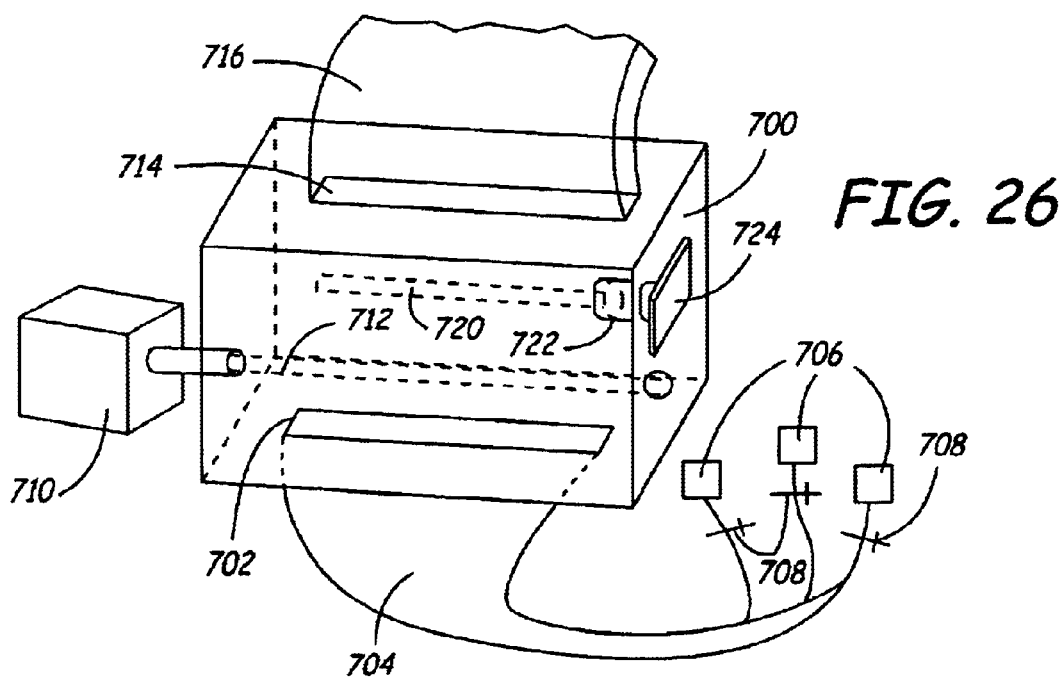
FIG. 26 is a schematic perspective view of a light reactive deposition apparatus configured to coat a preform insert within the coating chamber.

The coating of an insert/rod by light reactive deposition in a reaction chamber is shown schematically in FIG. 26. Reaction chamber 700 has a reactant inlet 702 connected to a reactant delivery system 704. Reactant delivery system 704 includes reactant sources 706. Flow from reactant sources 156 can be controlled by manual or automatic valves 708. Light source 710 generates a light beam 712 through reaction chamber 700 that intersects flow from reactant inlet 702 at a light reaction zone. Flow then continues to an outlet 714 that connects to a duct 716 that leads to a pump. Insert 720 is placed in the flow path from the light reaction zone to outlet 714. Insert 720 is supported by a mount 722 that rotates by way of motor 724. The resulting coated insert/rod 720 can be inserted within a cavity of a preform structure to form the optical fiber preform. In alternative or additional embodiments, a similar coating for an insert can be performed with a product flow outside of the reaction chamber, for example, in a coating chamber, by combining the features of the insert coating of FIG. 26 with the product particle coating features of FIGS. 14–17 and 20.

For any of the coating configurations, the intersection of the flow with the substrate deflects the trajectory of the flow. Thus, it may be desirable to alter the position of the reaction chamber outlet to account for the change in direction of the flow due to the substrate. For example, it may be desirable to alter the chamber design to direct the reflected flow to the outlet and/or to change the position of the outlet accordingly.

The temperature of the substrate during the deposition process can be adjusted to achieve particular objectives. For example, the substrate can be cooled during the deposition process since a relatively cool substrate can attract the particles to its surface through thermophoretic force. However, in some embodiments, the substrate is heated, for example to about 500° C., during the deposition process. In embodiments in which the substrate is close enough to the reaction zone, the particles may be in a semi-molten state when they reach the substrate surface. Semi-molten particles may deform upon impact and may stick better due to the deformation. In addition, the particles tend to compact and fuse on a heated substrate such that a subsequent consolidation of the coating into a fused glass or other material is facilitated if the coating were formed initially on a heated substrate.

The formation of coatings by light reactive deposition, silicon glass deposition and optical devices in general are described further in copending and commonly assigned U.S. patent application Ser. No. 09/715,935 to Bi et al., entitled "Coating Formation By Reactive Deposition," incorporated herein by reference, and in copending and commonly assigned PCT application designating the U.S. serial number PCT/US01/32413 to Bi et al. filed on Oct. 16, 2001, entitled "Coating Formation By Reactive Deposition," incorporated herein by reference. Also, using light reactive deposition, a range of effective approaches are available to vary the chemical composition of optical materials within layers and in different layers to form three-dimensional optical structures with selected compositions at selected positions within the material. The patterning of compositions of optical materials during the deposition process is described further in copending and commonly assigned U.S. patent application Ser. No. 10/027,906 to Bi et al., entitled "Three Dimensional Engineering of Optical Structures," incorporated herein by reference.

As described in detail above, laser pyrolysis apparatuses and corresponding light reactive deposition apparatuses have been designed for the production of commercial quantities of submiron/nanoscale powders and powder coatings. Alternatively or in addition, the invention provides that the rate of production and/or deposition of the particles can be varied substantially, depending on a number of factors (e.g., the starting materials being utilized, the desired reaction product, the reaction conditions, the deposition efficiency, and the like, and combinations thereof). Thus, in one embodiment, the rate of particle production can vary in the range(s) from about 5 grams per hour of reaction product to about 10 kilograms per hour of desired reaction product. Specifically, using apparatuses described herein, coating can be accomplished at particle production rates in the range(s) of up to at least about 10 kilograms per hour (kg/hr), in other embodiments in the range(s) of at least about 1 kg/hr, in further embodiments with lower production rates in the range(s) of at least about 250 grams per hour (g/hr) and in additional embodiments in the range(s) of at least about 50 g/hr. A person of ordinary skill in the art will recognize that production rates intermediate between these explicit production rates are contemplated and are within the present disclosure. Exemplary rates of particle production (in units of grams produced per hour) include in the range(s) of not less than about 5, 10, 50, 100, 250, 500, 1000, 2500, 5000, or 10000.

Not all of the particles generated are deposited within the preform structure/substrate. In general the deposition efficiency depends on, for example, the position of the preform structure as well as the size of the reactant flow and flow rates. In general, with the achievable particle production rates and deposition efficiencies, deposition rates can be obtained in the range(s) of at least about 5 g/hr, in other embodiments in the range(s) of at least about 25 g/hr, in further embodiments in the range(s) of at least from about 100 g/hr to about 5 kg/hr and in still other embodiment in the range(s) from about 250 g/hr to about 2.5 kg/hr. A person of ordinary skill in the art will recognize that deposition rates between these explicit deposition rates are contemplated and are within the present disclosure. Exemplary rates of particle deposition (in units of grams deposited per hour) include in the range(s) of not less than about 0.1, 0.5, 1, 5, 10, 25, 50, 100, 250, 500, 1000, 2500, or 5000.

Particle and Coating Properties

Laser pyrolysis/light reactive deposition is particularly suitable for the formation of highly uniform particles, especially submicron/nanoscale particles. The particles can be collected for further processing, or the particles can be directly deposited onto a substrate to form a particle coating. Small particle size and particle uniformity can contribute overall to the uniformity of the resulting coating, for example, with respect to composition as well as the smoothness of the surface and interfaces between materials. In particular, the lack of particles significantly larger than the average can lead to a more uniform coating.

A collection of particles of interest generally has an average diameter for the primary particles in the range(s) of less than about 2500 nm, in most embodiments in the range(s) less than about 1000 nm, in further embodiments in the range(s) less than about 500 nm, in additional embodiments in the range(s) less than about 250 nm, in other embodiments in the range(s) from about 1 nm to about 100 nm, in some embodiments in the range(s) from about 2 nm to about 95 nm, in further embodiments in the range(s) from about 3 nm to about 75 nm, and still other embodiments in the range(s) from about 5 nm to about 50 nm. A person of ordinary skill in the art will recognize that other average diameter ranges within these specific ranges are also contemplated and are within the present disclosure. Particle diameters generally are evaluated by transmission electron microscopy. Diameter measurements on particles with asymmetries are based on an average of length measurements along the principle axes of the particle. In general, a collection of particles, as described herein, has substantially all primary particles that are not fused, i.e., hard bonded to remove a distinct separable interface, although they can be attracted by electrostatic forces, as described below. Powder coatings, which maintain characteristics of the primary particles, are described further above and below.

Particles refer to dispersable units within the collection of particles. Thus, hard fused primary particles collectively form a particle. Primary particles represent distinguishable units in a transmission electron micrograph, which can be hard fused as indicated by necking or the like in the micrograph. The degree of hard fusing can require some effort to evaluate. In particular, the particles can be dispersed in a liquid in which they are insoluble to evaluate how the secondary particle size, i.e., the dispersed particle size, compares with the primary particle size. To the extent that the secondary particle size is approximately equal to the primary particle size, little if any hard fusing of the primary particles is present. In other words, if the primary particles are substantially unfused, the average particle size is approximately equal to the average primary particle size, and the particle size distribution is approximately equal to the primary particle size distribution. The dispersion of the particles in a liquid can involve some empirical adjustment to fully disperse the particles with respect to any soft fusing, which are generally characterized by weak electrostatic interactions. The formation of particle dispersions is described further, for example, in copending U.S. patent application Ser. No. 09/433,202 to Rietz et al., entitled "Particle Dispersions," and in copending U.S. patent application Ser. No. 09/818,141 to Kambe et al., entitled "Polymer-Inorganic Particle Composites," both of which are incorporated by reference.

Depending on the composition of the particles, some particles are more prone to hard fusing than other particles. Laser pyrolysis/light reactive deposition provide a versatile approach for forming unfused particles with a wide range of compositions. In particular, the reactions conditions can be altered to ensure that substantially no hard fusing of the particles occurs. Specifically, the reactant density can be selected to be low enough that substantially no hard particle fusing occurs. The overall reaction conditions can be maintained by the inclusion of inert diluent gas(es) to compensate for the flow changes in the reactant precursors. The reactant nozzle can be further elongated to maintain the desired particle production rate while operating under conditions in which substantially no hard particle fusing occurs. As noted above, the reactant inlet nozzle can be elongated to large lengths while effectively performing laser pyrolysis/light reactive deposition. Thus, high quality substantially unfused particles of desired compositions can be formed at high rates based on the disclosure herein.

The primary particles usually have a roughly spherical gross appearance. Upon closer examination, crystalline particles generally have facets corresponding to the underlying crystal lattice, for crystalline particles. Nevertheless, crystalline primary particles tend to exhibit growth in laser pyrolysis that is roughly equal in the three physical dimensions to give a gross spherical appearance. Amorphous particles generally have an even more spherical aspect. In some embodiments, in the range(s) of at least about 75 percent of the primary particles, in further embodiments in the range(s) of at least about 85 percent, in other embodiments in the range(s) of at least about 95 percent, and in additional embodiments in the range(s) of about 99 percent, have ratios of the dimension along the major axis to the dimension along the minor axis less than about 2.

A variety of chemical particles, generally solid particles, can be produced by the methods described herein. Solid particles generally are deposited as powders. For some applications, it is desirable to have very uniform particles. Processes using focused radiation are particularly suitable for the formation of highly uniform particles, especially submicron/nanoscale particles. In laser pyrolysis, the collector generally is placed a sufficient distance from the reaction zone such that the particles are well quenched when they reach the collector. If the reaction conditions are controlled appropriately, the primary particles are quenched such that they are formed as independent primary particles with substantially no hard fusing, i.e., non-dispersable fusing, to other primary particles.

Because of their small size, the primary particles tend to form loose agglomerates, following collection, due to van der Waals and other electromagnetic forces between nearby particles. These agglomerates can be dispersed to a significant degree or essentially completely, if desired. Even though the particles may form loose agglomerates, the submiron/nanoscale of the primary particles is clearly observable in transmission electron micrographs of the particles. The particles generally have a surface area corresponding to particles on a submicron/nanoscale as observed in the micrographs. Furthermore, the particles can manifest unique properties due to their small size and large surface area per weight of material. For example, vanadium oxide submicron/nanoscale particles can exhibit substantially high energy densities in lithium batteries, as described in U.S. Pat. No. 5,952,125 to Bi et al., entitled "Batteries With Electroactive Nanoparticles," incorporated herein by reference.

The primary particles can have a high degree of uniformity in size. Laser pyrolysis, as described above, generally results in particles having a very narrow range of particle diameters. Furthermore, heat processing under suitably mild conditions does not alter the very narrow range of particle diameters. With aerosol delivery of reactants for laser pyrolysis, the distribution of particle diameters is particularly sensitive to the reaction conditions. Nevertheless, if the reaction conditions are properly controlled, a very narrow distribution of particle diameters can be obtained with an aerosol delivery system. As determined from examination of transmission electron micrographs, the primary particles generally have a distribution in sizes such that in the range(s) of at least about 80 percent, in other embodiments in the range(s) of at least about 95 percent, and in some embodiments in the range(s) 99 percent, of the primary particles have a diameter greater than about 40 percent of the average diameter and less than about 700 percent of the average diameter. In further embodiments, the primary particles generally have a distribution in sizes such that in the range(s) of at least about 80 percent, in other embodiments in the range(s) of at least about 95 percent, and in some embodiments in the range(s) 99 percent, of the primary particles have a diameter greater than about 40 percent of the average diameter and less than about 300 percent of the average diameter. In alternative or additional embodiments, the primary particles have a distribution of diameters such that in the range(s) of at least about 95 percent, and in further embodiments in the range(s) 99 percent, of the primary particles have a diameter greater than about 45 percent of the average diameter and less than about 200 percent of the average diameter. A person of ordinary skill in the art will recognize that other ranges within these explicit ranges are contemplated and are within the present disclosure.

Furthermore, in some embodiments effectively no primary particles have an average diameter in the range(s) of greater than about 10 times the average diameter, in some embodiments in the range(s) of greater than about 5 times the average diameter, in further embodiments in the range(s) of greater than about 4 times the average diameter, in additional embodiments in the range(s) of greater than about 3 times the average diameter, and in other embodiment in the range(s) greater than about 2 times the average diameter. A person of ordinary skill in the art will recognize that other ranges of distribution cut-offs within these explicit ranges are contemplated and are within the present disclosure. In other words, the particle size distribution effectively does not have a tail indicative of a small number of particles with significantly larger sizes relative to the average size. This cut-off in the particle size distribution is a result of the small reaction zone and corresponding rapid quench of the particles. An effective cut off in the tail of the size distribution indicates that there are less than about 1 particle in $10^6$ that have a diameter greater than a specified cut off value above the average diameter. In some embodiments, the evaluation of the lack of a tail can be performed with computational analysis of transmission electron microscopy micrographs. Narrow size distributions, lack of a tail in the distributions and/or the roughly spherical morphology can be exploited in a variety of applications.

In addition, the submiron/nanoscale particles generally have a very high purity level. Furthermore, crystalline submicron/nanoscale particles produced by laser pyrolysis can have a high degree of crystallinity. Certain impurities on the surface of the particles may be removed by heating the particles to temperatures below their sintering temperatures to achieve not only high crystalline purity but high purity overall.

When collecting the particles directly onto a substrate surface or within a corresponding cavity or the like, the distance from the substrate to the reaction zone and the temperature of the substrate can be adjusted to control the character of the deposit on the substrate surface. The deposited particles form a powder coating. The powder coating can be in the form of independent primary particles randomly stacked in the coating. The coating of primary particles may only be held together by electromagnetic forces between adjacent and nearby particles. In some embodiments, it may be desirable to form a powder coating with some degree of hard fusing between primary particles. Fusing between primary particles can be achieved by placing the substrate closer to the reaction zone such that the particles are not fully quenched when they strike the substrate surface and/or by heating the substrate, for example, using a wafer heating apparatus, the flame resulting from the reaction of non-particle producing reactants, and/or the gases emanating from the reaction zone during particle production. Even if the primary particles are hard fused, the resulting powder coating maintains characteristics due to the submicron/nanoscale size of the primary particles. In particular, primary particles incorporated into the powder coating may be visible in scanning electron micrographs. In addition, channels between fused particles generally will reflect the submicron/nanoscale of the surrounding fused particles, e.g., by having submicron/nanoscale diameter channels extending into the powder coating. Thus, the submicron/nanoscale character of the primary particles is built into the resulting powder coating formed from the submicron/nanoscale primary particles.

While submicron/nanoscale particles can in principle pack densely on a surface due to their small size, the particles tend to coat a surface as a loose collection due to electrostatic forces between the particles. The relative or apparent density of the powder coating can depend on the particle size, particle composition and the deposition conditions, which may affect particle fusing as well as the forces between the particles and with the surface. The relative density is evaluated relative to the fully densified material of the same composition. In general, the relative density for the powder coating formed from submicron/nanoscale particles is in the range(s) of less than about 0.6, in other embodiments in the range(s) from about 0.02 to about 0.55 and in further embodiments in the range(s) from about 0.05 to about 0.4. A person of ordinary skill in the art will recognize that additional ranges within these specific ranges are contemplated and are within the present disclosure.

The quantities of the material within the powder coating can depend on the particular desired characteristics of the resulting optical fiber preform. In particular, the desired overall composition of the fiber core or other structure incorporating the elements from the particles/powder coating within the fiber formed from the optical fiber preform can be used to determine the corresponding quantity of particles/powder coating to deposit. The size of a cavity, thickness of coating on an insert and/or the density of the deposited material, for example, can also be adjusted as appropriate.

Heat Processing

Significant properties of submicron/nanoscale particles can be modified by heat processing. Suitable starting material for the heat treatment include particles produced by laser pyrolysis. In addition, particles used as starting material for a heat treatment process can have been subjected to one or more prior heating steps under different conditions. For the heat processing of particles formed by laser pyrolysis or other method, the additional heat processing can improve/alter the crystallinity, remove contaminants, such as elemental carbon, and/or alter the stoichiometry, for example, by incorporation of additional oxygen or another element or removal of oxygen or another element to change the oxidation state of a metal/metalloid element. Furthermore, a heat processing process can be used to alter the composition of the particles, for example, by the introduction of another metal/metalloid element(s) into the particles, which can be accompanied by changes in other elements, such as oxygen, also.

In some embodiments of interest, mixed metal/metalloid oxides formed by laser pyrolysis can be subjected to a heat processing step. This heat processing can convert the particles into desired high quality crystalline forms, if not formed in a desired form. The heat treatment can be controlled to substantially maintain the submicron/nanoscale size and size uniformity of the particles from laser pyrolysis. In other words, particle size is not compromised significantly by thermal processing.

The particles can be heated in an oven or the like to provide generally uniform heating. The processing conditions generally are mild, such that significant amounts of particle sintering does not occur. Thus, the temperature of heating can be low relative to the melting point of the starting material and the product material.

The atmosphere over the particles can be static, or gases can be flowed through the system. The atmosphere for the heating process can be an oxidizing atmosphere, a reducing atmosphere, a reactive atmosphere (such as $H_2S$ for sulfidation) or an inert atmosphere. In particular, for conversion of amorphous particles to crystalline particles or from one crystalline structure to a different crystalline structure of essentially the same stoichiometry, the atmosphere generally can be inert.

Appropriate oxidizing gases include, for example, $O_2$, $O_3$, $CO$, $CO_2$, and combinations thereof. The $O_2$ can be supplied as air. Reducing gases include, for example, $H_2$ and $NH_3$. The oxidizing/reducing nature of the gas flow can be adjusted to yield desired oxidation states of metal/metalloid elements in the particles. For example, a reducing atmosphere can be used for the heat treatment of $BaMgAl_{14}O_{23}$ doped with europeum since the europeum is generally supplied in a +3 state while it operates as a phosphor activator in a +2 state. Oxidizing gases or reducing gases optionally can be mixed with inert gases such as Ar, He and $N_2$. When inert gas is mixed with the oxidizing/reducing gas, the gas mixture can include in the range(s) from about 1 percent oxidizing/reducing gas to about 99 percent oxidizing/reducing gas, and in other embodiments in the range(s) from about 5 percent oxidizing/reducing gas to about 99 percent oxidizing/reducing gas. Alternatively, essentially pure oxidizing gas, pure reducing gas or pure inert gas can be used, as desired. Care must be taken with respect to the prevention of explosions when using highly concentrated reducing gases.

The precise conditions can be altered to vary the type of metal/metalloid oxide particles that are produced. For example, the temperature, time of heating, heating and cooling rates, the surrounding gases and the exposure conditions with respect to the gases can all be selected to produce desired product particles. Generally, while heating under an oxidizing atmosphere, the longer the heating period the more oxygen that is incorporated into the material, prior to reaching equilibrium. Once equilibrium conditions are reached, the overall conditions determine the crystalline phase of the powders.

Figure 27:
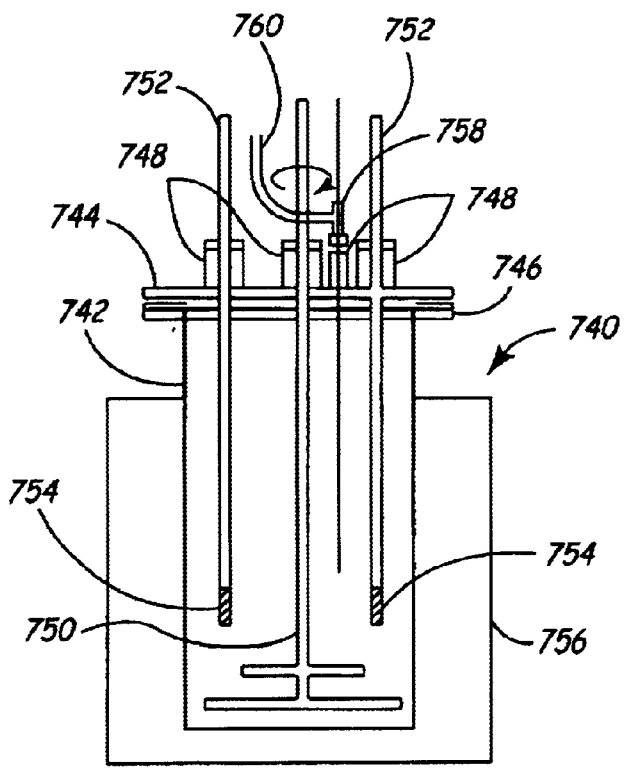
FIG. 27 is a schematic, sectional view of an apparatus for heat treating submicron/nanoscale particles, in which the section is taken through the center of the apparatus.

A variety of ovens or the like can be used to perform the heating. An example of an apparatus 500 to perform this processing is displayed in FIG. 27. Apparatus 740 includes a jar 742, which can be made from glass or other inert material, into which the particles are placed. Suitable glass reactor jars are available from Ace Glass (Vineland, N.J.).

For higher temperatures alloy jars can be used to replace the glass jars. The top of glass jar 702 is sealed to a glass cap 744, with a Teflon® gasket 746 between jar 742 and cap 744. Cap 744 can be held in place with one or more clamps. Cap 744 includes a plurality of ports 748, each with a Teflon® bushing. A multiblade stainless steel stirrer 750 can be inserted through a central port 748 in cap 744. Stirrer 750 is connected to a suitable motor.

One or more tubes 752 are inserted through ports 748 for the delivery of gases into jar 742. Tubes 752 can be made from stainless steel or other inert material. Diffusers 754 can be included at the tips of tubes 752 to disperse the gas within jar 742. A heater/furnace 756 generally is placed around jar 742. Suitable resistance heaters are available from Glas-col (Terre Haute, Ind.). One port can include a T-connection 758. The temperature within jar 742 can be measured with a thermocouple 758 inserted through T-connection 758. T-connection 758 can be further connected to a vent 760. Vent 760 provides for the venting of gas circulated through jar 742. Vent 760 can be vented to a fume hood or alternative ventilation equipment.

Desired gases can be flowed through jar 742. Tubes 752 generally are connected to an oxidizing/reducing gas source and/or an inert gas source. Oxidizing gas/reducing gas, inert gas or a combination thereof to produce the desired atmosphere is placed within jar 742 from the appropriate gas source(s). Various flow rates can be used. The flow rate can be between about 1 standard cubic centimeters per minute (sccm) to about 1000 sccm and in other embodiments from about 10 sccm to about 500 sccm. The flow rate generally is constant through the processing step, although the flow rate and the composition of the gas can be varied systematically over time during processing, if desired. Alternatively, a static gas atmosphere can be used.

Figure 28:
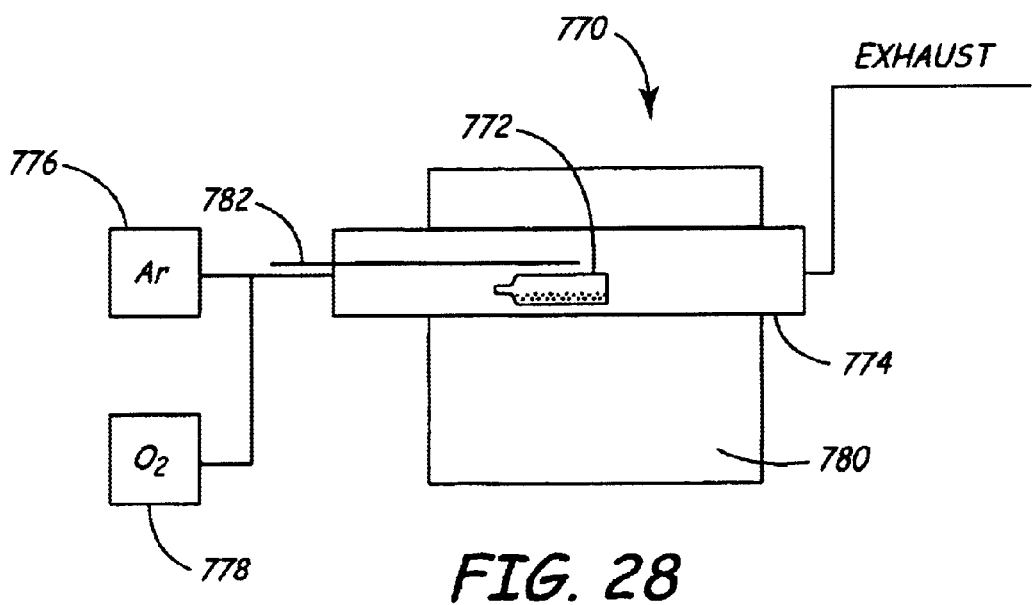
FIG. 28 is a schematic, sectional view of an oven for heating submicron/nanoscale particles, in which the section is taken through the center of a tube.

An alternative apparatus 770 for the heat treatment of modest quantities of submicron/nanoscale particles is shown in FIG. 28. The particles are placed within a boat 772 or the like within tube 774. Tube 774 can be produced from, for example, quartz, alumina or zirconia. The desired gases can be flowed through tube 774. Gases can be supplied for example from inert gas source 776 or oxidizing gas source 778.

Tube 774 is located within oven or furnace 780. Oven 780 can be adapted from a commercial furnace, such as Mini-Mite™ 1100° C. Tube Furnace from Lindberg/Blue M, Asheville, N.C. Oven 780 maintains the relevant portions of the tube at a relatively constant temperature, although the temperature can be varied systematically through the processing step, if desired. The temperature can be monitored with a thermocouple 782.

For the introduction of a metal/metalloid element into the particles, a composition comprising the metal/metalloid element can be combined with the particles prior to or during the heat treatment. For example, the composition can be combined with the particles as a solution or as a powder. If the composition is applied as a solution, the solvent should not dissolve the particles, and the solvent generally is removed at the initial portion of the heating process. In some embodiments, the additional element(s) can be introduced as a powder of the elemental form of the element, i.e., the un-ionized form of the element. Generally, the composition or elemental powder is mixed with the particles to get even incorporation into the particles.

Suitable temperature ranges depend on the starting material and the target product metal/metalloid oxide. For the processing of many submicron/nanoscale particles, the temperature varies in the range(s) from about 100° C. to about 200° C. The heating generally is continued for in the range(s) of greater than about 5 minutes, and typically is continued for in the range(s) from about 10 minutes to about 120 hours, in most circumstances in the range(s) from about 10 minutes to about 5 hours. A person of ordinary skill in the art will recognize that other ranges within these explicit temperature and heating time ranges are contemplated and are within the present disclosure. Suitable heating times also depend on the particular starting material and target product as well as the temperature. Some empirical adjustment may be helpful to produce the conditions appropriate for yielding a desired material. Typically, submicron/nanoscale powders can be processed at lower temperatures while still achieving the desired reaction. The use of mild conditions avoids significant interparticle sintering resulting in larger particle sizes. To prevent particle growth, the particles can be heated for short periods of time at high temperatures or for longer periods of time at lower temperatures. Some controlled sintering of the particles can be performed at somewhat higher temperatures to produce slightly larger, average particle diameters.

As noted above, heat treatment can be used to perform a variety of desirable transformations for submicron/nanoscale particles. For example, the conditions to convert crystalline $VO_2$ to orthorhombic $V_2O_5$ and 2-D crystalline $V_2O_5$, and amorphous $V_2O_5$ to orthorhombic $V_2O_5$ and 2-D crystalline $V_2O_5$ are describe in U.S. Pat. No. 5,989,514, to Bi et al., entitled "Processing of Vanadium Oxide Particles With Heat," incorporated herein by reference. Conditions for the removal of carbon coatings from metal oxide submicron/nanoscale particles is described in U.S. Pat. No. 6,387,531, entitled "Metal (Silicon) Oxide/Carbon Composite Particles," incorporated herein by reference. The incorporation of lithium from a lithium salt into metal oxide submicron/nanoscale particles in a heat treatment process is described in U.S. Pat. No. 6,136,287 to Horne et al., entitled "Lithium Manganese Oxides And Batteries," and copending and commonly assigned U.S. patent application Ser. No. 09/334,203 to Kumar et al., entitled "Reaction Methods for Producing Ternary Particles," both of which are incorporated herein by reference. The incorporation of silver metal into vanadium oxide particles through a heat treatment is described in U.S. Pat. No. 6,225,007 to Horne et al., entitled "Metal Vanadium Oxide," incorporated herein by reference. For metal incorporation into vanadium oxide, the temperature is generally in the range(s) from about 200° C. to about 500° C. and in other embodiments in the range(s) from about 250° C. to about 375° C.

In addition, metal/metalloid oxide particles can be converted to the corresponding metal/metalloid sulfides by heating the oxide in a sulfurizing atmosphere formed by a $H_2S$ gas atmosphere or a $CS_2$ vapor atmosphere. The metal/metalloid oxides can be heated gently to form the sulfide. Since the sulfides are extremely reactive, the heating can be very gentle, generally in the range(s) less than about 500° C. and alternatively or additionally in the range(s) of less than about 300° C. Suitable concentrations of sulfurizing agent and reaction times can be evaluated empirically by examining the x-ray diffractograms of the resulting materials or by performing an elemental analysis.

Modifying the Composition of Powder Coatings

While the compositions can be selected during deposition by appropriately introducing elements into the reactant stream for particle production, alternatively or additionally, the powder coating composition can be modified following formation of the powder coating. The composition modifications of powder coatings may or may not involve introduction of approximately stoichiometric amounts of element(s) and/or dopant(s)/additive(s). Due to the submicron/nanoscale of the primary particles incorporated into the powder coating, the powder coating has a large surface area that facilitates incorporation of the additional element(s) into the initial material. One or more additional elements can be incorporated into the powder coating by a gentle heating at temperatures that do not result in consolidation of the material, or into a densified material during consolidation of the powder coating into a uniform material. The additional element(s) can be applied to the powder coating within the reaction chamber or following removal from the reaction/coating chamber. If the element(s) is applied to the powder coating following removal of the coated substrate from the reaction chamber, the additional element(s) can be applied to powder coating directly. The modifying elements can be incorporated into the adjacent materials either in a heating at a temperature insufficient to flow the material prior to fiber formation and/or during the fiber formation process. In some embodiments of these approaches, the powder coating can be partly consolidated prior to initiating the composition introduction process to stabilize the coating, generally without removing all of the submicron/nano-structured character of the coating.

Generally, one or more modifying element is applied as a composition comprising the desired element. Any remaining elements in the compositions generally would volatilize during the heating process, although it is possible that oxygen or other non-metal/metalloid elements from the compositions may also incorporate into the powder coating. For example, metal/metalloid nitrates during the heat treatment can involve the incorporation of the metal/metalloid element into the host material and the removal of nitrogen oxides to remove the counter-ions of the composition. The composition can be applied to the powder coating as a solution, an aerosol, and/or as a powder. In general, the use of a solution can facilitate the even spread of the composition through the powder coating by the flow of the solution over and into the powder coating. The concentration of a solution can be selected to contribute to more even distribution of the composition at desired amounts of modification element through the use of a volume of liquid that appropriately wets the powder coating. Surfactants and/or choice of solvent can be used to reduce surface tension and facilitate substantially even spread of the solution. The solvent can be evaporated prior to and/or during the heat processing of the powder coating to incorporate the modification element into the powder coating. Any surfactants can be selected to volatize, for example by decomposition, during the consolidation step.

The reactant delivery system can be used to apply a composition to a powder coating within a reaction chamber. In particular, the composition comprising the modifying element can be applied within the coating apparatus by spraying a solution of the composition through the reactant inlet such that the composition is applied to all or selected portions of the substrate. The composition comprising the modifying element can be applied, for example, as an aerosol using an aerosol delivery system. The radiation beam can be either turned off during spraying of the composition or turned to a very low power to evaporate a portion of the solvent without reacting the composition. The reactant delivery systems described above can be adapted for the delivery of the unreacted composition. The coating process can be used to apply an approximately even coating onto the powder coating, e.g., by sweeping the substrate through a delivery stream of the solution with the modifying element at a constant rate.

Alternatively, the modifying element can be applied to the powder coating following removal of the powder coating from the reaction/coating chamber. The modifying element can be applied, generally in the form of a composition, as a liquid, aerosol and/or a powder, to the powder coating, for example, by spraying, brushing, dipping or the like. As with solutions applied within the reaction chamber, the concentration and other properties of the solution can be selected to obtain even distribution of the modifying element within the powder coating and/or consolidated material. Dip coating of the powder coating can be a convenient approach for obtaining uniform distribution of composition over the powder coating.

Rather than allowing natural migration of the composition with the modifying element over and through the powder coating, an electric field can be used to drive ions of the modifying element(s) into the host matrix. Specifically, modifying element(s) can be introduced into material using electrophoretic or electro-migration deposition. In this approach, an electric field is used to drive ions into the host matrix of the powder coating. A solution containing the host ions is contacted with the powder coating. Electro-migration deposition into a powder coating is described further in copending and commonly assigned U.S. patent application Ser. No. 10/195,851, entitled "Nanoparticle Production And Corresponding Structures," incorporated herein by reference.

In further embodiments, a composition comprising the desired modifying element, e.g., dopant(s)/additive(s), is reacted separately in the reaction chamber for coating onto a powder coating. Thus, a separate quantity of powder comprising a modifying element can be deposited on top of a host powder. As a particular example, if the host powder is a metal/metalloid oxide, a powder of a modifying metal/metalloid oxide can be formed as a separate powder coating on top of the host powder coating. Upon heat treatment and/or fiber formation, the materials fuse into a uniform composition that can have approximately uniform distribution of modifying element through the material. The amount of powder of the modifying element can be selected to yield the desired levels of the modifying element, e.g., a dopant(s)/additive(s). The coating processes can be repeated to form layers of host powder coating (H) and modifying powder coating (D) in desired proportions—HDHDHD . . . or alternatively HDHDH . . . , with modifying powder coating layers always surrounded by host layers, except if the modified powder coating layer is at the bottom or the top of the multiple layer coating stack where the substrate or surface, respectively, surround one side of the modified layer. The layers can be varied with respect to the amount of materials deposited to form selected alternative distributions of compositions. Alternatively or additionally, different compositions can be deposited within different layers or groups of layers to form selected distributions of compositions within the resulting structure. Of course, in forming a single host or modifying powder coating layer in some embodiments, multiple coating passes can be used in the coating apparatus with each pass involving a sweep of a substrate through the reactant/product stream. The number of alternating layers can be selected to yield the desired composition of the resulting materials.

In general, the various approaches for introducing a modifying element into a powder coating can be combined for the introduction of one or more than one modifying element into a powder coating and, in some embodiments, an ultimate consolidated material. In particular, a method for introducing one or more modifying elements, such as a dopant(s)/additive(s), during formation of a powder coating and methods for introducing modifying elements following deposition of a powder coating are described above. For example, a particular modifying element can be introduced using a plurality of techniques to achieve desired levels of modifying element and/or distributions of modifying element within the powder coating and/or consolidated material. In addition, for the deposition of a plurality of modifying elements, each modifying element can be deposited using one or more of the techniques described above, for convenience of processing and/or to achieve desired properties of the resulting consolidated materials.

Formation of Fiber Preforms from Powders and Coated Glass

The fiber preform structures generally comprise a cavity into which the powders are placed. The powders can be inserted into the cavity during the depositions process, as described above. Alternatively or additionally, the powders can be collected and subsequently deposited into the cavity, as described further below. In addition, the powders can be coated onto an insert which is then placed within the preform structure to effectuate the placement of the powders within the preform structure. In general, collected powders can be transferred into the cavity of the preform structure using any reasonable approach. However, it can be advantageous to form a slurry from the powders for transfer into the preform structure.

A variety of fluids can be used to suspend the particles, such as gaseous and liquid dispersants. The fluid generally should be selected such that the fluid does not dissolve or chemically react with the fluid or the preform structure. Thus, selection of a suitable fluid can be straightforward based on the identification of the particles and the preform structure. However, some fluids may have better dispersion ability based on the surface properties of the particles and the chemical/physical properties of the fluid. Surfactants, such as cationic, anionic and nonionic surfactants, and/or other agents can be added to the fluids to facilitate dispersion. With silica doped amorphous particles, several dispersants can be used to obtain suspension for extended periods of time. In general, a variety of aqueous and organic liquids can be used. With water, methanol, propanol and combinations thereof may be suitable dispersants. Using ethanol as a dispersant, a dispersion can be obtained without gel formation for reasonable periods of time.

Generally, if a liquid is used to disperse the particles/powders, the liquid is removed either prior to and/or during fiber formation. A reduced pressure, e.g., a vacuum, can be applied to facilitate fluid removal. Appropriate pressure may depend on the boiling point of the particle fluid and the temperature used. In one approach to drying, the tip of the tube is connected to vacuum, i.e., low pressure, while the top of the tube is exposed to the atmosphere. Heating at too high of a temperature can lead to cracking. The temperature can be maintained below 79 C., the boiling point of ethanol, if ethanol is the dispersant. Specifically, for ethanol, suitable temperatures can be between 55 C. and 70 C.

Figure 29:
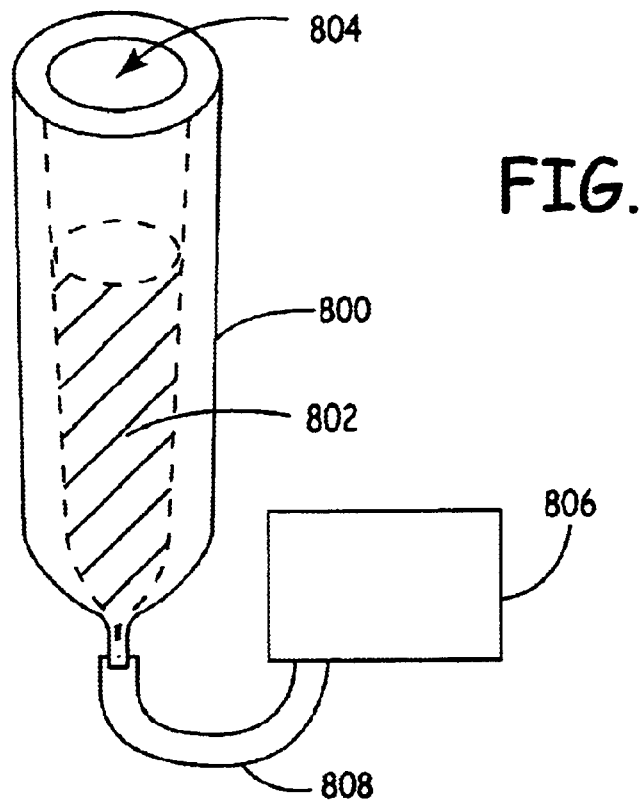
FIG. 29 is a schematic perspective view of a fiber preform with a slurry connected to an apparatus for applying a vacuum to the bottom of the preform for drying the slurry.

A schematic diagram of one embodiment of the drying process is shown in FIG. 29. As shown in FIG. 29, preform structure 800 includes slurry 802 within cavity 804. Pump 806 is connected to the tip of preform structure 800 by tubing 808. The tube/preform structure can be placed in an oven or furnace to evaporate the solvent.

Figure 30:
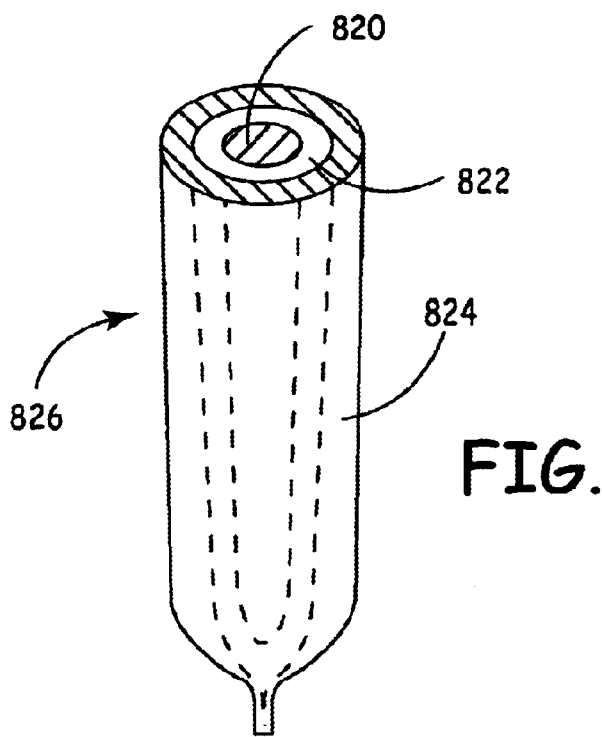
FIG. 30 is a perspective view of a preform structure with a coated insert within the preform structure.

As described above, an insert, such as a rod, can be coated with a powder coating to introduce the compositions of the corresponding particles into a preform structure. The insert can be inserted into a cavity within the preform structure. Referring to FIG. 30, a coated insert 820 is depicted within cavity 822 of preform structure 824 to form the fiber preform 826.

Fiber Preform Structures and Optical Fibers

The optical fiber preform is formed from the preform structure with the powders/particles and any insert, if present. The optical fibers pulled from the optical fiber preform have characteristics based on the structure and composition of the preform and the processing conditions during the pulling.

Generally, the preform structure comprises an optical glass, such as a silica glass. The preform structure can comprise one uniform composition or domains of compositions. Thus, the preform can have a structure corresponding to one or more core layers, each of which may or may not have a corresponding cavity for particle placement. The composition of the powders can be selected to contribute significant optical properties to the fiber. In general, the formation of preforms with complex structures of composition placement for formation of corresponding fibers is described further in copending PCT application designating the U.S. serial number PCT/US01/45762 to Bi et al., entitled "Multilayered Optical Structures," incorporated herein by reference. One or more cavities can be formed within the perform structure during formation of the preform or by drilling the cavity into the structure, for example using a physical drilling process with a hard bit, such as a diamond or carbide bit, or etching, for example, ion plasma etching.

The fiber preform structure, into which the powders are placed, can have a circular, rectangular, oval or other shaped cross section perpendicular to an axis along which the preform is pulled to form the fiber. The size of the preform can be selected based on the characteristics of the desired fiber, the conditions to be used in pulling the fiber and the amount of fiber to be formed from the preform. Specifically, the dimensions of the fiber preform correlates with the dimensions of the fiber for a given temperature of the preform during fiber formation and the rate at which the fiber is pulled based on principles known in the art. For the formation of preforms, it may be desirable to shape the substrate highly elongated in one dimension. The aspect ratio of the length of the preform divided by a width dimension may range from about 1:5 to about 1:1000, in further embodiments in the range from about 1:5 to about 1:50, or in other embodiments in the range from about 1:10 to about 1:25. A person of ordinary skill in the art will recognize that ranges and subranges within these explicit ranges are contemplated and are within the present disclosure.

The dimensions of the cavity can be selected based on the composition of the powder, the density at which the powder collects and the desired dimensions of the resulting optical structure, such as a waveguide core. For example, the cavity can have a circular, oval or rectangular cross section perpendicular to the normal to the cavity opening. The shape and size of the cavity cross section may or may not be uniform over the expanse of the cavity. The nature of the cavity and the composition influences the characteristics of the resulting optical fiber. In addition, the preform can comprise more than one cavity, which may or may not have the same sizes and shapes as each other. If there are a plurality of cavities, the cavities can have powders associated with them or not, and if a plurality have associated powders, the powder associated with a particular cavity may or may not be the same with respect to composition and/or particle size and particle size distribution as powders in other cavities.

The powder can have a composition selected such that upon pulling of the fiber, the powder consolidates to form a core layer, possibly with some minor overlap with the adjacent preform structure. Alternatively or additionally, the powder and preform structure can be selected to combine partially to form a core structure. For example, the powder can comprise dopants that lower the melting temperature of silica glass such that the dopants will combine within an adjacent layer of the preform glass materials to form the core along with any other functional compositions within the powder. In further embodiments, the powder comprises a material to be embedded within the core but does not comprise the glass forming hosts of the core. For example, one or more crystalline powders, such as crystalline $Er_2O_3$, can be embedded within an optical glass. If the crystalline powders have sufficiently high melting points, the crystalline powders are embedded in their crystalline form upon flowing the glass material. The flow conditions, temperature and the like, can be controlled to limit the extent of diffusion of the crystalline powders within the glass. In other embodiments, the particles/powders comprise an optical glass material, such as a doped version of the preform structure material. Fibers with cores having high rare earth concentrations are useful in Faraday isolator applications as described further in "Fabrication of fibers with high rare-earth concentrations for Faraday isolator applications," by Ballato and Snitzer, Applied Optics 34:6848–6854 (October 1995), incorporated herein by reference. The particles can have a flow temperature lower than the preform structure material such that the preform structure is not compromised when flowing the particles to form a core.

Whether or not the particles are placed within the preform structure following collecting or are placed within the preform structure as a powder coating, the powders may or may not fill the cavity with respect to any dimension. For embodiments in which the powders are deposited during deposition, a powder coating results. Sufficient powder coating material can be deposited to effectively fill a cavity within the preform structure, or any lesser quantities of powder coating material, as desired, can be deposited either approximately uniformly or in patterns as described above. In embodiments in which a collected powder is deposited, the density of the resulting powder can vary depending on the conditions used to deposit the powder. If desired pressure and/or heat can be applied prior to pulling the fiber to densify the powder.

The patterned/layered preform can be pulled using, for example, conventional fiber pulling processes. The preform is heated to soften the material that is then pulled to form the fiber from the preform. The dimensions of the preform structures can be selected to yield a patterned optical fiber with independent light channels with desired dimensions based on the known dimensions of an optical fiber obtained by pulling a preform. Suitable rates generally are within range(s) from about 1 meter per minute to about 100 meters per minute. Suitable tension generally can be within range(s) from about 1 gram to about 500 grams and in other embodiments in the range(s) from about 10 grams to about 40 grams. A person of ordinary skill in the art will recognize that ranges and subranges within these explicit ranges are contemplated and are within the present disclosure. The pulling results in the reduction of the dimensions of the structure. The temperature, tension and pulling rate contribute to the dimensions of the resulting fiber. At reasonable pulling conditions, the fundamental structural relationships of the multicore structure maintained within the reduced dimensions of the fiber. The pulling of fiber optic cables from a preform is described further in U.S. Pat. No. 4,630,890 to Ashkin et al., entitled "Exposed Core Optical Fibers, and Methods of Making Same," incorporated herein by reference. Also, the formation of an optical fiber filled with a particulate filler is described further in U.S. Pat. No. 6,128,430 to Chu et al., entitled "Composition For Optical Waveguide Article And Method For Making Continuous Clad Filament," incorporated herein by reference.

Following pulling, the resulting fiber maintains structure from the preform. In particular, the fiber has isolated light channels through isolated cores that can be individually used to transmit light without interference from neighboring cores. Following pulling, the fiber has a gross structure reminiscent of a standard optical fiber; specifically, the patterned optical fiber generally is flexible.

As utilized herein, the term "in the range(s)" or "between" comprises the range defined by the values listed after the term "in the range(s)" or "between", as well as any and all subranges contained within such range, where each such subrange is defined as having as a first endpoint any value in such range, and as a second endpoint any value in such range that is greater than the first endpoint and that is in such range.

The embodiments described above are intended to be illustrative and not limiting. Additional embodiments are within the claims below. Although the present invention has been described with reference to specific embodiments, workers skilled in the art will recognize that changes may be made in form and detail without departing from the spirit and scope of the invention. In addition, the terms including, comprising and having as used herein are intended to have broad non-limiting scope.

What we claim is:

1. An optical fiber preform comprising a glass preform structure with an inner cavity and a powder within the inner cavity, the powder having an average primary particle size less than about 1 micron.

2. The optical fiber preform of claim 1 wherein the powder essentially includes no primary particles with a diameter greater than about ten times the average diameter.

3. The optical fiber preform of claim 1 wherein the powder comprises a plurality of metals.

4. The optical fiber preform of claim 3 wherein the plurality of metals comprises a rare earth metal.

5. The optical fiber preform of claim 1 wherein the powder comprises a collection of particles having an average primary particle size less than about 500 mn.

6. The optical fiber preform of claim 1 wherein the powder comprises a collection of particles having an average primary particle size less than about 250 nm.

7. The optical fiber preform of claim 1 wherein the powder comprises a collection of particles having an average primary particle size less than about 100 nm.

8. The optical fiber preform of claim 1 wherein the powder comprises a collection of particles having an average primary particle size less than about 50 nm.

9. The optical fiber preform of claim 1 wherein the powder comprises amorphous particles.

10. The optical fiber preform of claim 1 wherein the powder comprises crystalline particles.

11. The optical fiber preform of claim 1 wherein the powder comprises polycrystalline particles.

12. The optical fiber preform of claim 1 wherein the powder essentially includes no primary particles with a diameter more than about three times the average diameter.

13. The optical fiber preform of claim 1 wherein the powder compares Er.

14. The optical fiber preform of claim 1 wherein the powder comprises $SiO_2$.

15. The optical fiber preform of claim 14 wherein the powder further comprises an element selected from the group consisting of Ge, P, B, and a rare earth metal.

16. The optical fiber preform of claim 1 wherein the powder comprises a powder coating.

17. The optical fiber preform of claim 1 wherein the powder comprises an unagglomerated particle collection with an average particle size approximately equal to the primary particle size.

* * * * *